United States Patent
Iizuka

(10) Patent No.: US 9,126,600 B2
(45) Date of Patent: Sep. 8, 2015

(54) CONTROL DEVICE FOR VEHICLE AND MOTORCYCLE WITH SAME

(75) Inventor: Shinya Iizuka, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 86 days.

(21) Appl. No.: 13/996,683

(22) PCT Filed: Apr. 8, 2011

(86) PCT No.: PCT/JP2011/058885
§ 371 (c)(1),
(2), (4) Date: Jun. 21, 2013

(87) PCT Pub. No.: WO2012/086225
PCT Pub. Date: Jun. 28, 2012

(65) Prior Publication Data
US 2013/0289839 A1    Oct. 31, 2013

(30) Foreign Application Priority Data

Dec. 24, 2010 (JP) ................................ 2010-288949

(51) Int. Cl.
| | | |
|---|---|---|
| *B60W 30/19* | (2012.01) | |
| *B60W 10/02* | (2006.01) | |
| *B60W 10/113* | (2012.01) | |
| *F16H 61/04* | (2006.01) | |
| *F16H 61/688* | (2006.01) | |
| *F16H 63/50* | (2006.01) | |
| *B60W 10/06* | (2006.01) | |
| *F16H 63/18* | (2006.01) | |

(52) U.S. Cl.
CPC ............... *B60W 30/19* (2013.01); *B60W 10/02* (2013.01); *B60W 10/06* (2013.01); *B60W 10/113* (2013.01); *F16H 61/0437* (2013.01); *F16H 61/688* (2013.01); *F16H 63/502* (2013.01); *B60W 2600/00* (2013.01); *B60W 2710/0644* (2013.01); *B60Y 2200/12* (2013.01); *B60Y 2400/421* (2013.01); *F16H 63/18* (2013.01); *F16H 2306/18* (2013.01); *F16H 2306/54* (2013.01)

(58) Field of Classification Search
CPC . B60W 10/02; B60W 10/023; B60W 10/026; B60W 10/04; B60W 10/06; B60W 10/08; B60W 10/10; B60W 10/108; B60W 10/109; B60W 10/11; B60W 10/111; B60W 10/113; B60W 10/115; B60W 2510/00; B60W 2510/02; B60W 2510/0208; B60W 2510/0216; B60W 2510/0225; B60W 2510/0233; B60W 2510/0241; B60W 2510/025; B60W 2510/0258; B60W 2510/0266; B60W 2510/0275; B60W 2510/0283; B60W 2510/0638; B60W 2600/00; B60W 2710/00; B60W 2710/02; B60W 2710/021; B60W 2710/022; B60W 2710/023; B60W 2710/024; B60W 2710/025; B60W 2710/0644; B60W 2710/065; B60W 2710/0655; B60W 2710/0661; B60W 2710/0666; B60W 2710/0672; B60W 30/19; B60W 30/192; B60Y 2200/12; B60Y 2200/122; B60Y 2200/124; B60Y 2200/126; B60Y 2400/42; B60Y 2400/421; B60Y 2400/422; B60Y 2400/423; B60Y 2400/424; B60Y 2400/4242; B60Y 2400/4244; B60Y 2400/425; B60Y 2400/426; B60Y 2400/427; B60Y 2400/428; F16H 2306/18; F16H 2306/54; F16H 61/0437; F16H 61/688
USPC .................. 701/54, 62, 64, 67; 180/9.25
See application file for complete search history.

(56) References Cited

U.S. PATENT DOCUMENTS

| | | |
|---|---|---|
| 5,478,293 A | 12/1995 | Yonezawa |
| 2004/0166990 A1 | 8/2004 | Buchanan et al. |
| 2004/0166991 A1 | 8/2004 | Buchanan et al. |
| 2004/0172184 A1 | 9/2004 | Vukovich et al. |
| 2006/0160660 A1 | 7/2006 | Zenno et al. |
| 2009/0084210 A1 | 4/2009 | Tsukada et al. |

| | | | |
|---|---|---|---|
| 2010/0107792 | A1 | 5/2010 | Saitoh |
| 2010/0107810 | A1 | 5/2010 | Saitoh |
| 2011/0054752 | A1 | 3/2011 | Arai |

FOREIGN PATENT DOCUMENTS

| | | | |
|---|---|---|---|
| EP | 0 461 578 A1 | 12/1991 |
| JP | 4-46225 A | 2/1992 |
| JP | 6-330777 A | 11/1994 |
| JP | 10-227355 A | 8/1998 |
| JP | 10-238620 A | 9/1998 |
| JP | 2001-221336 A | 8/2001 |
| JP | 2002-067741 A | 3/2002 |
| JP | 2004-251456 A | 9/2004 |
| JP | 2006-170226 A | 6/2006 |
| JP | 2007-239909 A | 9/2007 |
| JP | 2009-085324 A | 4/2009 |
| JP | 2009-162357 A | 7/2009 |
| JP | 2010-133555 A | 6/2010 |
| JP | 2011-47511 A | 3/2011 |

OTHER PUBLICATIONS

Official Communication issued in International Patent Application No. PCT/JP2011/058885, mailed on Jun. 14, 2011.

English translation of Official Communication issued in corresponding International Application PCT/JP2011/058885, mailed on Jul. 11, 2013.

*Primary Examiner* — Jerrah Edwards

(74) *Attorney, Agent, or Firm* — Keating & Bennett, LLP

(57) ABSTRACT

A vehicle of a dual clutch type includes a transmission mechanism including a plurality of gears including dog clutches and two clutches, wherein engagement of the gears by the dog clutches is smoothened to prevent shift shock. When receiving a shifting command, a control device sets an engine rotation speed corresponding to a reduction ratio of a next gear level, and a vehicle velocity as a target rotation speed, and controls the engine rotation speed toward a target rotation speed. Also, the control device prevents the engine rotation speed from arriving at the target rotation speed until two gears corresponding to the next gear level are engaged with each other by the dog clutch. The control device brings one clutch close to an engaged state, and the other clutch close to a disengaged state after the engine rotation speed arrives at the target rotation speed.

16 Claims, 31 Drawing Sheets

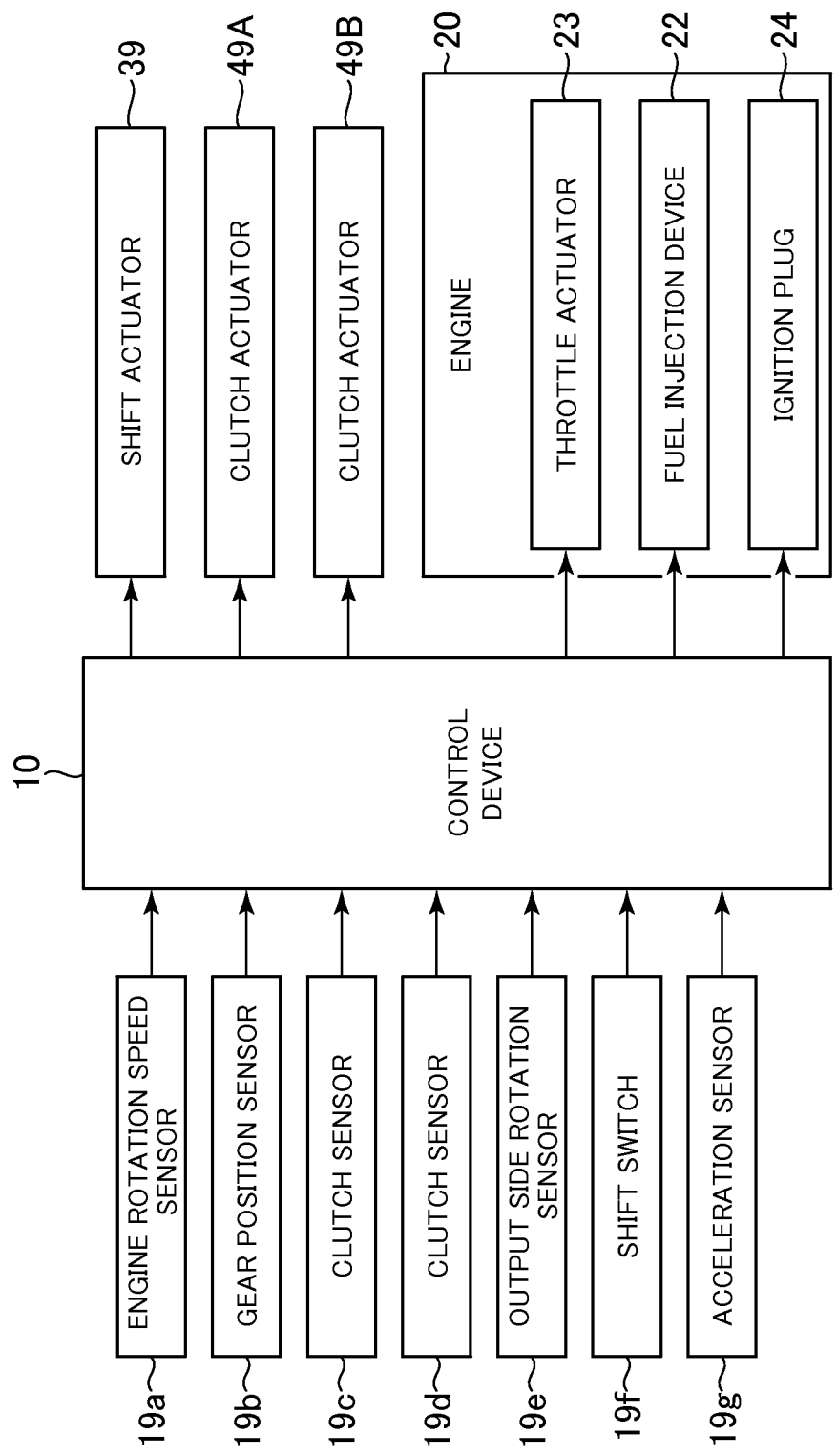

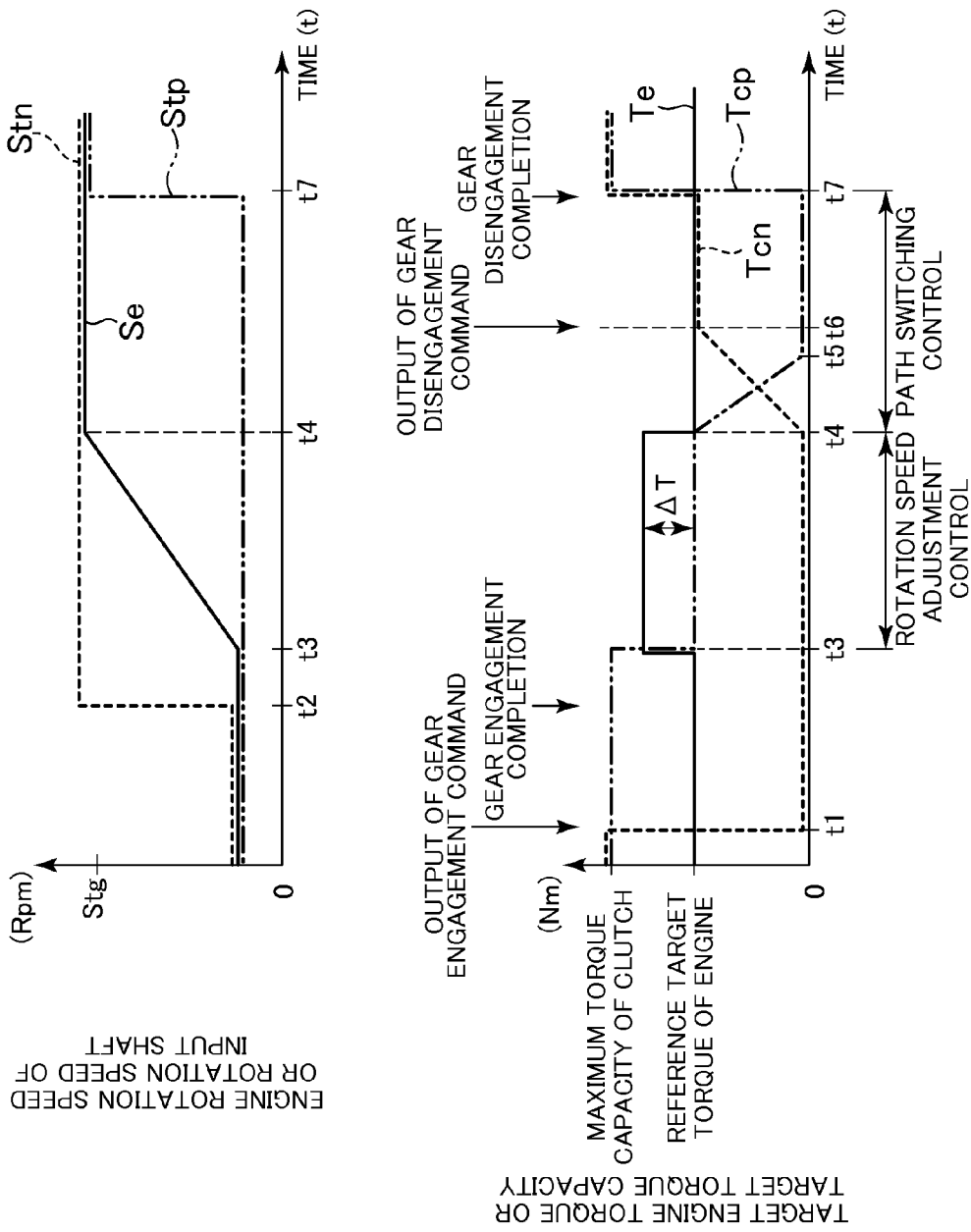

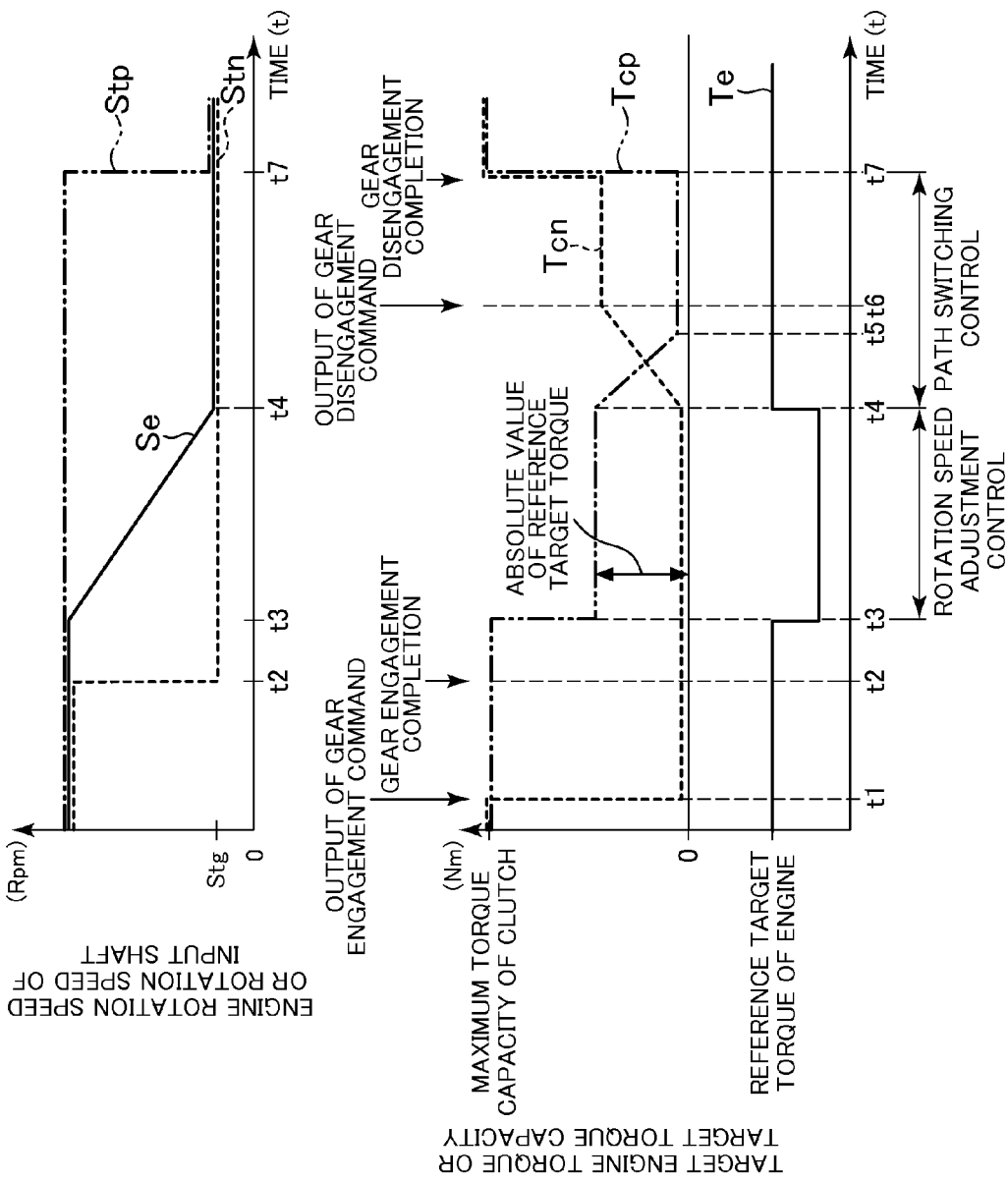

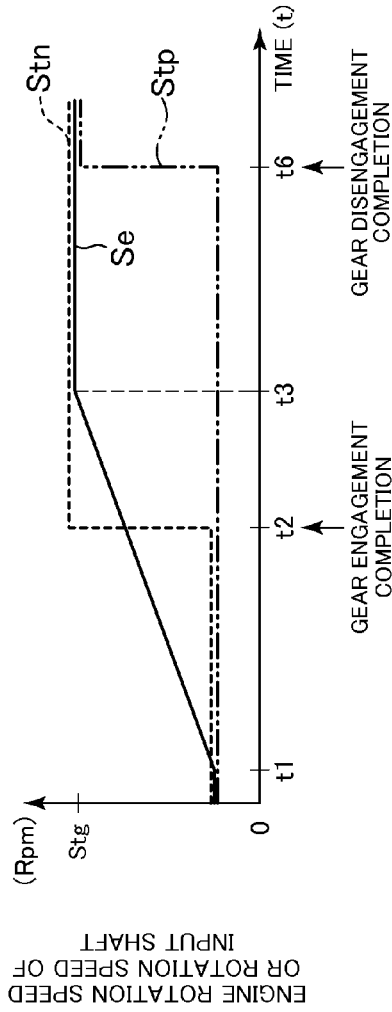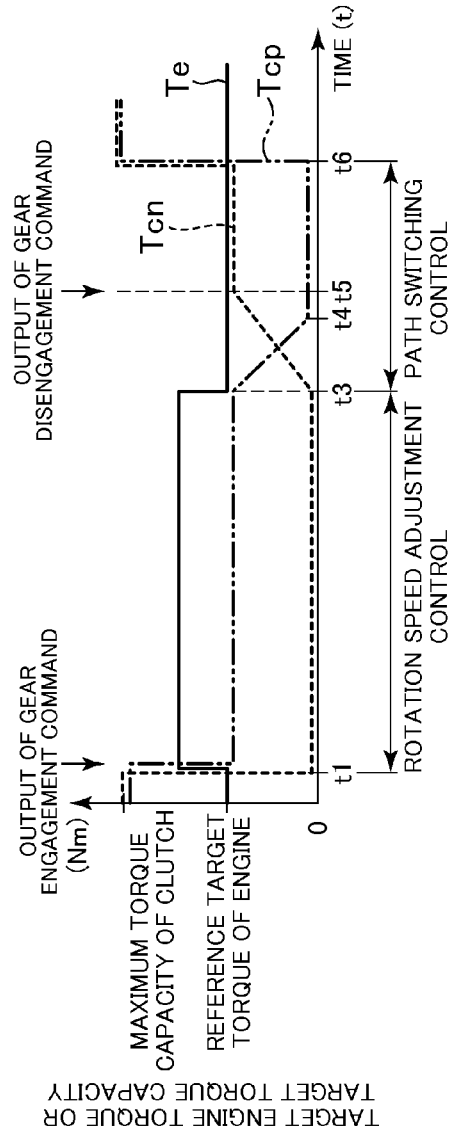

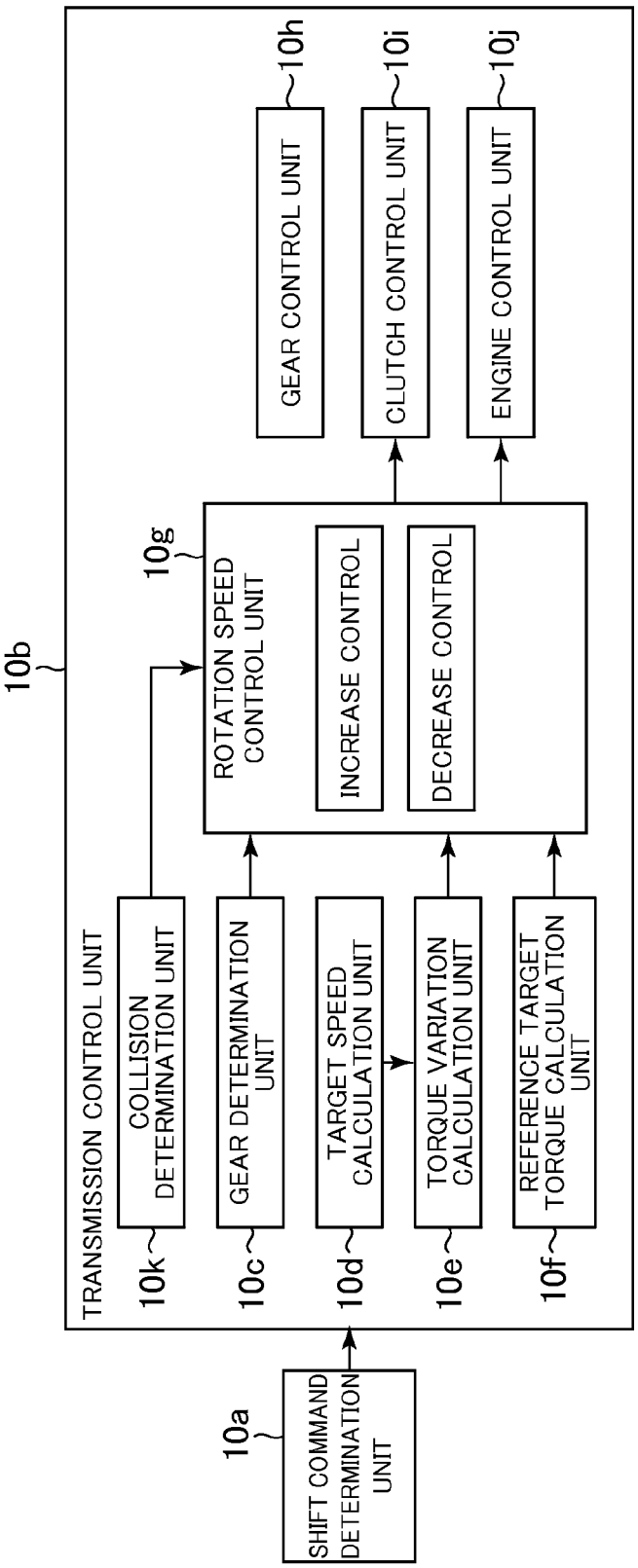

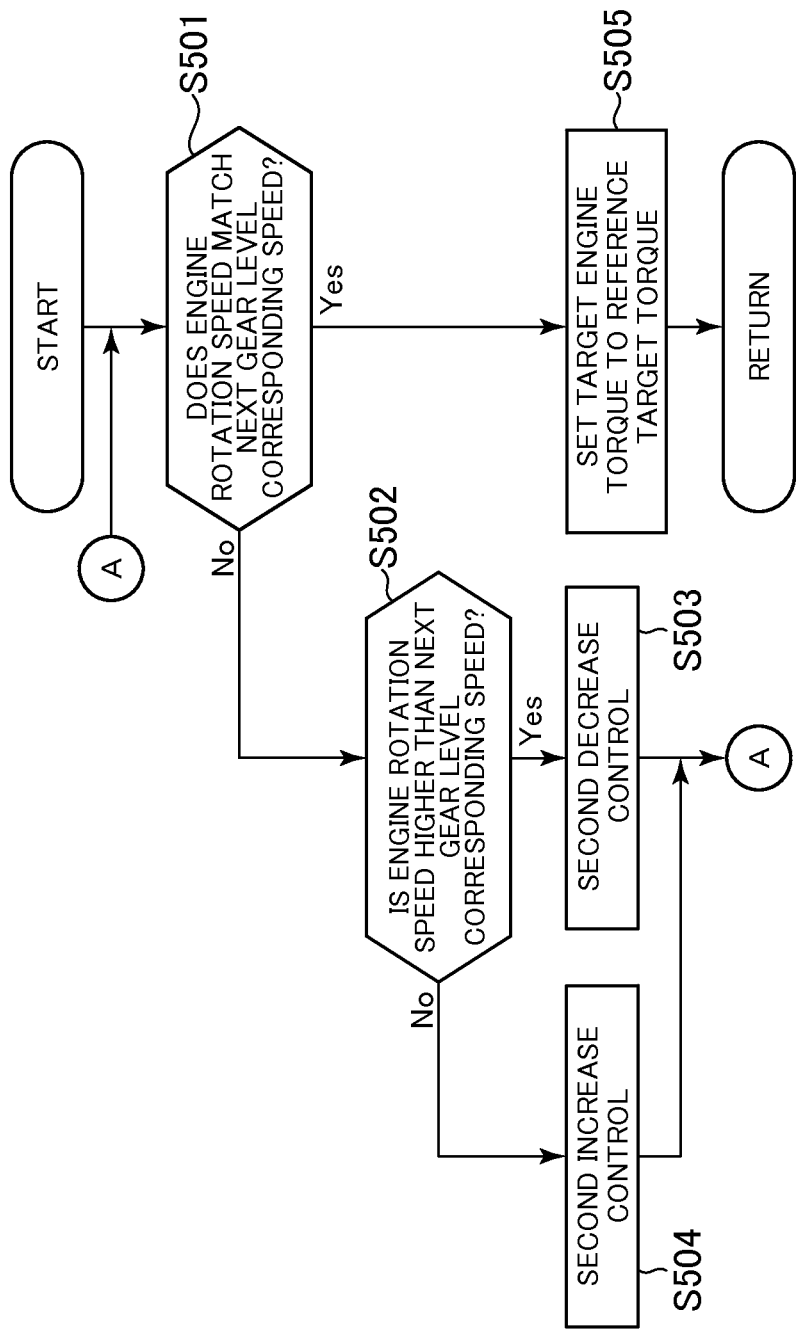

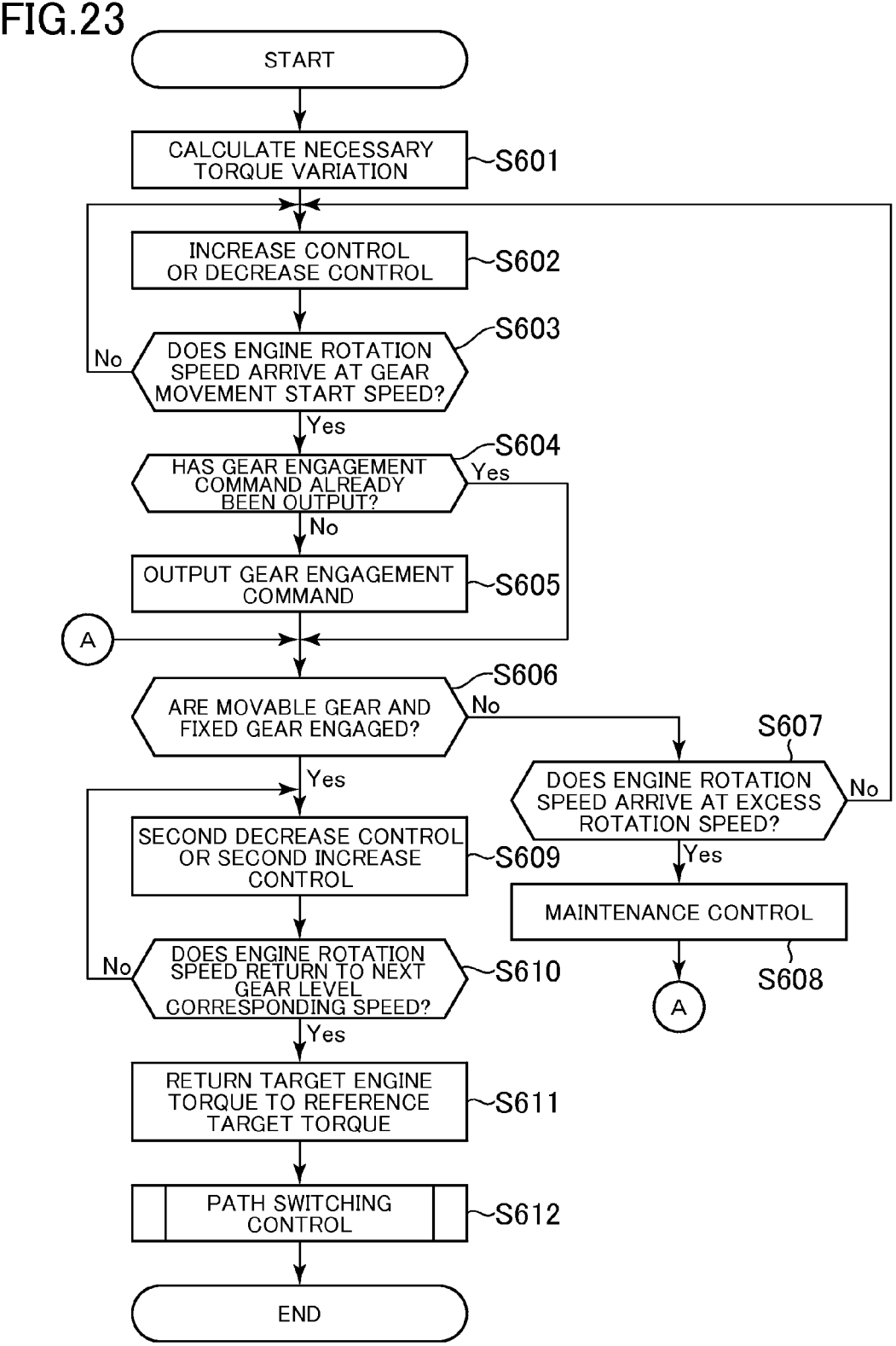

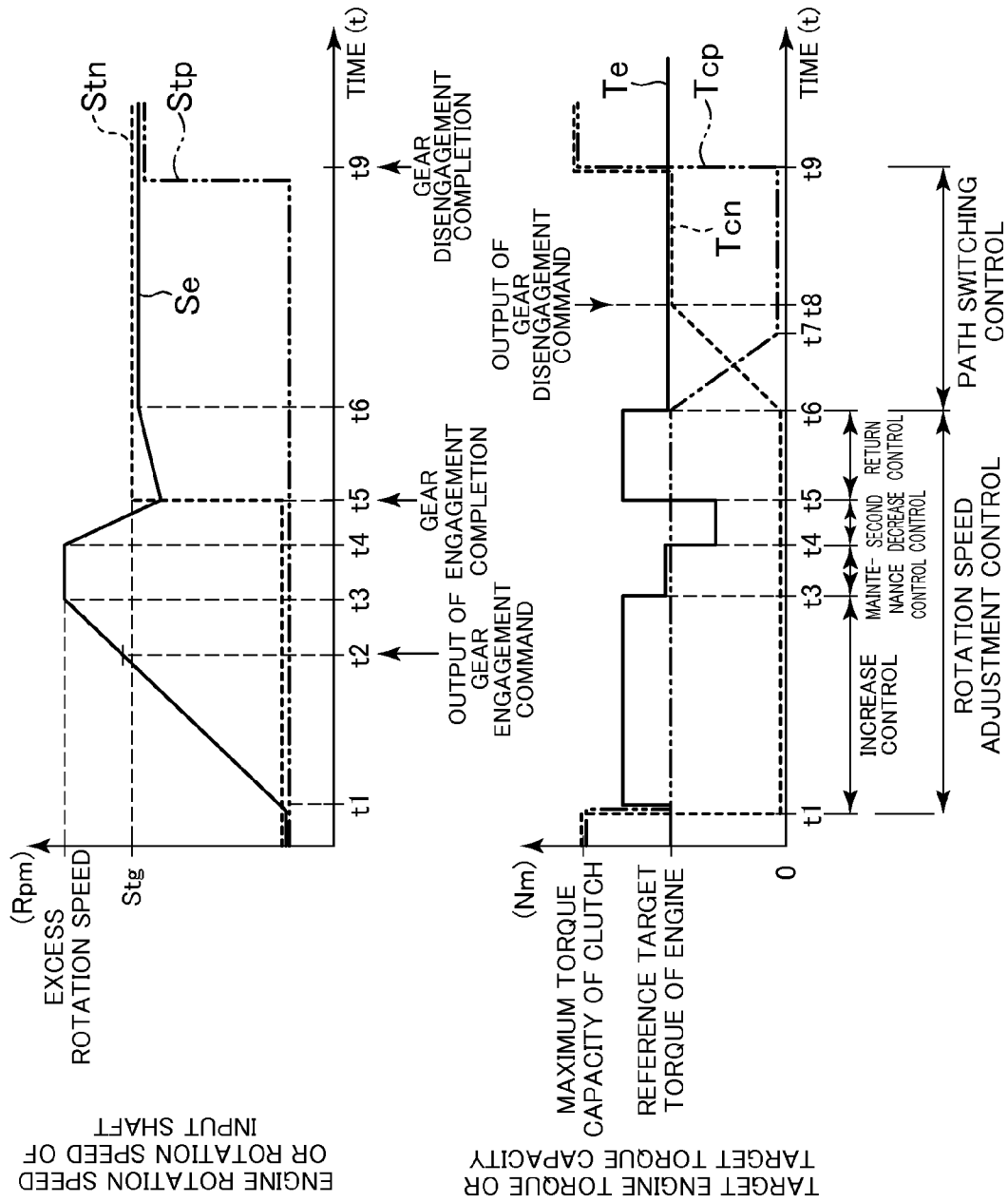

CONTROL DEVICE FOR VEHICLE AND MOTORCYCLE WITH SAME

BACKGROUND OF THE INVENTION

1. Field of the Invention

The present invention relates to a control device for a vehicle and a motorcycle including two paths as power transmission paths that extend from an engine to an output shaft of a transmission, and clutches respectively arranged in the two paths.

2. Description of the Related Art

JP 2009-85324 A discloses a vehicle of a dual clutch type. In the vehicle of the dual clutch type, two paths are disposed as power transmission paths that extend from the engine to the output shaft of the transmission. A clutch and a transmission mechanism are disposed in each of the two paths. That is, one clutch is connected with the transmission mechanism including gears for even gear levels, and the other clutch is connected with the transmission mechanism including gears for odd gear levels. The two transmission mechanisms include a common output shaft.

The transmission provided in the vehicle disclosed in JP 2009-85324 A is a transmission of a so-called dog clutch type. In the transmission of this type, the dog clutch (dog teeth or dog holes) is provided in each of the gears, and a gear pair including the two gears can be engaged with each other by the dog clutches. During normal running, a gear pair is engaged with each other in only one transmission mechanism, and all of the gear pairs are put in a neutral state (disengaged state) in the other transmission mechanism.

Upon receiving a shift command, a path to transmit a power is switched from one to the other. That is, the gear pair of one transmission mechanism in the engaged state is changed to the neutral state, and the gear pair of the other transmission mechanism is changed to the engaged state. Also, the clutch connected with the other transmission mechanism (the clutch that starts the power transmission by shifting) is transitioned from the disengaged state to the engaged state.

If a rotation speed difference occurs between a driving member and a driven member of the clutch when the clutch that starts the power transmission by shifting is transitioned to the engaged state, shift shock may be caused. For that reason, in order to prevent shift shock, the engine rotation speed in some cases is increased or decreased toward an engine rotation speed (hereinafter, referred to as "target rotation speed") obtained by a shifting before the driving member and the driven member of the clutch are engaged with each other, where the target rotation speed is determined from a vehicle velocity during shifting and a gear ratio of the next gear level.

However, there arises a problem that it is difficult to engage the gear pair of the transmission mechanism which starts the power transmission by shifting with each other, depending on the timing when the engine rotation speed reaches the target rotation speed. Specifically, when the gear pair that is going to be engaged with each other after the engine rotation speed has reached the target rotation speed, the gear pair may not be smoothly engaged with each other.

SUMMARY OF THE INVENTION

Preferred embodiments of the present invention have been made in view of the above problems, and a preferred embodiment of the present invention provides a control device for a vehicle and a motorcycle with the control device that can smoothly engage a gear pair with each other while suppressing shift shock.

A control device according to a preferred embodiment of the present invention is mounted on a vehicle which includes, in a power transmission path to transmit a power of an engine, two clutches receiving the power from the engine, and two transmission mechanisms arranged downstream of the respective two clutches and including a common output shaft. Each of the two transmission mechanisms includes a first gear which rotates together with a driven member of a respective clutch, and a second gear which rotates together with the output shaft, is movable relative to the first gear, and is engageable with the first gear by a dog clutch. The control device is programmed to switch the path to transmit the power from one of the clutches and the transmission mechanisms to the other clutch and transmission mechanism according to the shift command. A first control device preferably includes a gear control unit, a rotation speed control unit, and a clutch control unit. The gear control unit brings the first gear and the second gear close to each other in the transmission mechanism that starts the power transmission according to the shift command. The rotation speed control unit is programmed to set, as a target rotation speed, an engine rotation speed corresponding to a vehicle velocity and a speed reduction ratio realized by engagement of the first gear and the second gear brought close to each other by the gear control unit and to control the engine rotation speed toward the target rotation speed. Also, the rotation speed control unit prevents the engine rotation speed from arriving at the target rotation speed until the first gear and the second gear are engaged with each other. The clutch control unit brings a clutch that starts the power transmission according to the shift command close to an engaged state, and the other clutch close to a disengaged state, when the engine rotation speed arrives at the target rotation speed.

According to the first control device, the clutch control unit brings the clutch that starts the power transmission according to the shift command close to the engaged state when the engine rotation speed arrives at the target rotation speed. For that reason, shift shock can be suppressed. Also, the rotation speed control unit prevents the engine rotation speed from arriving at the target rotation speed until the first gear and the second gear are engaged with each other. For that reason, the first gear and the second gear can be smoothly engaged with each other.

A second control device according to a preferred embodiment of the present invention is also mounted on the vehicle. The second control device preferably includes a gear control unit, a rotation speed control unit, and a clutch control unit. The gear control unit brings two gears close to each other in the transmission mechanism that starts the power transmission according to the shift command. The rotation speed control unit is programmed to set, as a target rotation speed, an engine rotation speed corresponding to the vehicle velocity and a speed reduction ratio realized by engagement of the two gears brought close to each other by the gear control unit, and to control the engine rotation speed toward the target rotation speed. The rotation speed control unit changes the engine rotation speed to a rotation speed that exceeds the target rotation speed and then prevents the engine rotation speed from returning to the target rotation speed until the two gears are engaged with each other by the gear engagement unit. The clutch control unit brings the clutch that starts the power transmission according to the shift command close to an engaged state, and the other clutch close to a disengaged state, when the engine rotation speed arrives at the target rotation speed.

According to the second control device, the clutch control unit brings the clutch that starts the power transmission according to the shift command close to the engaged state when the engine rotation speed arrives (returns) at the target rotation speed. For that reason, shift shock can be suppressed. Also, the rotation speed control unit prevents the engine rotation speed from returning to the target rotation speed until the two gears are engaged with each other after changing the engine rotation speed up to a rotation speed exceeding the target rotation speed. For that reason, the first gear and the second gear can be smoothly engaged with each other.

A third control device according to a preferred embodiment of the present invention is also mounted on the vehicle. The third control device preferably includes a gear control unit, a collision determination unit, a rotation speed control unit, and a clutch control unit. The gear control unit brings the first gear and the second gear close to each other in the transmission mechanism that starts the power transmission according to the shift command. The collision determination unit determines whether or not or not dog clutches thereof collide with each other without engagement of the first gear and the second gear which are brought close to each other by the gear control unit. The rotation speed control unit is programmed to set, as a target rotation speed, an engine rotation speed corresponding to a vehicle velocity and a speed reduction ratio realized by the engagement of the first gear and the second gear brought close to each other by the gear control unit. The target rotation speed controls the engine rotation speed toward the target rotation speed. When the dog clutches collide with each other, the rotation speed control unit changes the engine rotation speed to move away from the target rotation speed. The clutch control unit brings the clutch that starts the power transmission according to the shift command close to the engaged state, and the other clutch close to the disengaged state, when the engine rotation speed arrives at the target rotation speed.

According to the third control device, the clutch control unit brings the clutch that starts the power transmission according to the shift command close to the engaged state when the engine rotation speed arrives at the target rotation speed. For that reason, shift shock can be suppressed. Also, when the dog clutches collide with each other between the first gear and the second gear, the rotation speed control unit changes the engine rotation speed to move away from the target rotation speed. For that reason, even if the dog clutches collide with each other, the first gear and the second gear can be engaged with each other with elimination of the collision in a short time.

A motorcycle according to a preferred embodiment of the present invention includes any one of the first control device, the second control device, and the third control device.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a block diagram illustrating a configuration of the motorcycle.

FIGS. 5A and 5B are timing charts illustrating an example of a power-on shift-down control executed by the control device according to a first preferred embodiment of the present invention.

FIGS. 6A and 6B are timing charts illustrating an example of a power-off shift-up control executed by the control device according to the first preferred embodiment of the present invention.

FIGS. 15A and 15B are timing charts illustrating an example of a change in an engine rotation speed according to the modified example illustrated in FIG. 14, in which the power-on shift-down control is illustrated.

FIG. 17 is a block diagram illustrating a function provided in a control device in another example of the first preferred embodiment of the present invention.

FIG. 20 is a flowchart illustrating an example of a process to be executed in a return control of the engine rotation speed.

FIG. 23 is a flowchart illustrating an example of a process to be executed by the control device according to the second preferred embodiment of the present invention.

FIGS. 24A and 24B are timing charts illustrating an outline of a power-on shift-down control according to a modified example of the second preferred embodiment of the present invention.

DETAILED DESCRIPTION OF THE PREFERRED EMBODIMENTS

Figure 1:
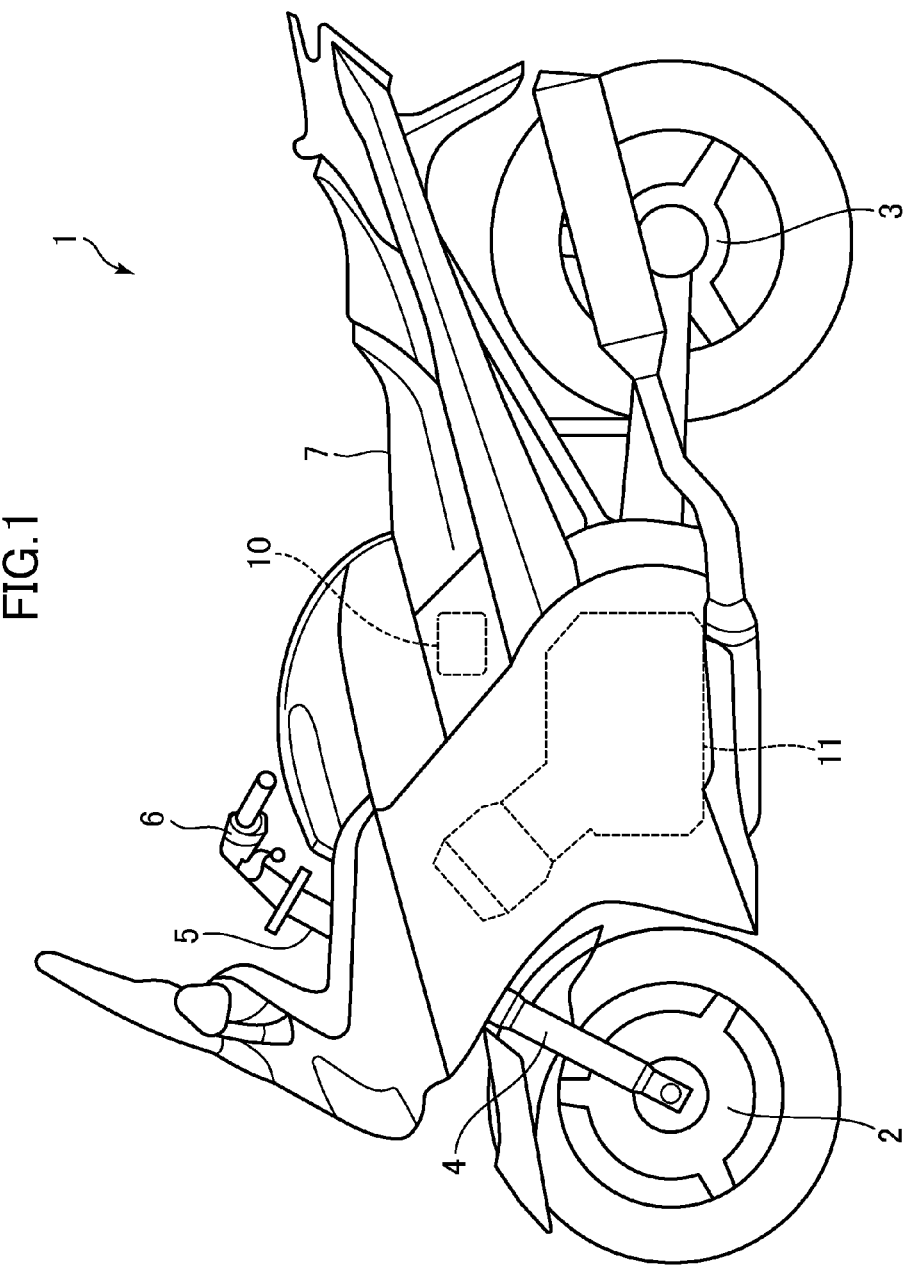
FIG. 1 is a side view of a motorcycle including a control device according to a preferred embodiment of the present invention.
Figure 2:
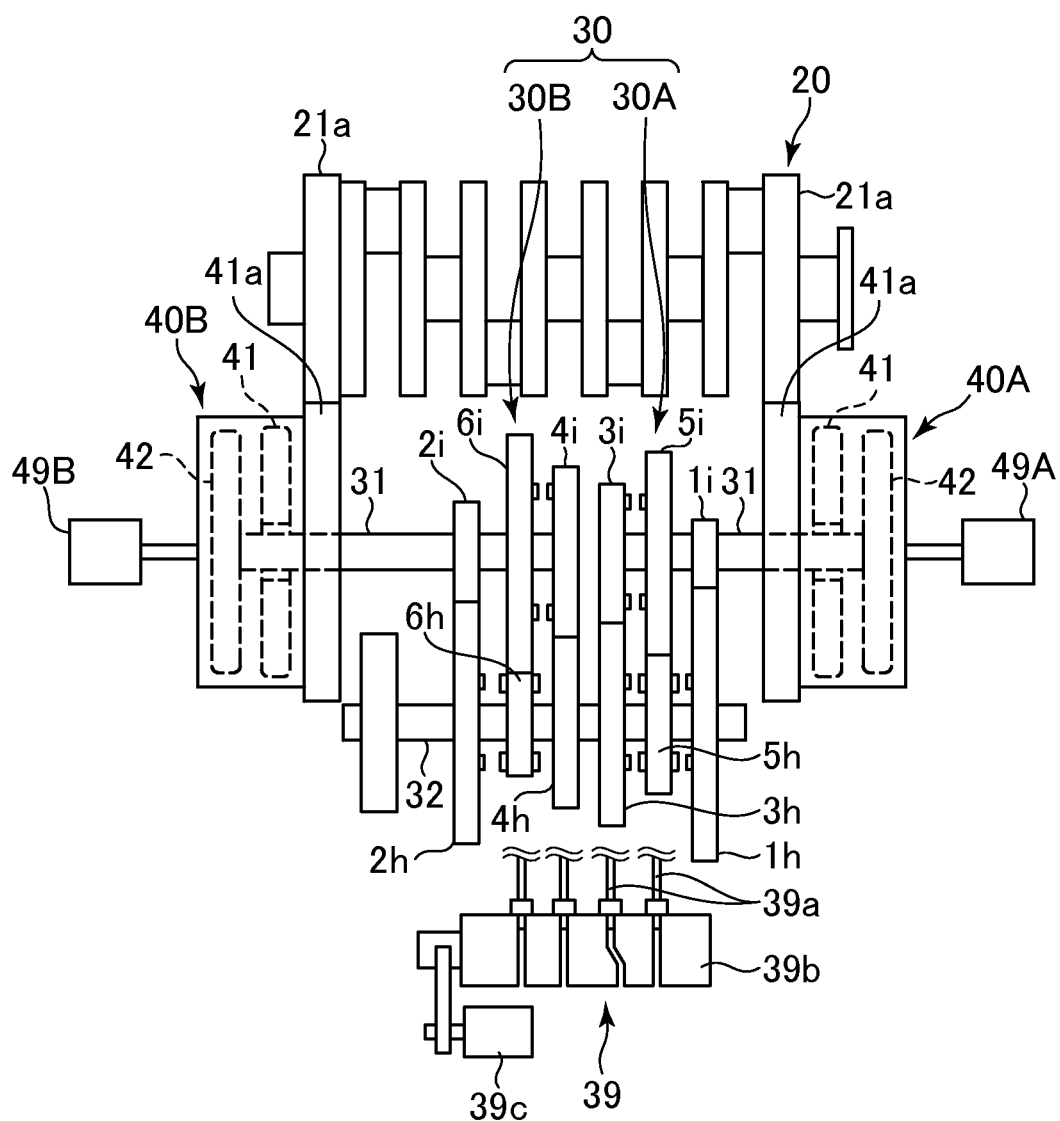
FIG. 2 is a schematic diagram of a mechanism provided in a torque transmission path extending from an engine to a rear wheel.

Hereinafter, preferred embodiments of the present invention will be described with reference to the drawings. FIG. 1 is a side view of a motorcycle 1 including a control device 10 according to an example of a preferred embodiment of the present invention. FIG. 2 is a schematic diagram of a mechanism provided in a torque transmission path extending from an engine 20 to a rear wheel 3. FIG. 3 is a block diagram illustrating a configuration of the motorcycle 1.

As illustrated in FIG. 1, the motorcycle 1 includes a front wheel 2, the rear wheel 3, and an engine unit 11. The front wheel 2 is supported by lower ends of a front fork 4. An upper portion of the front fork 4 is coupled with a steering shaft 5 rotatably supported by a foremost portion of a vehicle body frame (not shown). A steering handle 6 is disposed above the steering shaft 5. The steering handle 6, the front fork 4, and the front wheel 2 can be rotated about the steering shaft 5 integrally from side to side.

A seat 7 which a rider straddles and sits on is arranged rearward of the steering handle 6. The rear wheel 3 is arranged in the rear of the engine unit 11. A torque output from a transmission 30 (refer to FIG. 2) is transmitted to the rear wheel 3 through a torque transmission member (not shown) such as a chain, a belt, or a drive shaft.

As illustrated in FIG. 2, the engine unit 11 includes the engine 20 and the transmission 30. The motorcycle 1 preferably is a vehicle of a so-called dual clutch type, and a first clutch 40A and a second clutch 40B are installed on the engine unit 11. The engine 20 includes a crankshaft 21 that rotates by driving the engine 20.

A torque (rotation of the crankshaft 21) of the engine 20 is input to each of the first clutch 40A and the second clutch 40B. In this example, the first clutch 40A and the second clutch 40B each include a driving member 41 that is operated simultaneously with the rotation of the crankshaft 21. In an example illustrated in FIG. 2, the crankshaft 21 includes two primary gears 21a. The driving member 41 of the first clutch 40A and the driving member 41 of the second clutch 40B are each equipped with a primary gear 41a. The primary gears 41a are engaged with the corresponding primary gears 21a.

The first clutch 40A and the second clutch 40B include driven members 42 that are interlocked with input shafts 31 of transmission mechanisms 30A and 30B which will be described below, respectively. The first clutch 40A and the second clutch 40B each include, for example, a single-plate or multi-plate friction clutch. Each driving member 41 and the corresponding driven member 42 are pushed against each other in an axial direction to transmit a torque therebetween. The driving member 41 is, for example, a friction disc, and the driven member 42 is, for example, a clutch disc.

The transmission 30 includes the first transmission mechanism 30A and the second transmission mechanism 30B. The first transmission mechanism 30A and the second transmission mechanism 30B are disposed downstream of the first clutch 40A and the second clutch 40B, respectively. That is, the respective input shafts 31 are disposed in the first transmission mechanism 30A and the second transmission mechanism 30B. The input shaft 31 of the first transmission mechanism 30A is coupled to the driven member 42 of the first clutch 40A, and the torque is input to the first transmission mechanism 30A through the first clutch 40A. The input shaft 31 of the second transmission mechanism 30B is coupled to the driven member 42 of the second clutch 40B, and the torque is input to the second transmission mechanism 30B through the second clutch 40B. The first transmission mechanisms 30A and 30B include a common output shaft 32. Thus, the motorcycle 1 includes two paths as the torque transmission paths extending from the crankshaft 21 of the engine 20 to the output shaft 32 of the transmission 30. A first path is configured by the first transmission mechanism 30A and the first clutch 40A, and a second path is configured by the second transmission mechanism 30B and the second clutch 40B. The output shaft 32 of the transmission 30 is coupled to an axle shaft of the rear wheel 3 through the torque transmission member including a chain, a belt, or a shaft.

The first transmission mechanism 30A and the second transmission mechanism 30B include a plurality of gears $1i$ to $6i$ and $1h$ to $6h$. The gears $1i$ to $6i$ are disposed on the input shafts 31, and the gears $1h$ to $6h$ are disposed on the output shaft 32. The gear $1i$ and the gear $1h$ are engaged with each other, and a speed reduction ratio of those gears corresponds to a first gear level. Likewise, the gears $2i$ to $6i$ are engaged with the gears $2h$ to $6h$, respectively, and the respective reduction ratios of those gears correspond to second to sixth gear levels. In this example, the first transmission mechanism 30A is configured by the gears $1i$, $3i$, $5i$, $1h$, $3h$, and $5h$ corresponding to odd gear levels, and the second transmission mechanism 30B is configured by the gears $2i$, $4i$, $6i$, $2h$, $4h$, and $6h$ corresponding to even gear levels.

The transmission mechanisms 30A and 30B are transmission mechanisms of a so-called selective slide type. Any one of the gear pairs (for example, the gear $1i$ and the gear $1h$) corresponding to each gear level is rotatable relative to a shaft on which the one gear is disposed. On the other hand, the other gear is spline-connected to a shaft on which the other gear is disposed, and rotates together with that shaft. In this example, the gears $1h$, $5i$, $3h$, $4h$, $6i$, and $2h$ are rotatable relative to the respective shafts on which those gears are disposed. On the other hand, the gears $1i$, $5h$, $3i$, $4i$, $6h$, and $2i$ are meshed with the respective shafts on which those gears are disposed, and rotate together with those shafts. For that reason, in a neutral state (state in which none of gear levels is set), the gear pairs (5$i$, 5$h$) and (6$i$, 6$h$) are interlocked with the output shaft 32, and the gear pairs (1$i$, 1$h$), (3$i$, 3$h$), (4$i$, 4$h$), and (2$i$, 2$h$) are interlocked with the input shaft 31.

The gears interlocked with the input shaft 31 and the gears interlocked with the output shaft 32 are arranged to be adjacent to each other in the axial direction, and also relatively movable in the axial direction (movable in an approaching direction and in a direction away from each other). Also, the plurality of gears 1$i$ to 6$i$ and 1$h$ to 6$h$ include the gears including a dog clutch provided therein. The gears interlocked with the input shaft 31 and the gears interlocked with the output shaft 32 are engaged with each other by the dog clutch. With the engagement of those two gears, the rotation (torque) of the input shaft 31 of the first transmission mechanism 30A or the input shaft 31 of the second transmission mechanism 30B is transmitted to the output shaft 32. In the example of FIG. 2, the gears 5$h$, 3$i$, 4$i$, and 6$h$ are movable in the axial direction.

As illustrated in FIG. 2, the transmission 30 is equipped with a shift actuator 39 that moves the gears 5$h$, 3$i$, 4$i$, and 6$h$ (hereinafter referred to as "movable gears") movable in the axial direction, in the axial direction. The shift actuator 39 includes a plurality of shift forks 39$a$ caught by the movable gears, a shift cam 39$b$ that moves the shift forks 39$a$ in the axial direction by rotation, and an electric motor 39$c$ that generates a power to rotate the shift cam 39$b$. The shift actuator 39 moves the movable gears under the control of the control device 10, and switches the gear level to another.

The clutches 40A and 40B are equipped with clutch actuators 49A and 49B that move the clutches 40A and 40B under the control of the control device 10 (that is, the clutches 40A and 40B are brought into an engaged state or into a disengaged state). The clutch actuators 49A and 49B each include, for example, an electric motor. The power of each electric motor is transmitted to any one of the driving member 41 and the driven member 42 in each of the clutches 40A and 40B through a hydraulic pressure or a rod to push the driving member 41 and driven member 42 against each other in the axial direction.

As illustrated in FIG. 3, the engine 20 is equipped with a fuel injection device 22, a throttle actuator 23, and an ignition plug 24. The fuel injection device 22 supplies a fuel which is burned in a combustion chamber of the engine 20 to the engine 20. The throttle actuator 23 controls the opening degree of a throttle valve (not shown) to adjust the amount of air flowing in an intake passage of the engine 20. The ignition plug 24 ignites a mixture gas of air and fuel pouring into the combustion chamber of the engine 20. The fuel injection amount of the fuel injection device 22, the ignition timing of the ignition plug 24, and the opening degree (hereinafter referred to as "throttle opening degree") of the throttle valve, are controlled by the control device 10.

The motorcycle 1 includes an engine rotation speed sensor 19$a$, a gear position sensor 19$b$, clutch sensors 19$c$, 19$d$, an output side rotation sensor 19$e$, a shift switch 19$f$, and an accelerator sensor 19$g$. Those sensors are connected to the control device 10.

The engine rotation speed sensor 19$a$ preferably is a rotation sensor that outputs a pulse signal of a frequency corresponding to an engine rotation speed. The control device 10 calculates the engine rotation speed (rotation speed of the crankshaft 21) on the basis of an output signal of the engine rotation speed sensor 19$a$.

The gear position sensor 19$b$ is configured by a potentiometer that outputs a voltage signal corresponding to a rotation angle of, for example, the shift cam 39$b$. The control device 10 detects positions of the movable gears 5$h$, 3$i$, 4$i$, and 6$h$, and the present gear level on the basis of an output signal of the gear position sensor 19$b$.

The output side rotation sensor 19$e$ is disposed on the axle shaft of the rear wheel 3, or the output shaft 32. The output side rotation sensor 19$e$ is a rotation sensor that outputs a pulse signal of a frequency corresponding to, for example, the rotation speed of the rear wheel 3, or the rotation speed of the output shaft 32. The control device 10 calculates the vehicle velocity and the rotation speed of the output shaft 32 on the basis of the output signal of the output side rotation sensor 19$e$.

The shift switch 19$f$ is a switch operated by a rider, and inputs a shift command (a signal indicative of a shift-up command to shift up the gear level, or a signal indicative of a shift-down command to shift down the gear level) of the rider to the control device 10. The shift switch 19$f$ is equipped with a shift-up switch and a shift-down switch.

The accelerator sensor 19$a$ outputs a signal corresponding to the amount of operation (rotation angle) of an accelerator grip (not shown) equipped in the steering handle 6. The accelerator sensor 19$g$ is configured by, for example, a potentiometer. The control device 10 detects the amount of operation (accelerator operation amount) of the accelerator grip on the basis of the output signal of the accelerator sensor 19$g$.

The clutch sensor 19$c$ is a sensor to detect a transmitted torque capacity (transmittable maximum torque in a present state (that is, present engagement degree) of the first clutch 40A) of the first clutch 40A. Also, the clutch sensor 19$d$ is a sensor to detect a transmitted torque capacity (transmittable maximum torque in a present state (that is, present engagement degree) of the second clutch 40B) of the second clutch 40B. The transmitted torque capacity becomes maximum when the clutches 40A and 40B are in the engaged state, and the transmitted torque capacity becomes minimum (for example, 0 Nm) when the clutches 40A and 40B are in a disengaged state.

The transmitted torque capacity corresponds to the positions (stroke quantities of the clutches) of the clutches 40A and 40B. The clutch sensors 19$c$ and 19$d$ are potentiometers that output signals (signals corresponding to the operation quantities of the clutch actuators 49A and 49B) corresponding to the positions of, for example, the clutches 40A and 40B. The control device 10 detects the transmitted torque capacities from the clutch positions detected on the basis of the output signals of the clutch sensors 19$c$ and 19$d$. For example, the control device 10 calculates the transmitted torque capacities from the detected clutch positions with the use of a map or an arithmetic expression that associate the clutch positions with the transmitted torque capacities.

In a structure in which the clutch actuators 49A and 49B actuate the clutches 40A and 40B by a hydraulic oil, the transmitted torque capacities correspond to the hydraulic pressures (hereinafter referred to as "clutch pressures") exerted on the clutches 40A and 40B. In such a structure, the clutch sensors 19$c$ and 19$d$ are hydraulic sensors that output signals corresponding to the clutch pressures. In this case, the control device 10 calculates the transmitted torque capacities from the clutch pressures detected on the basis of the outputs of the clutch sensors 19$c$ and 19$d$. For example, the control device 10 calculates the transmitted torque capacities according to the detected clutch pressures with the use of the map or the arithmetic expression that associates the clutch pressures with the transmitted torque capacities.

Also, the transmitted torque capacities correspond to forces (pushing force exerted between the driving member 41 and the driven member 42) exerted on the clutches 40A and 40B from the clutch actuators 49A and 49B. With the forces exerted on the clutches 40A and 40B from the clutch actuators 49A and 49B, portions (for example, cases of the clutches 40A and 40B) are subjected to strain forces. Under these circumstances, the clutch sensors 19c and 19d may be strain sensors that output signals corresponding to the magnitudes of the strain of the portions on which the force is exerted from the clutches 40A and 40B. In this case, the control device 10 calculates the transmitted torque capacities from the strains detected on the basis of the output signals of the clutch sensors 19c and 19d. For example, the control device 10 calculates the transmitted torque capacities from the detected strain with the use of the map or the arithmetic expression which associates the strains of the clutches with the transmitted torque capacities.

The control device 10 includes a CPU (central processing unit), and a memory such as a ROM (read only memory) or a RAM (random access memory). The control device 10 executes programs stored in the memory by the CPU, and controls the engine 20, the transmission 30, and the clutches 40A, 40B according to the programs.

Specifically, the control device 10 sets a target value (hereinafter referred to as "target engine torque") for the output torque of the engine 20. The control device 10 drives the throttle actuator 23, the fuel injection device 22, and the ignition plug 24 so that an actual output torque becomes the target engine torque. Also, the control device 10 sets target values (hereinafter referred to as "transmitted torque capacities) for the transmitted torque capacity of the first clutch 40A and the transmitted torque capacity of the second clutch 40B, and actuates the clutch actuators 49A and 49B so that the actual transmitted torque capacities become the target torque capacities. Further, the control device 10 actuates the shift actuator 39 so that the gear levels set in the first transmission mechanism 30A and the second transmission mechanism 30B respond to the shift command.

The control device 10 includes a plurality of control modes as the transmission control. A first control mode is a shift-down control (hereinafter referred to as "power-on shift-down control") in a state where an accelerator is opened. A second control mode is a shift-up control (hereinafter referred to as "power-off shift-up control") in a state where the accelerator is closed. Also, the control device 10 includes the shift-down control in the state where the accelerator is closed, and the shift-up control in the state where the accelerator is opened, as other control modes. In this preferred embodiment, the control device 10 controls the clutches 40A and 40B and the output torque of the engine 20 so that movable gears and fixed gears are smoothly engaged with each other in the power-on shift-down control and the power-off shift-up control. The control of the control device 10 will be described below.

An outline of the transmission control will be described. In the following description, the clutch that transmits the torque of the engine 20 before shifting is referred as the previous clutch, and the other clutch (that is, the clutch that starts to transmit the torque of the engine 20 according to the shift command) is referred as the next clutch. Likewise, the transmission mechanism that transmits the torque of the engine 20 before shifting is the previous transmission mechanism, and the other transmission mechanism (that is, the transmission mechanism that starts to transmit the torque of the engine 20 according to the shift command) is the next transmission mechanism.

FIGS. 4A to 4D are diagrams illustrating an outline of a transmission control. In FIGS. 4A to 4D, the transmission mechanisms 30A, 30B, and the clutches 40A, 40B illustrated in FIG. 2 are further simplified for illustration. In FIGS. 4A to 4D, a clutch Cp is a previous clutch, and a clutch Cn is a next clutch. Also, a transmission mechanism Tp is a previous transmission mechanism, and a transmission mechanism Tn is a next transmission mechanism. Also, a gear Gp1 of the previous transmission mechanism Tp represents a movable gear (5h, 3i, 4i, or 6h) that transmits the torque in the previous gear level, and a gear Gp2 represents a fixed gear (1h, 5i, 3h, 4h, 6i, or 2h) that transmits the torque in the previous gear level. Further, a gear Gn1 of the next transmission mechanism Tn represents a movable gear that transmits the torque in the next gear level, and a gear Gn2 represents a fixed gear that transmits the torque in the next gear level. In FIGS. 4A to 4D, for simplification, one set of movable gears Gp1, Gn1, and one set of fixed gears Gp2, Gn2 are illustrated. In FIGS. 4A to 4D, the fixed gears Gp2 and Gn2 are fixed to the output shaft 32 (that is, splined to the output shaft 32), and rotate integrally with the output shaft 32. The movable gears Gp1 and Gn1 can be freely rotated relative to the output shaft 32. Also, the movable gears Gp1 and Gn1 are meshed with gears Gp3 and Gn3 fixed to the input shaft 31, respectively, and are operated simultaneously with the rotations of the gears Gp3, Gn3, the input shaft 31.

Figure 4A:
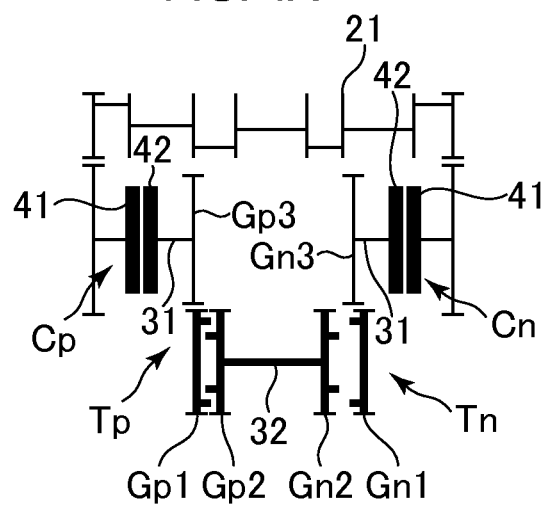
FIGS. 4A-4D are diagrams illustrating an outline of a transmission control, in which the transmission mechanism and clutches illustrated in FIG. 2 are further simplified for illustration.

As illustrated in FIG. 4A, in a normal running, the two clutches Cp and Cn are set in the engaged state (state in which the transmitted torque capacity is maximum). In the previous transmission mechanism Tp, the movable gear Gp1 and the fixed gear Gp2 corresponding to the previous gear level are engaged with each other by the dog clutch. Also, in the next transmission mechanism Tn, all of the movable gears are arranged in the neutral position (position where none of the movable gears is engaged with any fixed gear). For that reason, the torque of the engine 20 is transmitted to the rear wheel 3 through one path (previous clutch Cp and the previous transmission mechanism Tp) of the two torque transmission paths. In the other path, the torque transmission is interrupted in the next transmission mechanism Tn.

When the shift command is issued, the control device 10 switches the path to transmit the torque from one to the other. That is, the control device 10 engages the movable gear Gn1 of the next transmission mechanism Tn with the fixed gear Gn2, and sets the movable gear Gp1 of the previous transmission mechanism Tp in the neutral position. The transmission mechanisms Tp, Tn, and the clutch Cp, Cn are moved under the transmission control as follows.

Figure 4B:
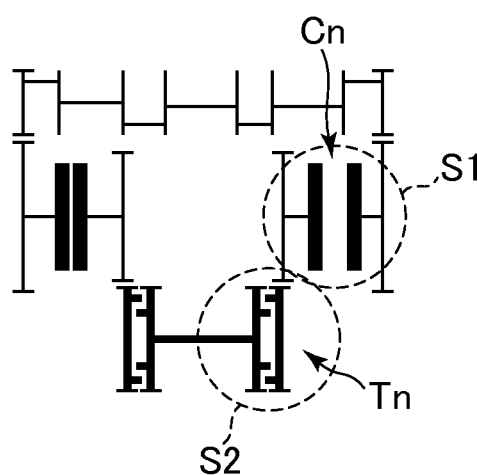

(S1) First, the control device 10 releases the engagement of the next clutch Cn (refer to FIG. 4B).

(S2) Then, the control device 10 moves the movable gear Gn1 of the next transmission mechanism Tn, and engages the movable gear Gn1 with the adjacent fixed gear Gn2 (refer to FIG. 4B).

Figure 4C:
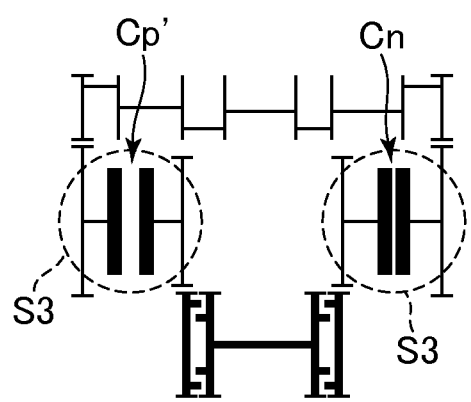

(S3) Thereafter, the control device 10 returns the next clutch Cn to the engaged state from the disengaged state, and brings the previous clutch Cp into the disengaged state (refer to FIG. 4C).

Figure 4D:
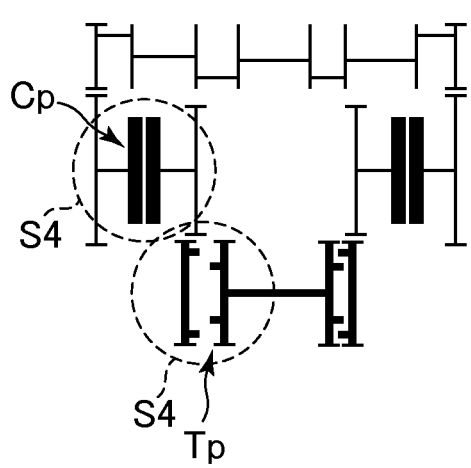

(S4) Finally, the control device 10 brings the previous clutch Cp into the engaged state after moving the movable gear Gp1 of the previous transmission mechanism Tp up to the neutral position (refer to FIG. 4D).

S3 is executed in a state where the movable gears Gp1, Gn1 are engaged with the fixed gears Gp2, Gn2 in both of the previous transmission mechanism Tp and the next transmission mechanism Tn (in a state where the torque transmission can be conducted), respectively. For that reason, a period when the torque transmission to the rear wheel 3 is interrupted during shifting can be reduced.

In the vehicle including two clutches in the power transmission path that leads to the output shaft 32, in order to suppress an increase or decrease (shift shock) in the driving force of the rear wheel 3 during shifting, a control (so-called inertia phase, hereinafter referred to as "rotation speed adjustment control") to allow the rotation speed of the driving member 41 to match the rotation speed of the driven member 42 in the next clutch Cn is required in some cases before the process of S3. Specifically, in the above-mentioned power-on shift-down and power-off shift-up, this rotation speed adjustment control is necessary. In the rotation speed adjustment control, the control device 10 increases or decreases the actual engine rotation speed toward the engine rotation speed (hereinafter referred to as "next gear level corresponding speed Stg") corresponding to the vehicle velocity during shifting, and the reduction ratio of the next gear level (reduction ratio realized by engagement of the movable gear Gn1 and the fixed gear Gn2). In this example, the next gear level corresponding speed Stg is, for example, vehicle velocity×reduction ratio of next gear level×primary reduction gear (reduction ratio of the primary gears 21a and 41a). When the engine rotation speed matches the next gear level corresponding speed Stg, and the movable gear Gn1 and the fixed gear Gn2 are engaged with each other (process of S2), the rotation speed of the driving member 41 becomes equal to the rotation speed of the driven member 42 in the next clutch Cn. In this state, if the driving member 41 and the driven member 42 are engaged with each other in the process of S3, shift shock is suppressed.

However, some time is required for movement of the movable gear Gn1. For that reason, when the movement of the movable gear Gn1 toward the fixed gear Gn2, and an increase or decrease of the engine rotation speed (that is, rotation speed adjustment control) start at the same timing, the engine rotation speed may arrive at the gear level corresponding speed before the engagement of the movable gear Gn1 and the fixed gear Gn2 has been completed in the process of S2. This makes it difficult to smoothen the engagement of the movable gear Gn1 with the fixed gear Gn2.

Hereinafter, this problem will be described. During the rotation speed adjustment control, as a result of the process of S1, the next clutch Cn is in the disengaged state. However, even if the next clutch Cn is in the disengaged state, the rotation can be transmitted from the driving member 41 to the driven member 42 by the aid of a partial contact of the driving member 41 and the driven member 42, or the viscosity of oil. Also, when the movable gear Gn1 is not engaged with the fixed gear Gn2 (all of the fixed gears provided in the next transmission mechanism Tn), the rotation speeds of the driven member 42 and the input shaft 31 in the next clutch Cn which is in the disengaged state can be easily changed. For that reason, when the engine rotation speed is increased or decreased before the movable gear Gn1 and the fixed gear Gn2 are engaged with each other, the rotation speeds of the driven member 42, the input shaft 31, and the movable gear Gn1 are also increased or decreased along with the rotation speed of the driving member 41. Then, when the engine rotation speed arrives at the next gear level corresponding speed Stg before the engagement of the movable gear Gn1 and the fixed gear Gn2 has been completed, the rotation speed of the movable gear Gn1 becomes equal to the rotation speed of the fixed gear Gn2. When the movable gear Gn1 is abutted against the fixed gear Gn2, and a dog tooth of the dog clutch collides with a position different from a dog hole (when collision of the dog clutch occurs) in a state where the movable gear Gn1 and the fixed gear Gn2 rotate at the same speed, since a relative position of the dog tooth and the dog hole is not changed, it is difficult to smoothly engage the movable gear Gn1 with the fixed gear Gn2.

First Preferred Embodiment

Under the circumstances described above, the control device 10 executes the rotation speed adjustment control so that timing at which the movable gear Gn1 is abutted against the fixed gear Gn2 in the next transmission mechanism Tn in the process of S2 does not coincide with timing at which the engine rotation speed arrives at the next gear level corresponding speed Stg. Specifically, in a first preferred embodiment, the control device 10 prevents the engine rotation speed from arriving at the next gear level corresponding speed Stg until the movable gear Gn1 of the next transmission mechanism In is engaged with the fixed gear Gn2. For example, the control device 10 starts the rotation speed adjustment control after the movable gear Gn1 has been engaged with the fixed gear Gn2. Also, in another example, the rotation speed control unit 10g maintains the engine rotation speed at a rotation speed away from the next gear level corresponding speed Stg until the movable gear Gn1 is engaged with the fixed gear Gn2.

FIGS. 5A and 5B are timing charts illustrating an example of a power-on shift-down control executed by the control device 10. In FIG. 5A, a solid line represents an example of a change in an engine rotation speed Se. Also, in FIG. 5A, a dashed line represents an example of a change in a rotation speed Stn of the input shaft 31 in the next transmission mechanism Tn, and a two-dot chain line represents a rotation speed Stp of the input shaft 31 in the previous transmission mechanism Tp. Each of values indicated by the dashed line and the two-dot chain line is a product of the rotation speed of the input shaft 31 and a primary reduction ratio. In FIG. 5B, a solid line represents an example of a change in a target engine torque Te. In FIG. 5B, a dashed line represents an example of a change in a target value (that is, target torque capacity) Tch of the transmitted torque capacity of the next clutch Cn, and a two-dot chain line represents an example of a change in a target torque capacity Tcp of the previous clutch Cp. In FIG. 5B, each of values indicated by the dashed line and the two-dot chain line is a value obtained by dividing each torque capacity by a primary reduction ratio.

As illustrated in FIG. 5B, at t1 when a shift command of the power-on shift-down is generated, the control device 10 changes the next clutch Cn from the engaged state to the disengaged state. In this example, the engaged state is a state in which the transmitted torque capacity becomes maximum. Also, the disengaged state is a state in which the transmitted torque capacity becomes minimum (for example, 0 Nm). Therefore, the control device 10 minimizes a target torque capacity Tcn of the next clutch Cn at t1.

Also, at t1, the control device 10 instructs the shift actuator 39 to move the movable gear Gn1 of the next transmission mechanism Tn toward the fixed gear Gn2 (output of a gear engagement command). As a result, the movable gear Gn1 of the next transmission mechanism Tn starts to move toward the fixed gear Gn2. In this example, the engagement of the movable gear Gn1 with the fixed gear Gn2 has been completed at t2. When the movable gear Gn1 is engaged with the fixed gear Gn2, the rotation speed Stn of the input shaft 31 in the next transmission mechanism Tn increases up to a speed corresponding to the vehicle velocity at that time and the reduction ratio of the next gear level as illustrated in FIG. 5A.

After detecting that the movable gear Gn1 is engaged with the fixed gear Gn2, the control device 10 starts the control (the above-mentioned rotation speed adjustment control) to change the engine rotation speed Se toward the next gear level corresponding speed Stg (t3). Thus, since the control device 10 starts the rotation speed adjustment control after the movable gear Gn1 has been engaged with the fixed gear Gn2, a timing when the movable gear Gn1 collides with the fixed gear Gn2 can be prevented from matching a timing when the engine rotation speed Se arrives at the next gear level corresponding speed Stg. As a result, the movable gear Gn1 and the fixed gear Gn2 come close to each other in a state where a rotation speed difference is present between those gears, and can be smoothly engaged with each other.

In the example illustrated in this figure, the control device 10 executes the following rotation speed adjustment control. As illustrated in FIG. 5B, the control device 10 increases the target engine torque Te of the engine 20 (t3). In this example, in a normal engine control (engine control conducted except for a time when the rotation speed adjustment control is executed), a value corresponding to the accelerator operation amount detected by the accelerator sensor 19g is set as the target engine torque Te, and the engine 20 is controlled to output the target engine torque Te (in the following description, the target engine torque corresponding to the accelerator operation amount is set as the reference target torque). On the contrary, in the rotation speed adjustment control, as indicated at t3 to t4 in FIG. 5B, a value higher than the reference target torque is set as the target engine torque Te, and the engine 20 is controlled to output the high target engine torque Te. Also, the control device 10 transitions the previous clutch Cp to a semi-engaged state which is a state between the engaged state and the disengaged state (t3). Specifically, the control device 10 decreases the target torque capacity Tcp of the previous clutch Cp to a capacity corresponding to the reference target torque. In this example, the capacity corresponding to the reference target torque is a capacity (reference target torque×primary reduction ratio) sufficient to transmit the reference target torque. Also, the control device 10 minimizes the target torque capacity Tcn of the next clutch Cn, and maintains the next clutch Cn in the disengaged state. With the above configuration, an increment (ΔT in FIG. 5B) of the target engine torque Te relative to the reference target torque operates as the torque to increase the engine rotation speed Se. As a result, as illustrated in FIG. 5A, the engine rotation speed Se starts to increase. Thereafter, the engine rotation speed Se arrives at the next gear level corresponding speed Stg (t4).

When the engine rotation speed Se arrives at the next gear level corresponding speed Stg, the control device 10 terminates the rotation speed adjustment control, and thereafter executes a control (path switching control) to switch the path to transmit the torque of the engine 20 to the other path. Specifically, the control device 10 minimizes the target torque capacity Tcp of the previous clutch Cp, and transitions the previous clutch Cp to the disengaged state (t5). Also, the control device 10 transitions the next clutch Cn from the disengaged state to the engaged state. In the example of this figure, the control device 10 temporarily sets the target torque capacity Tcn of the next clutch Cn to a capacity (real engine torque×primary reduction ratio) corresponding to the present real engine torque (torque actually output by the engine 20) (t6).

When the next clutch Cn and the previous clutch Cp arrive at the respective target states, the control device 10 starts the movement (movement in a direction away from the fixed gear Gp2) toward the neutral position of the movable gear Gp1 of the previous transmission mechanism Tp. That is, the control device 10 outputs a gear disengagement command to the shift actuator 39. As a result, in the example of the figure, at t7, the movable gear Gp1 is moved away from the fixed gear Gp2, and eliminates their engagement. When the engagements thereof are disengaged, the driven member 42 of the previous clutch Cp and the input shaft 31 of the previous transmission mechanism Tp start to be operated simultaneously with the rotation of the crankshaft 21 and the driving member 41. As a result, the rotation speed of the input shaft 31 in the previous transmission mechanism Tp increases up to a speed corresponding to the engine rotation speed (specifically, the next gear level corresponding speed Stg) and the primary reduction ratio.

Finally, the control device 10 returns the previous clutch Cp and the next clutch Cn to the engaged state. That is, the control device 10 maximizes the target torque capacities Tcp and Tcn thereof. With this operation, the transmission control is terminated.

FIGS. 6A and 6B are timing charts illustrating an example of a power-off shift-up control executed by the control device 10. In FIGS. 6A and 6B, the contents indicated by the respective types of lines are preferably identical with those in FIGS. 5A and 5B. In the power-off shift-up, because the accelerator operation amount is close to the minimum value, the reference target torque is a negative value.

As illustrated in FIG. 6B, at t1 when the shift command of the power-off shift-up is issued, the control device 10 minimizes the target torque capacity Tcn of the next clutch Cn as in the case of the power-on shift-down control. Also, the control device 10 outputs the gear engagement command at t1. As a result, the movable gear Gn1 of the next transmission mechanism Tn starts to move toward the fixed gear Gn2. In the example of the figure, the engagement of the movable gear Gn1 with the fixed gear Gn2 has been completed at t2. As illustrated in FIG. 6A, when the movable gear Gn1 and the fixed gear Gn2 are engaged with each other, the rotation speed Stn of the input shaft 31 in the next transmission mechanism Tn decreases to a speed corresponding to the vehicle velocity and the reduction ratio of the next gear level at that time.

Similarly, in the power-off shift-up control, the control device 10 starts the rotation speed adjustment control after detecting that the movable gear Gn1 and the fixed gear Gn2 have been engaged with each other (t3). In the description, as illustrated in FIG. 6B, the control device 10 decreases the target engine torque Te of the engine 20 (t3). Specifically, a value lower than the reference target torque is set as the target engine torque Te. Also, the control device 10 sets the target torque capacity Tcp of the previous clutch Cp to a capacity corresponding to the reference target torque. Also, the control device 10 maintains the target torque capacity Tcn of the next clutch Cn at a minimum value, and maintains the next clutch Cn in the disengaged state. As a result, a decrement of the target engine torque Te relative to the reference target torque operates as the torque to decrease the engine rotation speed Se. As a result, as illustrated in FIG. 6A, the engine rotation speed Se starts to decrease. Thereafter, the engine rotation speed Se arrives at the next gear level corresponding speed Stg (t4).

After the engine rotation speed Se has arrived at the next gear level corresponding speed Stg, the control device 10 executes the path switching control (operation from t4 to t7) as with the power-on shift-down control illustrated in FIGS. 5A and 5B, and terminates the present power-off shift-up control.

Figure 7:
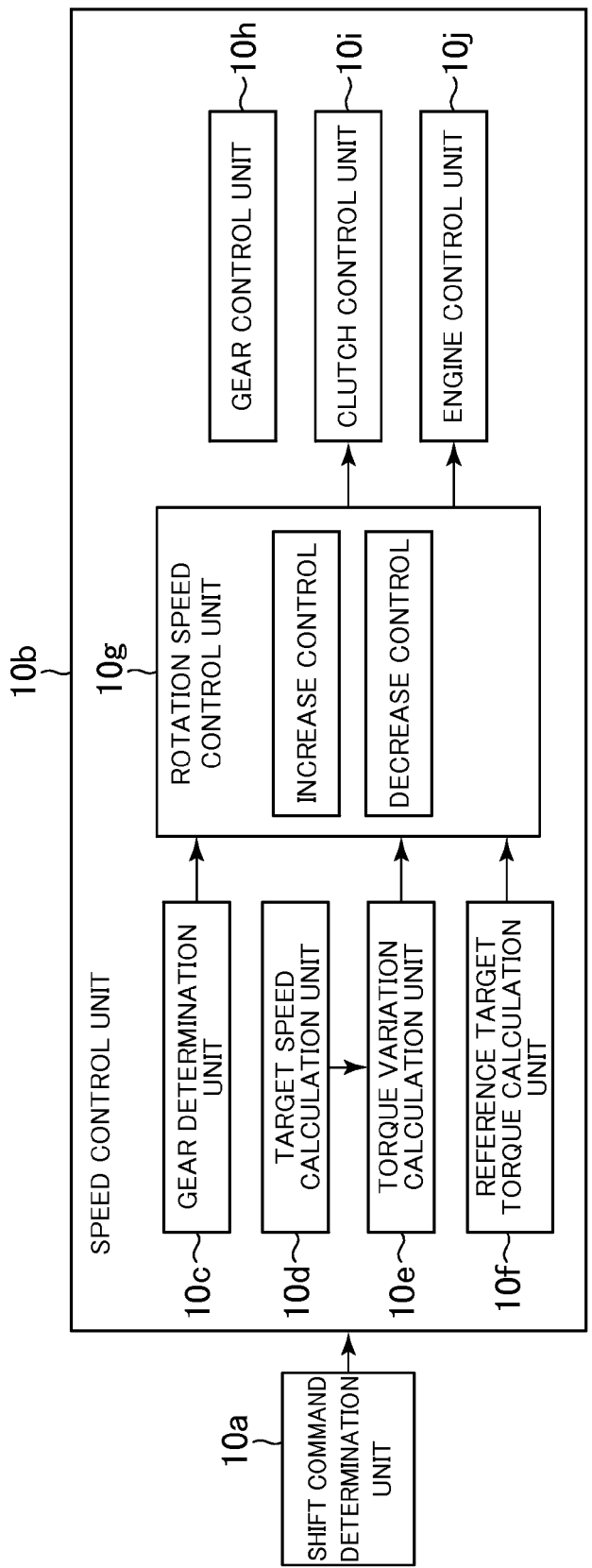
FIG. 7 is a block diagram illustrating a function of the control device.

FIG. 7 is a block diagram illustrating a function of the control device 10. As illustrated in the figure, the control device 10 includes, as its functions, a shift command determination unit 10a and a transmission control unit 10b. The transmission control unit 10b includes a gear control unit 10h, a clutch control unit 10*i*, an engine control unit 10*j*, a gear determination unit 10*c*, a target speed calculation unit 10*d*, a torque variation calculation unit 10*e*, a reference target torque calculation unit 10*f*, and the rotation speed control unit 10*g*. Those units are realized by allowing a CPU to execute programs stored in a memory of the control device 10.

The shift command determination unit 10*a* executes a process to determine a control mode to be executed according to the shift command among the above-mentioned plurality of control modes when the shift command is issued. Specifically, the shift command determination unit 10*a* determines whether or not the contents (shift-down command/shift-up command) of the shift command, and the operation state (accelerator operation amount in this example) of the vehicle when receiving the shift command meet the start conditions of the respective control modes. Then, the control mode is determined on the basis of the determination result.

In this preferred embodiment, when the shift command is the shift-down command, and the accelerator operation amount is equal to or larger than a given threshold value, the power-on shift-down control is executed by the transmission control unit 10*b*. Also, when the shift command is the shift-up command, and the accelerator operation amount is smaller than the given threshold value, the power-off shift-up control is executed by the transmission control unit 10*b*.

In this example, the shift-down command and the shift-up command, which are the shift commands, are input to the control device 10 from the shift switch 19*f* according to the operation of the shift switch 19*f* by the rider. However, the shift-down command and the shift-up command may be generated by the control device 10 on the basis of the operation state of the vehicle and the accelerator operation of the rider without operating the shift switch 19*f*. For example, when the accelerator operation amount is rapidly increased, the control device 10 may generate the shift-down command.

The transmission control unit 10*b* executes the transmission control according to the determination result of the shift command determination unit 10*a*. As described above, when the shift-down command is issued, and the accelerator operation amount is equal to or larger than the given threshold value, the transmission control unit 10*b* executes the power-on shift-down control. Also, when the shift-up command is issued, and the accelerator operation amount is smaller than the given threshold value, the transmission control unit 10*b* executes the power-off shift-up control.

The gear control unit 10*h* drives the shift actuator 39 (that is, outputs a driving power of the shift actuator 39), and selectively moves the plurality of movable gears Gp1 in the previous transmission mechanism Tp, and the plurality of movable gears Gn1 in the next transmission mechanism Tn. Then, the gear control unit 10*h* engages the movable gear Gn1 with the fixed gear Gn2 in the next transmission mechanism Tn, and also releases the engagement of the movable gear Gp1 with the fixed gear Gp2 in the previous transmission mechanism Tp.

The clutch control unit 10*i* drives the clutch actuators 49A and 49B (outputs the driving power of the clutch actuators 49A and 49B), and transitions the next clutch Cn and the previous clutch Cp to the engaged state, or the disengaged state. Also, the clutch control unit 10*i* sets the next clutch Cn and the previous clutch Cp in the semi-engaged state which is between the engaged state and the disengaged state, in a shifting process. In this preferred embodiment, the clutch control unit 10*i* moves the clutch actuators 49A and 49B so that the actual transmitted torque capacities of the previous clutch Cp and the next clutch Cn coincide with the target torque capacities Tcp and Tcn set by the rotation speed control unit 10*g*.

The engine control unit 10*j* controls the throttle opening degree, the fuel injection amount, and the ignition timing on the basis of the accelerator operation amount detected by the accelerator sensor 19*g*. In a normal engine control, the engine control unit 10*j* sets the reference target torque which is a torque corresponding to the detected accelerator operation amount as the target engine torque Te. On the other hand, in the rotation speed adjustment control, the engine control unit 10*j* sets a torque higher or lower than the reference target torque as the target engine torque Te. The engine control unit 10*j* controls the throttle opening degree so that the actual output torque of the engine 20 matches the target engine torque Te, with reference to the map stored in the memory in advance.

The gear determination unit 10*c* determines whether or not the movable gear Gn1 and the fixed gear Gn2 in the next transmission mechanism Tn are engaged with each other. For example, the gear determination unit 10*c* determines whether or not the position of the movable gear Gn1 detected by the gear position sensor 19*b* arrives at the engagement position where the movable gear Gn1 is engaged with the fixed gear Gn2. Also, the gear determination unit 10*c* may determine whether or not a state in which the movable gear Gn1 is disposed at the engagement position continues for a given time. Further, the gear determination unit 10*c* may determine whether or not the movable gear Gn1 is engaged with the fixed gear Gn2, with the use of a change in the rotation speed Stn of the input shaft 31 in the next transmission mechanism Tn. For example, the gear determination unit 10*c* may determine whether or not a difference (Sout×Rnext−Stn) between the rotation speed (Sout×Rnext) of the input shaft 31 determined according to the rotation speed (Sout) of the rear wheel 3 or the output shaft 32, and the reduction ratio (Rnext) of the next gear level, and the rotation speed Stn of the input shaft 31 in the next transmission mechanism Tn is smaller than a threshold value. Then, the gear determination unit 10*c* may determine that the two gears Gn1 and Gn2 are engaged with each other when the difference is smaller than the threshold value. Also, when the state in which the difference is smaller than the threshold value continues for a time longer than the given time, the gear determination unit 10*c* may determine that the two gears Gn1 and Gn2 are engaged with each other.

The gear determination unit 10*c* also determines whether or not the engagement of the movable gear Gp1 with the fixed gear Gp2 in the previous transmission mechanism Tp is released. This determination can be also conducted on the basis of the output signal of the gear position sensor 19*b*, or the rotation speed Stp of the input shaft 31. For example, the gear determination unit 10*c* determines whether or not the movable gear Gp1 is disposed in the neutral position on the basis of the output signal of the gear position sensor 19*b*. The gear determination unit 10*c* determines that the engagement of the movable gear Gp1 with the fixed gear Gp2 is released when the movable gear Gp1 is disposed at the neutral position, or when a state in which the movable gear Gp1 is disposed at the neutral position continues for the given time or longer.

The target speed calculation unit 10*d* calculates the engine rotation speed to be reached under the rotation speed adjustment control. That is, the target speed calculation unit 10*d* calculates the above-mentioned next gear level corresponding speed Stg. The target speed calculation unit 10*d* sets, for example, a product (Sout×Rnext×R1) of the rotation speed (Sout) of the output shaft 32 detected by the output side rotation sensor 19e before starting the rotation speed adjustment control, the reduction ratio (Rnext) of the next gear level, and the primary reduction ratio (R1) as the next gear level corresponding speed Stg.

The torque variation calculation unit 10e calculates a torque (hereinafter referred to as "necessary torque variation") necessary to increase or decrease the engine rotation speed Se toward the next gear level corresponding speed Stg in the rotation speed adjustment control. The necessary torque variation is, for example, an inertia torque of the engine 20 which is generated when increasing or decreasing the engine rotation speed Se to the next gear level corresponding speed Stg. In this case, the necessary torque variation is calculated on the basis of the actual engine rotation speed Se when starting the rotation speed adjustment control, the next gear level corresponding speed Stg, and the time (time from t3 to t4 in FIGS. 5A and 5B and FIGS. 6A and 6B, hereinafter referred to as "adjustment control time ($\Delta t$)") during which the rotation speed adjustment control is executed. The necessary torque variation is calculated on the basis of the adjustment control time to adjust the time spent for the rotation speed adjustment control. The torque variation calculation unit 10e calculates the necessary torque variation, for example, with the use of the following arithmetic expression.

Necessary torque variation=$I \times (Se-Stg)/\Delta t$ where I is an inertia moment of the engine 20 around the crankshaft 21 of the engine 20, and the inertia moment can be calculated in a stage where the engine 20 is designed.

The adjustment control time is calculated with reference to a map (hereinafter referred to as "adjustment time map" provided in, for example, control device 10. For example, in the adjustment time map, the adjustment control time is associated with the contents (previous gear level and next gear level) of the shift command and the accelerator operation amount. For example, the adjustment control time is set to be shorter as the accelerator operation amount is increased further. When the adjustment time map of this type is provided, the torque variation calculation unit 10e calculates the adjustment control time on the basis of the contents of the shift command, and the accelerator operation amount detected by the accelerator sensor 19g. The adjustment control time is not limited to this example. For example, the adjustment control time may be a fixed value. Also, the adjustment control time ($\Delta t$) may be calculated on the basis of another value indicative of the operation state of the vehicle.

The method of calculating the necessary torque variation is not limited to this example. For example, the adjustment control time may not be used for calculation of the necessary torque variation. The necessary torque variation may be calculated directly from the map that associates the accelerator operation amount and the contents of the gear levels with the necessary torque variation. Also, the necessary torque variation may be a predetermined value.

The reference target torque calculation unit 10f calculates the above-mentioned reference target torque on the basis of the accelerator operation amount. For example, the map (torque map) that associates the accelerator operation amount, the engine rotation speed, and the engine torque with each other is stored in the memory of the control device 10 in advance. The reference target torque calculation unit 10f calculates the reference target torque with reference to the torque map. That is, the reference target torque calculation unit 10f calculates the engine torque corresponding to the accelerator operation amount and the engine rotation speed Se, which are detected by the sensors, as the reference target torque. As described above, in the normal engine control, the reference target torque is set as the target engine torque Te. The reference target torque calculation unit 10f calculates the reference target torque for a given time. Therefore, not only during the normal travel, but also during shifting (including the duration of the rotation speed adjustment control), the target torque capacity Tcp of the previous clutch Cp and the target engine torque Te are gradually changed according to a change in the accelerator operation amount.

The rotation speed control unit 10g operates the engine control unit 10j and the clutch control unit 10i to execute the rotation speed adjustment control. The rotation speed control unit 10g increases or decreases the engine rotation speed Se toward the next gear level corresponding speed Stg. Specifically, during the power-on shift-down, the rotation speed control unit 10g makes the target engine torque Te larger than the reference target torque, and decreases the transmitted torque capacities of the clutches Cp and Cn. As a result, the rotation speed control unit 10g can increase the engine rotation speed Se toward the next gear level corresponding speed Stg while suppressing a fluctuation of the torque which is transmitted to the rear wheel 3. Also, during the power-off shift-up, the rotation speed control unit 10g makes the target engine torque Te smaller than the reference target torque, and decreases the transmitted torque capacities of the clutches Cp and Cn. As a result, the rotation speed control unit 10g can decrease the engine rotation speed Se toward the next gear level corresponding speed Stg while suppressing a fluctuation of the torque which is transmitted to the rear wheel 3. The rotation speed control unit 10g executes the increase control and the decrease control as the rotation speed adjustment control.

First, the increase control will be described. The increase control is a control to increase the engine rotation speed Se up to the next gear level corresponding speed Stg (control in t3 to t4 in FIGS. 5A and 5B). The rotation speed control unit 10g makes the target engine torque Te at the time of executing the increase control higher than the reference target torque by the necessary torque variation. As a result, the engine 20 outputs the torque higher than the reference target torque by the necessary torque variation in the rotation speed adjustment control. Also, the rotation speed control unit 10g sets the target torque capacity Tcp of the previous clutch Cp to a capacity corresponding to the reference target torque. In this example, the capacity corresponding to the reference target torque is, for example, a torque (reference target torque× primary reduction ratio) needed to transmit the reference target torque as described above. Also, the rotation speed control unit 10g minimizes the target torque capacity Tcn of the next clutch Cn (for example, 0 Nm). As a result, the necessary torque variation operates as the torque to increase the engine rotation speed Se.

The method for increasing the engine rotation speed Se is not limited to the above example. For example, the target engine torque Te in the increase control may be, for example, a sum of a value obtained by further correcting the reference target torque corresponding to the accelerator operation amount, and the necessary torque variation. In this case, the capacity corresponding to the corrected value is the target torque capacity Tcp of the previous clutch Cp.

The decrease control will be described. The decrease control is a control to decrease the engine rotation speed Se down to the next gear level corresponding speed Stg (control in t3 to t4 in FIGS. 6A and 6B). The rotation speed control unit 10g makes, for example, the target engine torque Te at the time of executing the decrease control lower than the reference target torque by an absolute value of the necessary torque variation. As a result, the engine 20 outputs the torque lower than the reference target torque by the necessary torque variation in the rotation speed adjustment control. When the engine rotation speed Se is decreased, the necessary torque variation becomes a negative value. For that reason, the target engine torque Te at the time of executing the decrease control can be calculated as a sum of the reference target torque and the necessary torque variation. In the decrease control, the rotation speed control unit $10g$ sets the target torque capacity Tcp of the previous clutch Cp to a capacity corresponding to the reference target torque. Also, the rotation speed control unit $10g$ minimizes the target torque capacity Tcn of the next clutch Cn (for example, 0 Nm). As a result, the necessary torque variation operates as the torque to decrease the engine rotation speed Se.

There is a case in which the sum of the reference target torque and the necessary torque variation falls below a minimum torque, for example, a case where the reference target torque is a lower limit value (hereinafter referred to as "minimum torque") of the torque that can be output by the engine 20. Also, there is a case in which the sum of the reference target torque and the necessary torque variation exceeds a maximum torque, a case where the reference target torque is an upper limit value (hereinafter referred to as "maximum torque") of the torque that can be output by the engine 20.

For that reason, in the decrease control and the increase control, the rotation speed control unit $10g$ may conduct the following process according to a magnitude of the reference target torque. In the decrease control, the rotation speed control unit $10g$ compares a sum (Tnm1+ΔTa) of a reference target torque (Tnm1) and a necessary torque variation (ΔTa) with a minimum torque. Then, the rotation speed control unit $10g$ sets any higher one as a target engine torque Te. On the other hand, in the increase control, the rotation speed control unit $10g$ compares the sum (Tnm1+ΔTa) of the reference target torque (Tnm1) and the necessary torque variation (ΔTa) with a maximum torque. Then, the rotation speed control unit $10g$ sets any lower one as the target engine torque Te. Also, the rotation speed control unit $10g$ calculates the target torque capacity Tcp of the previous clutch Cp on the basis of the target engine torque Te and the necessary torque variation. For example, a capacity (($|Te|-|\Delta Ta|$)×primary reduction ratio) corresponding to a value obtained by subtracting an absolute value of the necessary torque variation (ΔTa) from the absolute value of the target engine torque Te is set as the target torque capacity Tcp. When a sum of the reference target torque and the necessary torque variation exceeds the maximum torque or the minimum torque, the target torque capacity Tcp is thus calculated, and an exceeded amount can be compensated by a change in the torque transmitted through the previous clutch Cp.

Figure 8:
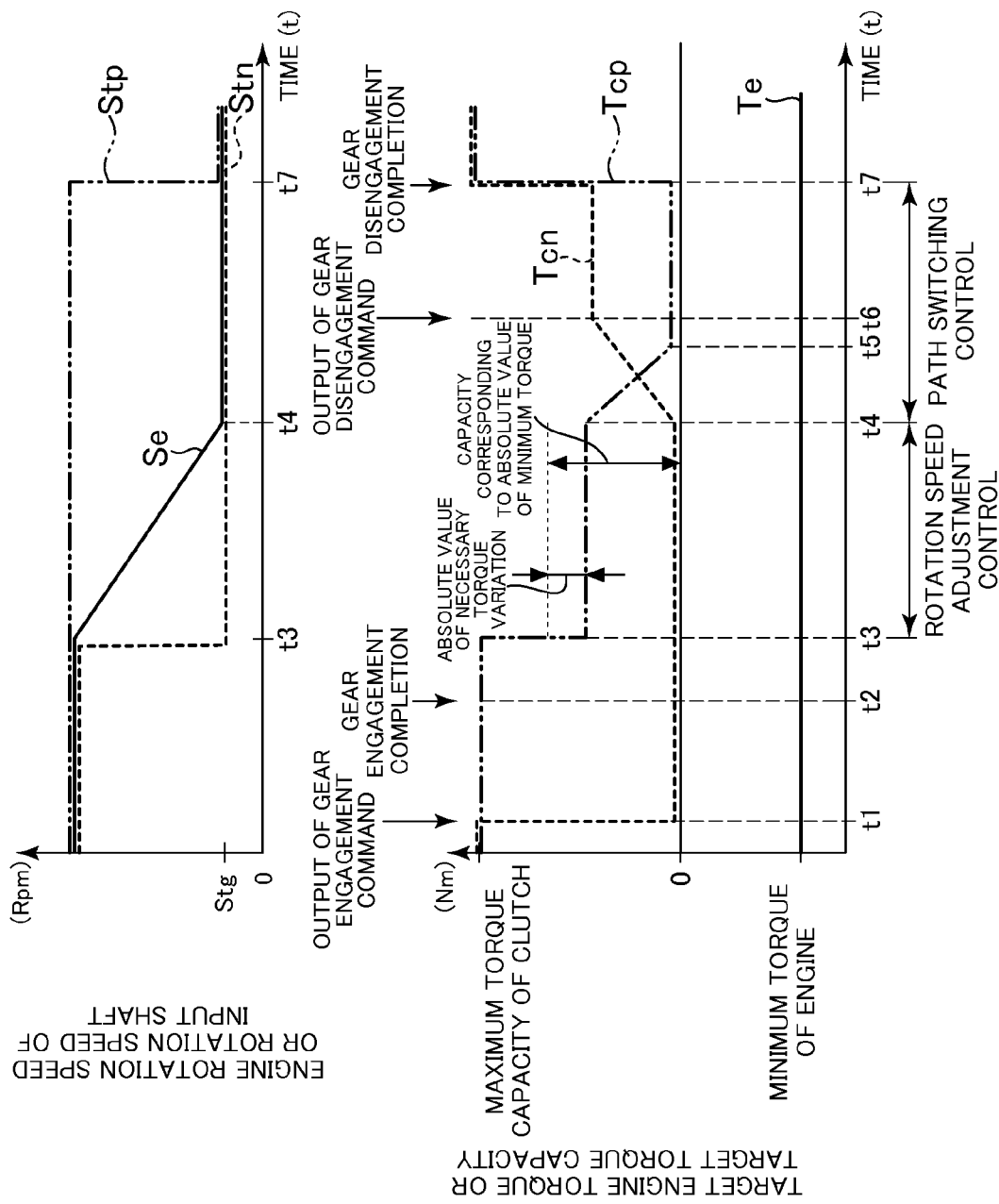
FIGS. 8A and 8B are timing charts illustrating an outline of a decrease control executed when a reference target torque is the minimum torque.

FIGS. 8A and 8B are timing charts illustrating an outline of the decrease control executed when the reference target torque is the minimum torque. Differences from the timing charts illustrated in FIGS. 6A and 6B will be mainly described.

In the example of FIGS. 8A and 8B, the minimum torque is the reference target torque corresponding to the accelerator operation amount. For that reason, in both of the normal engine control and the decrease control before the decrease control (t3 to t4) starts, the minimum torque is set as the target engine torque Te. When the decrease control starts at t3, the capacity corresponding to a value lower than the torque capacity corresponding to the minimum torque by the absolute value of the necessary torque variation is set as the target torque capacity Tcp of the previous clutch Cp. That is, the capacity needed to transmit the torque of the difference between the absolute value of the minimum torque and the absolute value of the necessary torque variation is set as the target torque capacity Tcp. With this configuration, the torque transmitted to the engine 20 from a downstream side of the previous clutch Cp is reduced to decrease the engine rotation speed Se.

Returning to FIG. 7, the function of the rotation speed control unit $10g$ will be described. The rotation speed control unit $10g$ prevents the engine rotation speed Se from arriving at the next gear level corresponding speed Stg until the movable gear Gn1 and the fixed gear Gn2 are engaged with each other. Specifically, the rotation speed control unit $10g$ executes the above-described increase control or decrease control after the engagement of the gears Gn1 and Gn2 has been completed. Also, in another example, the rotation speed control unit $10g$ temporarily suspends the above-mentioned increase control or decrease control until the engagement of the gears Gn1 and Gn2 has been completed.

As described above, the reference target torque calculation unit $10f$ calculates the reference target torque for a given time. For that reason, when the accelerator operation amount is changed during the rotation speed adjustment control, the reference target torque is also changed. In this case, the target engine torque Te set by the rotation speed control unit $10g$ is also changed, and the target torque capacity Tcp determined on the basis of the reference target torque is also changed.

Figure 9:
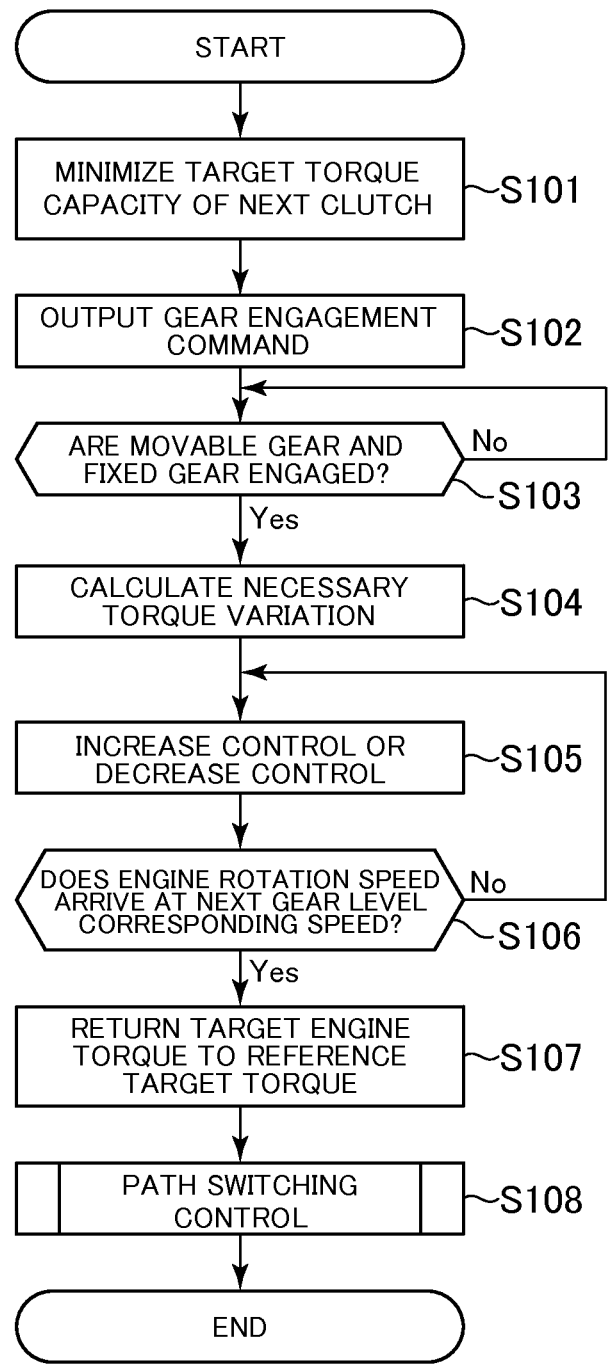
FIG. 9 is a flowchart illustrating an example of a process in the power-on shift-down control and the power-off shift-up control which is executed by the control device according to the first preferred embodiment of the present invention.

Now, a flow of a process to be executed by the control device 10 will be described. FIG. 9 is a flowchart illustrating an example of a process to be executed in the power-on shift-down control and the power-off shift-up control.

First, the clutch control unit $10i$ minimizes the target torque capacity Tcn of the next clutch Cn (S101). That is, the clutch control unit $10i$ transitions the next clutch Cn to the disengaged state. Then, the gear control unit $10h$ outputs a gear engagement command for instructing the movable gear Gn1 to move toward the fixed gear Gn2 in the next transmission mechanism Tn (S102). That is, the gear control unit $10h$ brings the movable gear Gn1 and the fixed gear Gn2 closer to each other. Then, the gear determination unit $10c$ determines whether or not the movable gear Gn1 is engaged with the fixed gear Gn2 (S103). The gear determination unit $10c$ repeats the process of S103 until the movable gear Gn1 is engaged with the fixed gear Gn2.

After it is determined that the movable gear Gn1 and the fixed gear Gn2 are engaged with each other in S103, the torque variation calculation unit $10e$ calculates the necessary torque variation (S104), and the rotation speed control unit $10g$ executes the rotation speed adjustment control (the increase control or the decrease control) (S105). Specifically, the rotation speed control unit $10g$ executes the increase control in the power-on shift-down, and executes the decrease control in the power-off shift-up. Thus, since the increase control and the decrease control start after it is determined in S103 that the movable gear Gn1 and the fixed gear Gn2 have engaged with each other, the movable gear Gn1 and the fixed gear Gn2 are smoothly engaged with each other.

Thereafter, the rotation speed control unit $10g$ determines whether or not the engine rotation speed Se arrives at the next gear level corresponding speed Stg (S106). That is, the rotation speed control unit $10g$ determines whether or not the rotation speed difference between the driving member 41 and the driven member 42 in the next clutch Cn is eliminated. The rotation speed control unit $10g$ executes the increase control of S105 until the engine rotation speed Se arrives at the next gear level corresponding speed Stg.

In the determination of S106, the rotation speed control unit $10g$ determines whether or not the engine rotation speed Se arrives at the next gear level corresponding speed Stg on the basis of a value (for example, the difference per se, or a ratio of those speeds) corresponding to the difference between the engine rotation speed Se and the next gear level corresponding speed Stg. For example, the rotation speed control unit 10g determines whether or not the absolute value of the difference between the engine rotation speed Se and the next gear level corresponding speed Stg is smaller than a sufficiently small threshold value. Also, the rotation speed control unit 10g may conduct the determination in S106 on the basis of a ratio of the difference between the engine rotation speed Se and the next gear level corresponding speed Stg, and the difference between the engine rotation speed before shifting and the next gear level corresponding speed Stg. For example, the rotation speed control unit 10g may determine whether or not the engine rotation speed Se arrives at the next gear level corresponding speed Stg through the following arithmetic expression.

$$(Se-Stg)/(Sp-Stg)>S1$$

where S1 is a threshold value close to 1. Also, Sp is the engine rotation speed before shifting, and expressed, for example, as follows:

$Sp$=rotation speed of output shaft 32×reduction ratio of the previous gear level×primary reduction ratio When the engine rotation speed Se arrives at the next gear level corresponding speed Stg, the rotation speed control unit 10g terminates the increase control, and returns the target engine torque Te to the reference target torque (step 107). Then, the control device 10 terminates the present transmission control after having executed the path switching control (control in t4 to t7 in FIGS. 5A and 5B and FIGS. 6A and 6B) (S108).

Figure 10:
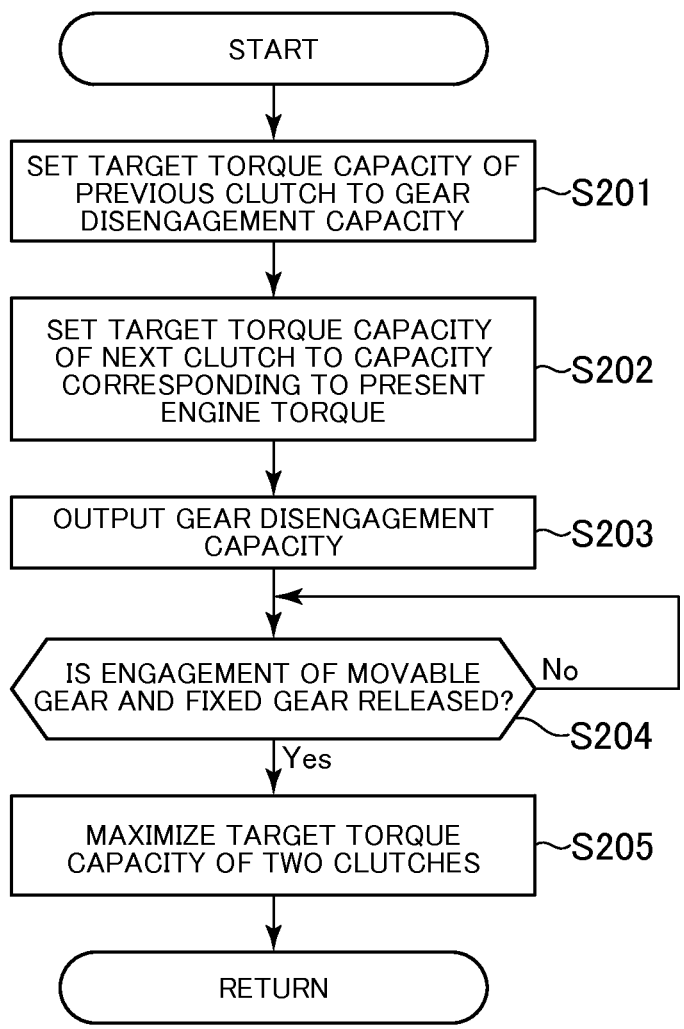
FIG. 10 is a flowchart illustrating an example of a process to be executed in a path switching control.

FIG. 10 is a flowchart illustrating an example of a process to be executed in the path switching control.

The clutch control unit 10i starts to transition the previous clutch Cp toward the disengaged state, in response to an arrival of the engine rotation speed Se at the next gear level corresponding speed Stg. In this example, the clutch control unit 10i sets the target torque capacity Tcp of the previous clutch Cp to a capacity (for example, minimum value 0 (hereinafter referred to as "gear disengagement capacity") as large as the engagement of the gears Gp1 and Gp2 of the previous transmission mechanism Tp can be released (S201). Also, the clutch control unit 10i starts the transition of the next clutch Cn toward the engaged state in response to the arrival of the engine rotation speed Se at the next gear level corresponding speed Stg. In this example, the clutch control unit 10i sets the target torque capacity Tcn of the next clutch Cn to a capacity (present engine torque×primary reduction ratio) corresponding to the torque (hereinafter referred to as "present engine torque") which is presently output by the engine 20 (S202). As a result, the present engine rotation speed is maintained.

After the sensor detects that the previous clutch Cp is set to the gear disengagement capacity, and the capacity of the next clutch Cn is set to the capacity corresponding to the present engine torque, the gear control unit 10h starts the movement of the movable gear Gp1 toward the neutral position in the previous transmission mechanism Tp (movement in a direction away from the fixed gear Gp2). That is, the gear control unit 10h outputs a gear disengagement command to the shift actuator 39 (S203). Thereafter, the gear determination unit 10c determines whether or not the engagement of the movable gear Gp1 and the fixed gear Gp2 is released (S204).

The clutch control unit 10i returns both of the previous clutch Cp and the next clutch Cn to the normal state after the engagement of the movable gear Gp1 and the fixed gear Gp2 has been released. That is, the clutch control unit 10i maximizes the target torque capacity Tcp of the previous clutch Cp, and the target torque capacity Tcn of the next clutch Cn (S205). As a result, the path switching control is terminated.

As described above, in this preferred embodiment, after it is determined that the movable gear Gn1 and the fixed gear Gn2 in the next transmission mechanism Tn have been engaged with each other, the rotation speed adjustment control is executed. For that reason, the movable gear Gn1 and the fixed gear Gn2 in the next transmission mechanism Tn can be smoothly engaged with each other.

Modified Example 1 of the First Preferred Embodiment

In this example, the rotation speed control unit 10g starts the rotation speed adjustment control (increase control or decrease control) before the engagement of the movable gear Gn1 and the fixed gear Gn2 has been completed. Then, the rotation speed control unit 10g maintains the engine rotation speed Se at a rotation speed (hereinafter referred to as "maintained rotation speed") between the engine rotation speed before the shift command is issued, and the next gear level corresponding speed Stg until the engagement of the movable gear Gn1 and the fixed gear Gn2 has been completed. That is, in the power-on shift-down, the rotation speed control unit 10g starts the increase control according to the shift command, and maintains the engine rotation speed Se at the rotation speed lower than the next gear level corresponding speed Stg until the gears Gn1 and Gn2 are engaged with each other. Also, in the power-off shift-up, the rotation speed control unit 10g starts the decrease control according to the shift command, and maintains the engine rotation speed Se at the rotation speed higher than the next gear level corresponding speed Stg until the gears Gn1 and Gn2 are engaged with each other.

Figure 11:
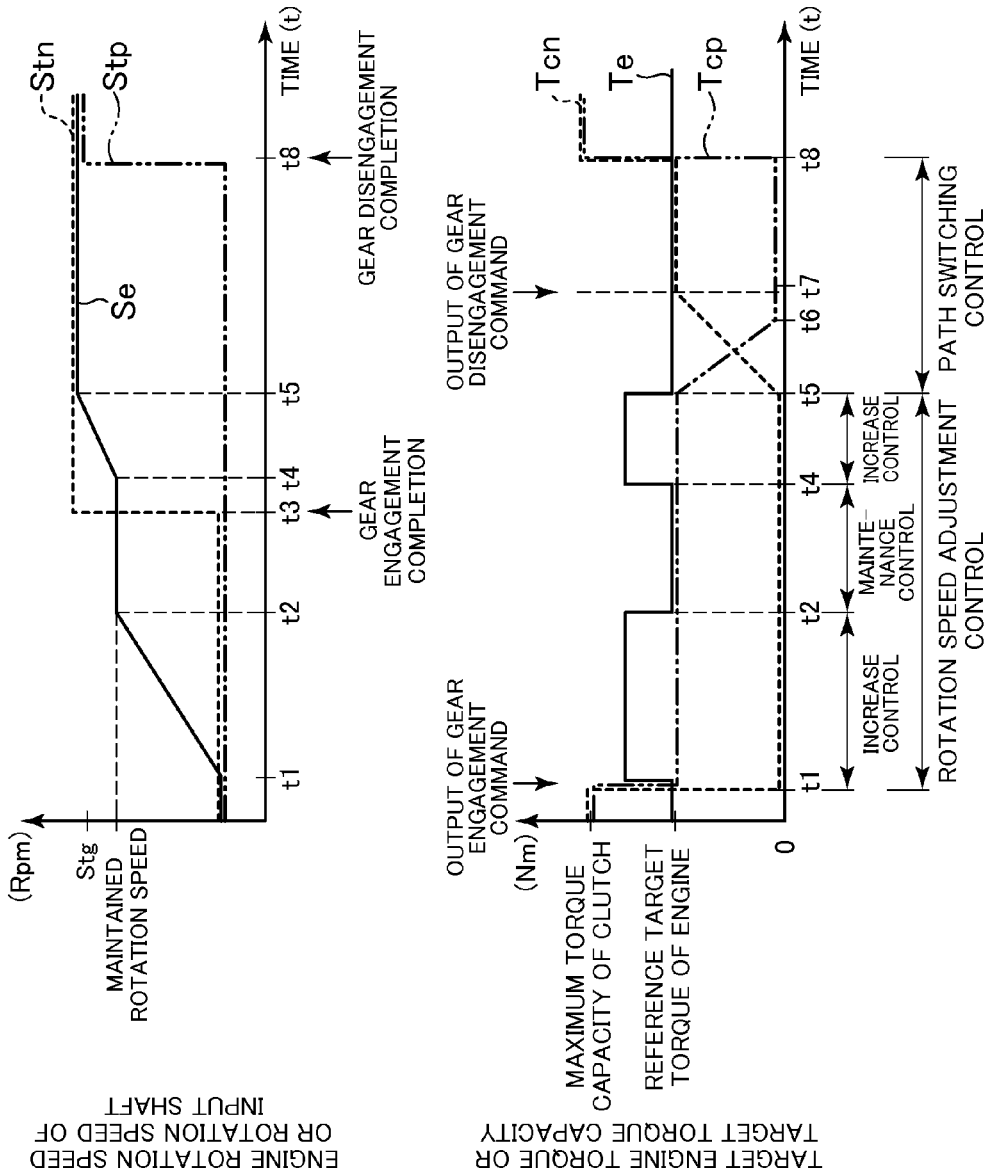
FIGS. 11A and 11B are timing charts illustrating an outline of a modified example in the first preferred embodiment of the present invention, in which the power-on shift-down control is illustrated.
Figure 12:
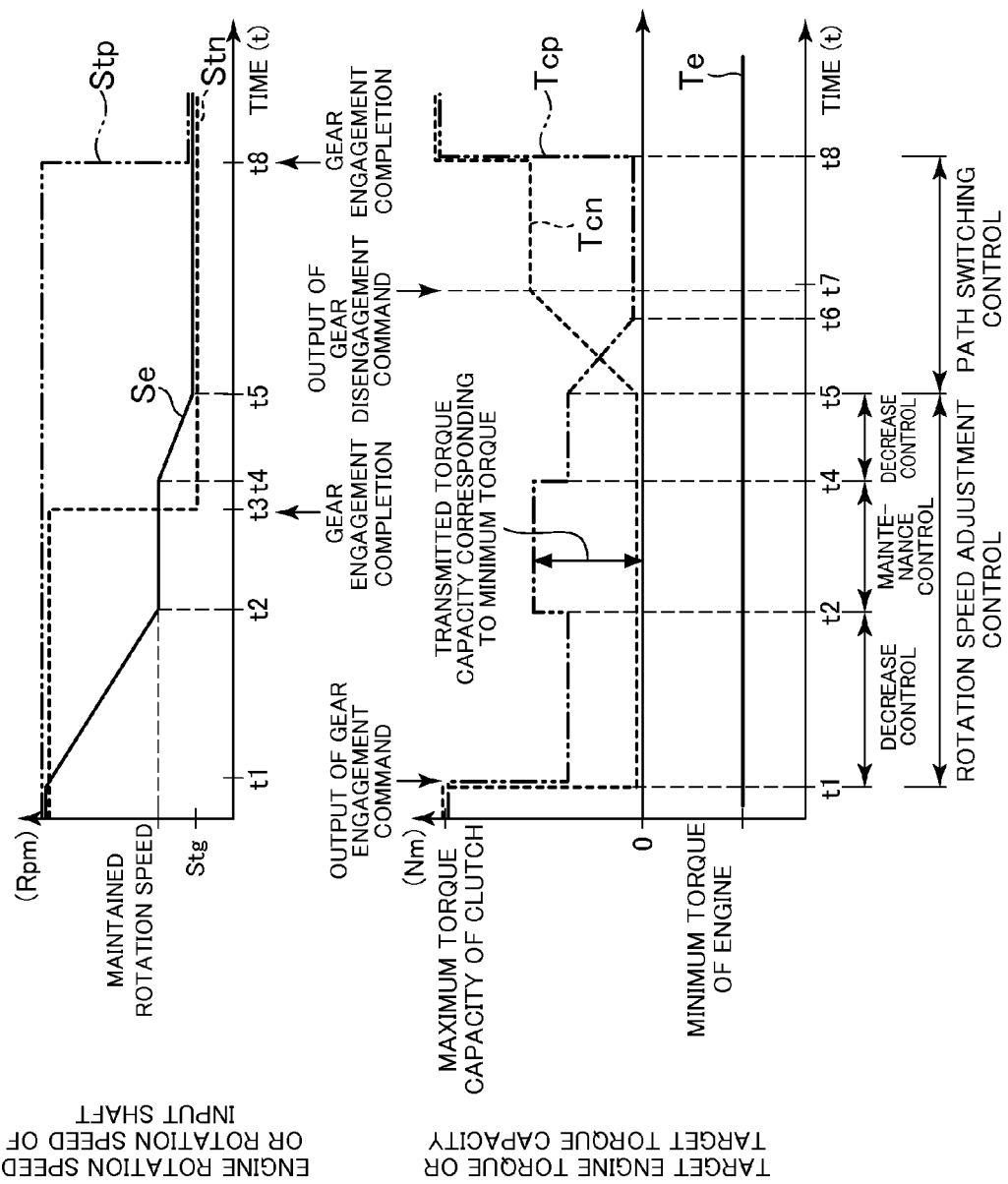
FIGS. 12A and 12B are timing charts illustrating an outline of a modified example in the first preferred embodiment of the present invention, in which the power-off shift-up control is illustrated.

FIGS. 11A and 11B are timing charts illustrating an outline of the power-on shift-down control according to this example. FIGS. 12A and 12B are timing charts illustrating an outline of the power-off shift-up control according to this example. In those figures, the contents indicated by the respective types of lines are preferably identical with those in FIGS. 5A and 5B. In the example of FIGS. 12A and 12B, the reference target torque is set to the minimum torque.

As illustrated in FIGS. 11A and 11B and FIG. 12B, at t1 when the shift command is received, the gear control unit 10h outputs the gear engagement command. As a result, the movable gear Gn1 of the next transmission mechanism Tn starts to move toward the fixed gear Gn2. In the example of these figures, the engagement of the movable gear Gn1 and the fixed gear Gn2 has been completed at t3. As a result, the rotation speed Stn of the input shaft 31 in the next transmission mechanism Tn increases or decreases to the rotation speed corresponding to the vehicle velocity at that time and the reduction ratio of the next gear level.

The rotation speed control unit 10g starts the rotation speed adjustment control without waiting for the engagement completion of the movable gear Gn1 and the fixed gear Gn2 in the next transmission mechanism Tn (before the engagement completion). In this example, the rotation speed control unit 10g starts the rotation speed adjustment control at t1. That is, the rotation speed control unit 10g starts the rotation speed adjustment control at the same time of outputting the gear engagement command. The rotation speed control unit 10g executes the increase control in the power-on shift-down control illustrated in FIGS. 11A and 11B, and the rotation speed control unit 10g executes the decrease control in the power-off shift-up control illustrated in FIGS. 12A and 12B. For that reason, the engine rotation speed Se starts to increase or decrease from t1 (refer to FIGS. 11A and 11B and FIG. 12A).

In the increase control of FIGS. 11A and 11B, a sum of the reference target torque and the necessary torque variation is set as the target engine torque Te, and the target torque capacity Tcp of the previous clutch Cp is set to the capacity corresponding to the reference target torque. On the other hand, in the example of FIGS. 12A and 12B, the reference target torque is the minimum torque. For that reason, in the decrease control, the target engine torque Te is set to the minimum torque, and the target torque capacity Tcp of the previous clutch Cp is set to the capacity corresponding to a value obtained by subtracting the absolute value of the necessary torque variation from the absolute value of the minimum torque. In both of FIGS. 11A and 11B and FIGS. 12A and 12B, the target torque capacity Tcn of the next clutch Cn is set to the minimum value by starting the increase control or the decrease control.

After the engine rotation speed Se starts to increase or decrease at t1, the engine rotation speed Se arrives at the maintained rotation speed set between the next gear level corresponding speed Stg and the engine rotation speed before shifting at t2. The maintained rotation speed is a speed calculated according to the next gear level corresponding speed Stg. For example, in the power-on shift-down control of FIGS. 11A and 11B, the maintained rotation speed is a rotation speed lower than the next gear level corresponding speed Stg by a given value. Also, in the power-off shift-up control of FIGS. 12A and 12B, the maintained rotation speed is a rotation speed higher than the next gear level corresponding speed Stg by a given value. The given value may be a predetermined fixed value, or a value varied according to the necessary torque variation or the contents of the shift command (the previous gear level and the next gear level).

In the examples of these figures, the engagement of the movable gear Gn1 and the fixed gear Gn2 has not yet been completed at the time (t2) when the engine rotation speed Se arrives at the maintained rotation speed. Under these circumstances, the rotation speed control unit 10g temporarily stops the increase control or the decrease control that starts at t1, and executes a control (hereinafter referred to as "maintenance control") to maintain the engine rotation speed Se at the present engine rotation speed (the maintained rotation speed in this example). In the maintenance control, the rotation speed control unit 10g sets, for example, the reference target torque as the target engine torque Te, and sets the target torque capacity Tcp of the previous clutch Cp to the capacity corresponding to the reference target torque. Also, the rotation speed control unit 10g sets the target torque capacity Tcn of the next clutch Cn to a minimum value. As a result, since the overall output torque of the engine 20 is transmitted toward the rear wheel 3 through the previous clutch Cp, a change in the engine rotation speed Se can be suppressed.

After it is detected that the engagement of the movable gear Gn1 and the fixed gear Gn2 has been completed at t3, the rotation speed control unit 10g again executes the increase control or the decrease control (t4). That is, in the power-on shift-down control of FIGS. 11A and 11B, the increase control is executed. Also, in the power-off shift-up control of FIGS. 12A and 12B, the decrease control is executed. As a result, the engine rotation speed Se again starts to increase or decrease, and arrives at the next gear level corresponding speed Stg at t5. Thus, the rotation speed control unit 10g temporarily suspends the increase control or the decrease control to prevent the engine rotation speed Se from matching the next gear level corresponding speed Stg before the engagement of the movable gear Gn1 and the fixed gear Gn2 has been completed.

Thereafter, the control device 10 executes the path switching control, and terminates the present transmission control, as with the processes illustrated in FIGS. 5A and 5B and FIGS. 6A and 6B (t8).

Figure 13:
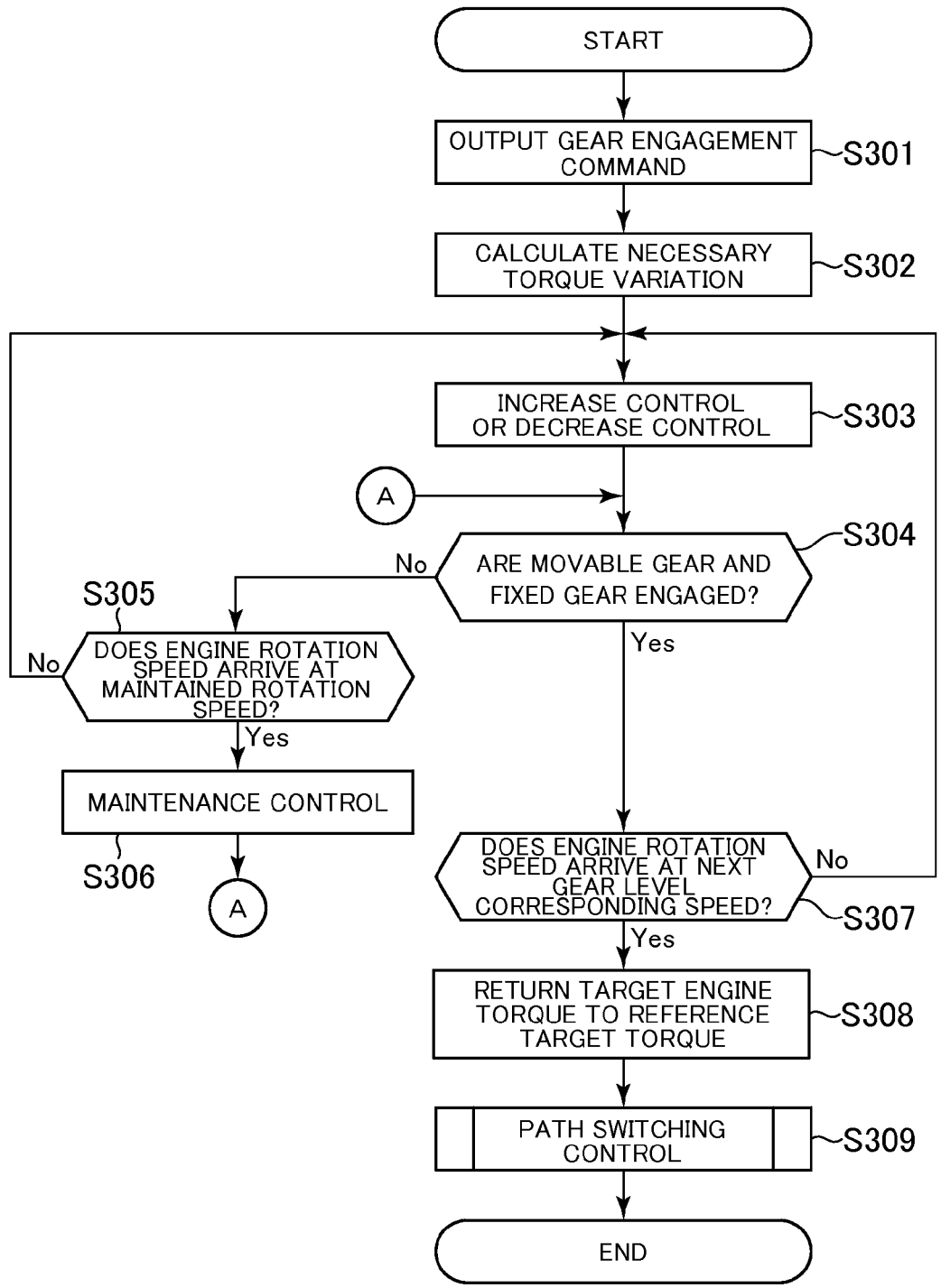
FIG. 13 is a flowchart illustrating an example of a process in the modified examples illustrated in FIGS. 11A and 11B and FIGS. 12A and 12B.

FIG. 13 is a flowchart illustrating an example of a process to be executed in the power-on shift-down control and the power-off shift-up control according to this example.

First, the gear control unit 10h outputs the gear engagement command (S301). Also, the torque variation calculation unit 10e calculates the necessary torque variation (S302). Then, the rotation speed control unit 10g executes the rotation speed adjustment control (the increase control and the decrease control) on the basis of the necessary torque variation and the reference target torque without waiting for the engagement completion of the movable gear Gn1 and the fixed gear Gn2 (S303). The rotation speed adjustment control starts subsequent to the output of the gear engagement command in S301. In the power-on shift-down control, the rotation speed control unit 10g executes the increase control in S303, and in the power-off shift-up control, the rotation speed control unit 10g executes the decrease control in S303.

Thereafter, the rotation speed control unit 10g determines whether or not the movable gear Gn1 is engaged with the fixed gear Gn2 in the next transmission mechanism Tn (S304). In this situation, if the movable gear Gn1 has not yet been engaged with the fixed gear Gn2, the rotation speed control unit 10g determines whether or not the engine rotation speed Se has arrived at the maintained rotation speed (S305). If the engine rotation speed Se has not yet arrived at the maintained rotation speed in the determination of S305, the rotation speed control unit 10g continues the increase control or the decrease control (S303).

If the engine rotation speed Se has arrived at the maintained rotation speed in the determination of S305, the rotation speed control unit 10g executes the maintenance control of the engine rotation speed Se (S306). As a result, the increase or decrease of the engine rotation speed Se stops, and the engine rotation speed Se remains at the maintained rotation speed. Thereafter, the process returns to S304, and it is again determined whether or not the movable gear Gn1 and the fixed gear Gn2 have been engaged with each other.

If the movable gear Gn1 and the fixed gear Gn2 in the next transmission mechanism Tn are engaged with each other in the determination of S304, the rotation speed control unit 10g determines whether or not the engine rotation speed Se has arrived at the next gear level corresponding speed Stg (S307). In this case, if the engine rotation speed Se has not yet arrived at the next gear level corresponding speed Stg, the rotation speed control unit 10g restarts or continues the increase control or the decrease control (S303). On the other hand, if the engine rotation speed Se has already arrived at the next gear level corresponding speed Stg in S307, the rotation speed control unit 10g sets the reference target torque as the target engine torque Te (S308). Then, after the control device 10 has executed the above-mentioned path switching control (S309), the control device 10 terminates the present transmission control.

In the examples of FIGS. 11A to 13, since the engine rotation speed Se is maintained at the maintained rotation speed, the movable gear Gn1 and the fixed gear Gn2 can be smoothly engaged with each other.

Also, before the movable gear Gn1 and the fixed gear Gn2 are engaged with each other, the rotation speed control unit 10g starts the increase control or the decrease control. For that reason, since a change in the engine rotation speed Se can start early, a time lag between the shift command from the rider and a change in the driving of the engine 20 attributable to the shift command can be reduced, and the operational feeling of the vehicle during shifting can be improved.

Also, the maintained rotation speed is calculated on the basis of the next gear level corresponding speed. For that reason, a variation in a time required until the engine rotation speed Se is changed from the maintained rotation speed to the next gear level corresponding speed can be suppressed.

Modified Example 2 of the First Preferred Embodiment

In this example, the above-mentioned rotation speed adjustment control that prevents the engine rotation speed Se from arriving at the next gear level corresponding speed Stg until the engagement of the movable gear Gn1 and the fixed gear Gn2 in the next transmission mechanism Tn has been completed, is selectively executed according to the contents of the shift command, and the variation of the engine rotation speed Se needed to arrive at the next gear level corresponding speed Stg.

In this example, the rotation speed control unit 10g includes two modes as the control modes. A first control is the above-mentioned rotation speed adjustment control to prevent the engine rotation speed Se from arriving at the next gear level corresponding speed Stg until the engagement of the gears Gn1 and Gn2 in the next transmission mechanism Tn has been completed. A second control is a control to change the engine rotation speed Se toward the next gear level corresponding speed Stg, independently from the determination of whether or not the gears Gn1 and Gn2 are engaged with each other. That is, in the second control, the above-mentioned increase control or decrease control starts, without conducting the determination of whether or not the gears Gn1 and Gn2 are engaged with each other, or without depending on the determination result. Thereafter, the increase control or the decrease control continues to be conducted until the engine rotation speed Se arrives at the next gear level corresponding speed Stg.

The rotation speed control unit 10g selectively executes the first control and the second control on the basis of the variation of the engine rotation speed Se needed to arrive at the next gear level corresponding speed Stg. That is, the rotation speed control unit 10g selects any one of the first control and the second control on the basis of a difference between the engine rotation speed before starting the rotation speed adjustment control and the next gear level corresponding speed Stg. If the rotation speed variation needed to arrive at the next gear level corresponding speed Stg is large (that is, when the next gear level corresponding speed Stg is largely away from the engine rotation speed before starting the rotation speed adjustment control), a longtime is required until the engine rotation speed Se arrives at the next gear level corresponding speed Stg. In this case, even when the above-mentioned control to prevent the engine rotation speed Se from arriving at the next gear level corresponding speed Stg is not conducted, the movable gear Gn1 of the next transmission mechanism Tn is engaged with the fixed gear Gn2 before the engine rotation speed Se arrives at the next gear level corresponding speed Stg. Under these circumstances, in this example, when the rotation speed variation needed to arrive at the next gear level corresponding speed Stg is small, the rotation speed control unit 10g executes the first control. When the rotation speed variation needed to arrive at the next gear level corresponding speed Stg is large, the rotation speed control unit 10g executes the second control. According to the second control, the engine rotation speed Se can arrive early at the next gear level corresponding speed Stg.

Figure 14:
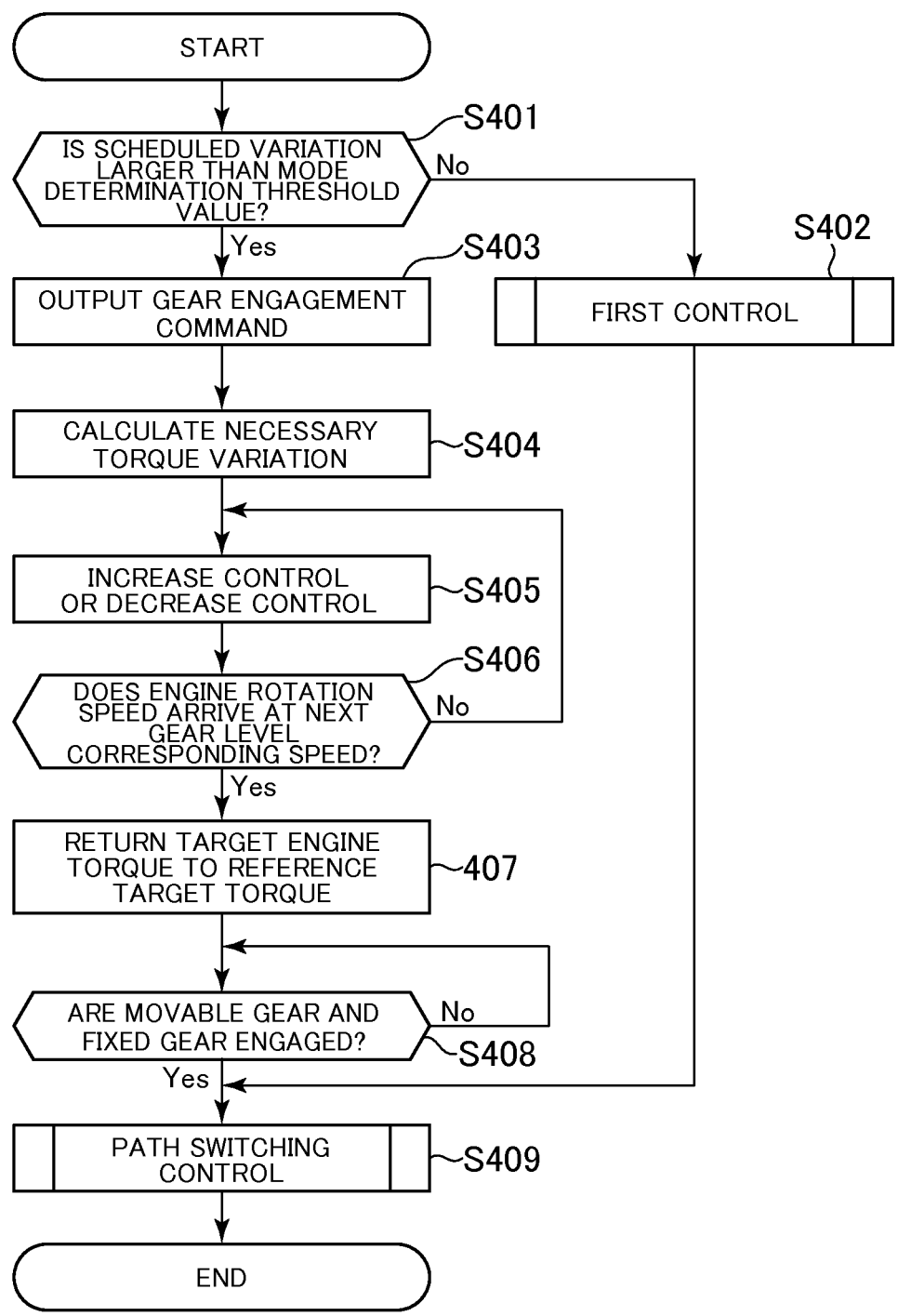
FIG. 14 is a flowchart illustrating an example of a process to be executed in another modified example of the first preferred embodiment of the present invention.

FIG. 14 is a flowchart illustrating an example of a process to be executed in the power-on shift-down control and the power-off shift-up control according to this example.

When the shift command is issued, the control device 10 determines whether or not the variation of the engine rotation speed Se needed to arrive at the next gear level corresponding speed Stg is larger than a threshold value. Specifically, the control device 10 determines whether or not the difference (hereinafter referred to as "scheduled variation") between the engine rotation speed (the engine rotation speed at the present or immediately before shifting) and the next gear level corresponding speed Stg is larger than a threshold value (hereinafter referred to as "mode determination threshold value") (S401).

In this example, when the scheduled variation is not larger than a mode determination threshold value, the first control is executed (S402). In the first control of S402, for example, the process in S101 to S107 illustrated in FIG. 9 is executed. Also, in the first control, the process in S301 to S308 illustrated in FIG. 13 may be executed.

If the scheduled variation is larger than the mode determination threshold value, the process in and after S403, which is the second control, is executed. Specifically, the gear control unit 10h outputs the gear engagement command (S403). Also, the torque variation calculation unit 10e calculates the necessary torque variation (S404), and the rotation speed control unit 10g executes the increase control or the decrease control on the basis of the necessary torque variation and the reference target torque without detecting the engagement completion of the movable gear Gn1 and the fixed gear Gn2 (S405). That is, the rotation speed control unit 10g executes the increase control in the power-on shift-down, and the decrease control in the power-off shift-up.

Subsequently, the rotation speed control unit 10g determines whether or not the engine rotation speed Se has arrived at the next gear level corresponding speed Stg (S406). In this example, if the engine rotation speed Se has not yet arrived at the next gear level corresponding speed Stg, the rotation speed control unit 10g continues the increase control or the decrease control in S405. On the other hand, if the engine rotation speed Se has already arrived at the next gear level corresponding speed Stg, the rotation speed control unit 10g terminates the increase control or the decrease control, and returns the target engine torque Te to the reference target torque (S407). Also, the gear determination unit 10c determines whether or not the movable gear Gn1 has been engaged with the fixed gear Gn2 in the next transmission mechanism Tn (S408). In this case, if it is determined that the movable gear Gn1 is engaged with the fixed gear Gn2, the control device 10 executes the above-mentioned path switching control (S409), and terminates the present transmission control.

Figures 16A, 16B:
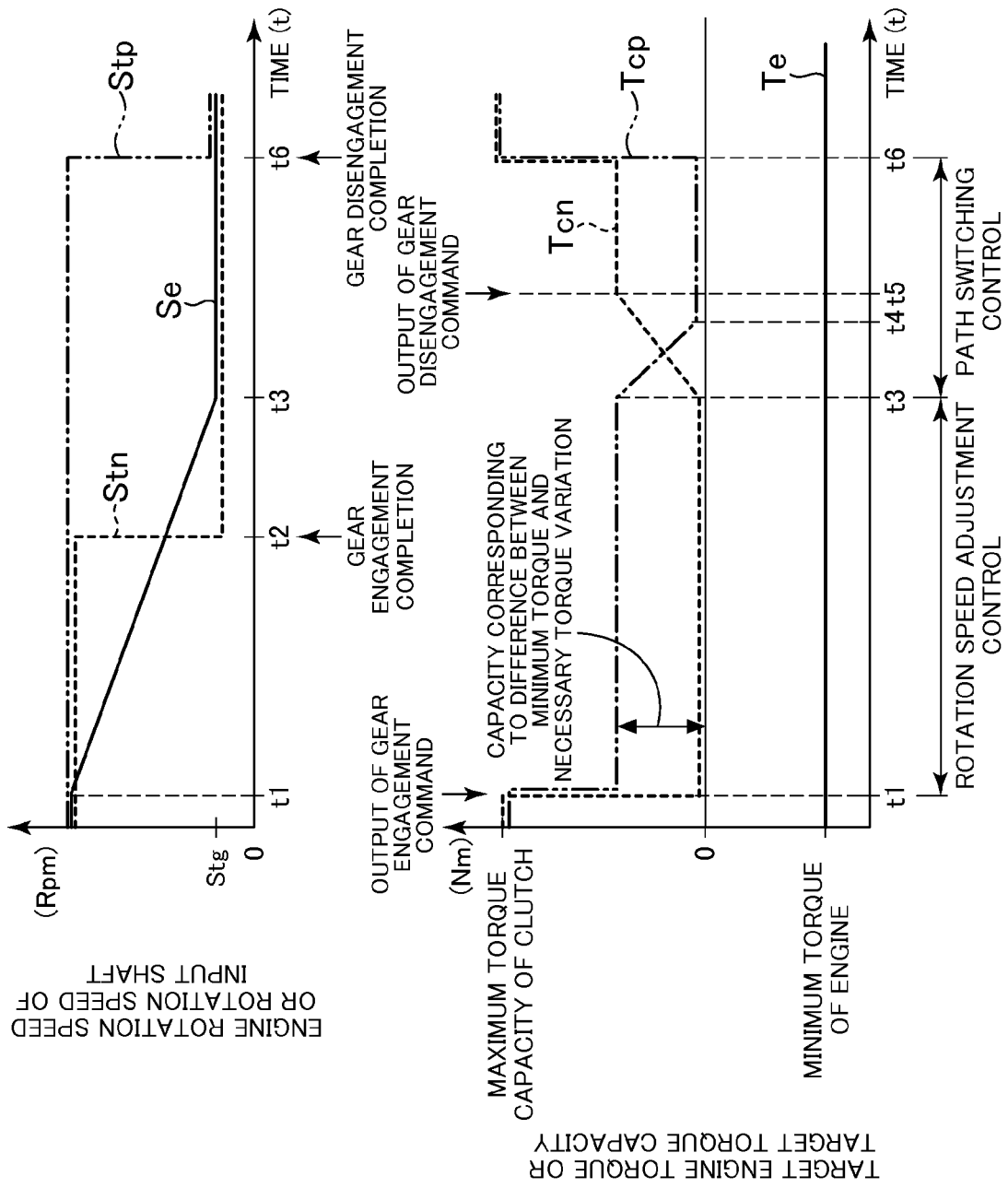
FIGS. 16A and 16B are timing charts illustrating an example of a change in the engine rotation speed according to the modified example illustrated in FIG. 14, in which the power-off shift-up control is illustrated.

FIGS. 15A and 15B are timing charts illustrating an example of a change in the engine rotation speed when the above-mentioned second control is executed in the power-on shift-down. FIGS. 16A and 16B are timing charts illustrating an example of a change in the engine rotation speed when the above-mentioned second control is executed in the power-off shift-up (control). In these figures, the contents indicated by the respective types of lines are preferably identical with those in FIGS. 5A and 5B.

As illustrated in FIGS. 15A and 15B and FIG. 16B, at t1 when the shift command is issued, the gear control unit 10h outputs the gear engagement command. Also, the rotation speed control unit 10g starts the rotation speed adjustment control at t1. That is, in the power-on shift-down control illustrated in FIGS. 15A and 15B, the rotation speed control unit 10g starts the increase control (in the example of these figures, target engine torque Te=reference target torque+necessary torque variation, target torque capacity Tcp of previous clutch Cp=reference target torque×primary reduction ratio, target torque capacity Tcn of next clutch Cn=minimum value). Also, in the power-off shift-up control illustrated in FIGS. 16A and 16B, the rotation speed control unit 10g starts the decrease control (in the example of these figures, target engine torque Te=minimum torque, target torque capacity Tcp of previous clutch Cp=|minimum torque|−|necessary torque variation|, target torque capacity Tcn of next clutch Cn=minimum value). The engine rotation speed Se starts to change toward the next gear level corresponding speed Stg by the increase control or the decrease control (refer to FIGS. 15A and 16A). The increase control and the decrease control continue without stopping on the way until the engine rotation speed Se arrives at the next gear level corresponding speed Stg at t3.

When the above-mentioned scheduled variation is large in executing the second control, a relatively long time is required to arrive at the next gear level corresponding speed Stg of the engine rotation speed Se. For that reason, in the examples of these figures, timing t2 when the movable gear Gn1 is engaged with the fixed gear Gn2 is earlier than timing t3 when the engine rotation speed Se arrives at the next gear level corresponding speed Stg. When the engine rotation speed Se arrives at the next gear level corresponding speed Stg at t3, the rotation speed adjustment control is terminated. Thereafter, the same path switching control as that at and after t4 in FIGS. 5A and 5B is executed, and the present transmission control is terminated at t6.

Modified Example 3 of the First Preferred Embodiment

When the movable gear Gn1 of the next transmission mechanism Tn moves toward the fixed gear Gn2, those two gears Gn1 and Gn2 may collide with each other without being engaged with each other by the dog clutch. That is, the two dog clutches may collide with each other without fitting the dog teeth of the dog clutch into the dog holes. The control device 10 may determine whether or not such collision of the dog clutches is generated. Then, the rotation speed control unit 10g may continue or restart a change in the engine rotation speed Se according to the determination result. With this configuration, the relative position of the movable gear Gn1 and the fixed gear Gn2 can be changed, and the dog teeth can be fitted into the dog holes.

For example, in the maintenance control (control at t2 to t4) described with reference to FIGS. 11A to 13, it is determined whether or not the dog clutches collide with each other between the gears Gn1 and Gn2. Then, if the dog clutches collide with each other, the rotation speed control unit 10g stops the maintenance control, and restarts the increase control or the decrease control.

Also, in another example, in the second control described with reference to FIG. 14, it is determined whether or not the dog clutches collide with each other between the gears Gn1 and Gn2. Then, if the dog clutches collide with each other, the rotation speed control unit 10g continues to change the engine rotation speed Se until the collision of the dog clutches is eliminated.

FIG. 17 is a block diagram illustrating a function of the control device 10 in this example. The control device 10 includes a collision determination unit 10k in addition to the rotation speed control unit 10g described above.

The collision determination unit 10k determines whether or not the dog clutches collide with each other. The collision determination unit 10k determines whether or not the dog clutches collide with each other on the basis of the position of the movable gear Gn1, which is detected by, for example, the gear position sensor 19b. For example, when the movable gear Gn1 stays at a position between the engagement position at which the movable gear Gn1 is engaged with the fixed gear Gn2, and the neutral position for a given time or longer, the collision determination unit 10k determines that the dog clutches collide with each other. This process of the collision determination unit 10k continues until the engagement of the movable gear Gn1 and the fixed gear Gn2 has been completed.

Also, the process of the collision determination unit 10k may be conducted as follows. When the movable gear Gn1 and the fixed gear Gn2 are appropriately engaged with each other, the rotation speed Stn of the input shaft 31 in the next transmission mechanism Tn increases or decreases, and arrives at the rotation speed corresponding to the vehicle velocity and the reduction ratio of the next gear level. Under these circumstances, the collision determination unit 10k may determine whether or not the dog clutches collide with each other on the basis of the rotation speed Stn of the input shaft 31 in the next transmission mechanism Tn. Specifically, when the change in the rotation speed Stn of the input shaft 31 cannot be detected at a time when a given time has elapsed from a timing (output timing of the gear engagement command) when the gear control unit 10h starts to move the movable gear Gn1, the collision determination unit 10k may determine that the dog clutches collide with each other.

Figures 18A, 18B:
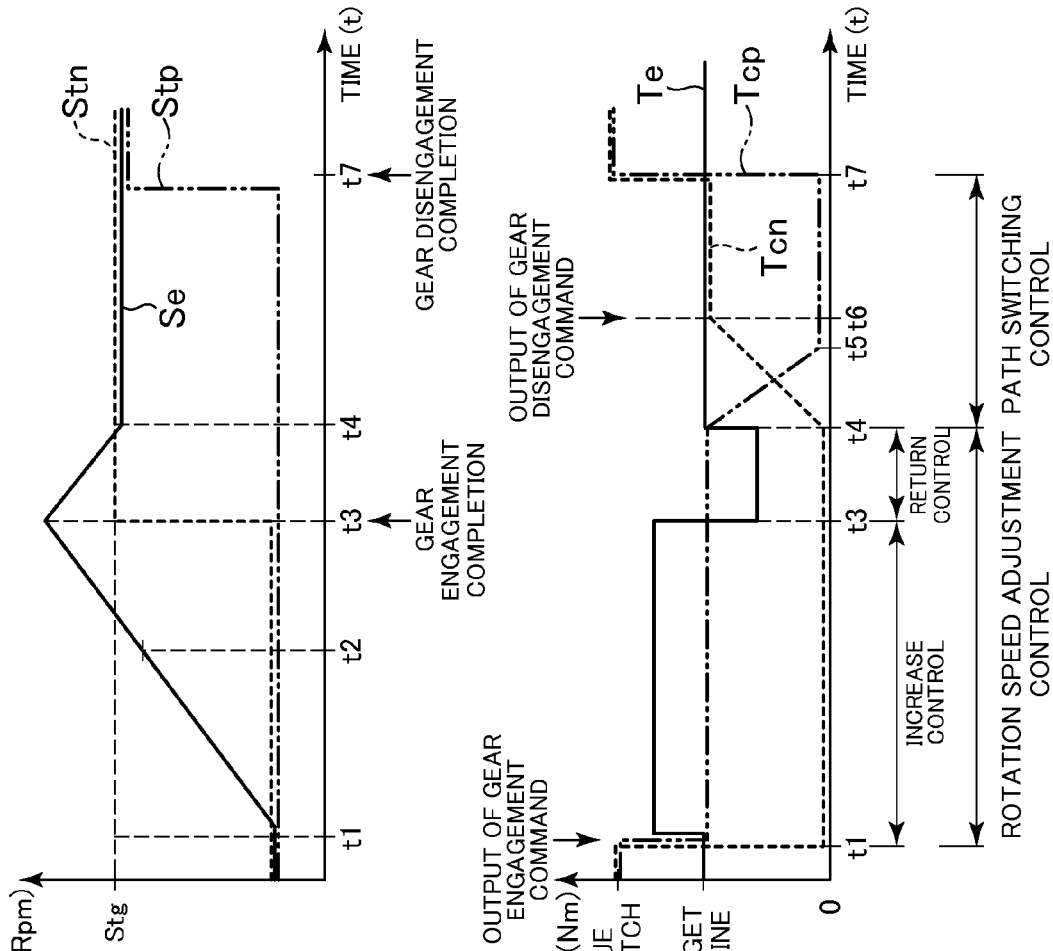
FIGS. 18A and 18B are timing charts illustrating a change in the engine rotation speed when a control is executed according to still another example of the first preferred embodiment of the present invention.

FIGS. 18A and 18B are timing charts illustrating a change in the engine rotation speed when the control is executed according to this example. In these figures, the contents indicated by the respective types of lines are preferably identical with those in FIGS. 5A and 5B.

At t1 when the shift command is issued, the gear control unit 10h outputs the gear engagement command. Also, the rotation speed control unit 10g starts the increase control at t1. As a result, as illustrated in FIG. 18A, the engine rotation speed Se starts to increase. In this example, at t2, the dog clutches collide with each other between the movable gear Gn1 and the fixed gear Gn2. The increase control continues until the collision of the dog clutches is eliminated even after the engine rotation speed Se has arrived at the next gear level corresponding speed Stg. As a result, the engine rotation speed Se exceeds the next gear level corresponding speed Stg.

When it is determined that the collision of the dog clutches is eliminated, and the movable gear Gn1 and the fixed gear Gn2 are engaged with each other at t3, the rotation speed control unit 10g executes a control (hereinafter referred to as "return control") to return the engine rotation speed Se to the next gear level corresponding speed Stg. Specifically, as illustrated in FIG. 18B, the rotation speed control unit 10g sets the target engine torque Te to a torque lower than the reference target torque while maintaining the target torque capacity Tcp of the previous clutch Cp at the capacity corresponding to the reference target torque. As a result, as illustrated in FIG. 18A, the engine rotation speed Se starts to decrease, and the engine rotation speed Se matches the next gear level corresponding speed Stg at t4. Thereafter, the above-mentioned path switching control is executed (t4 to t7), and the present transmission control is terminated.

Figure 19:
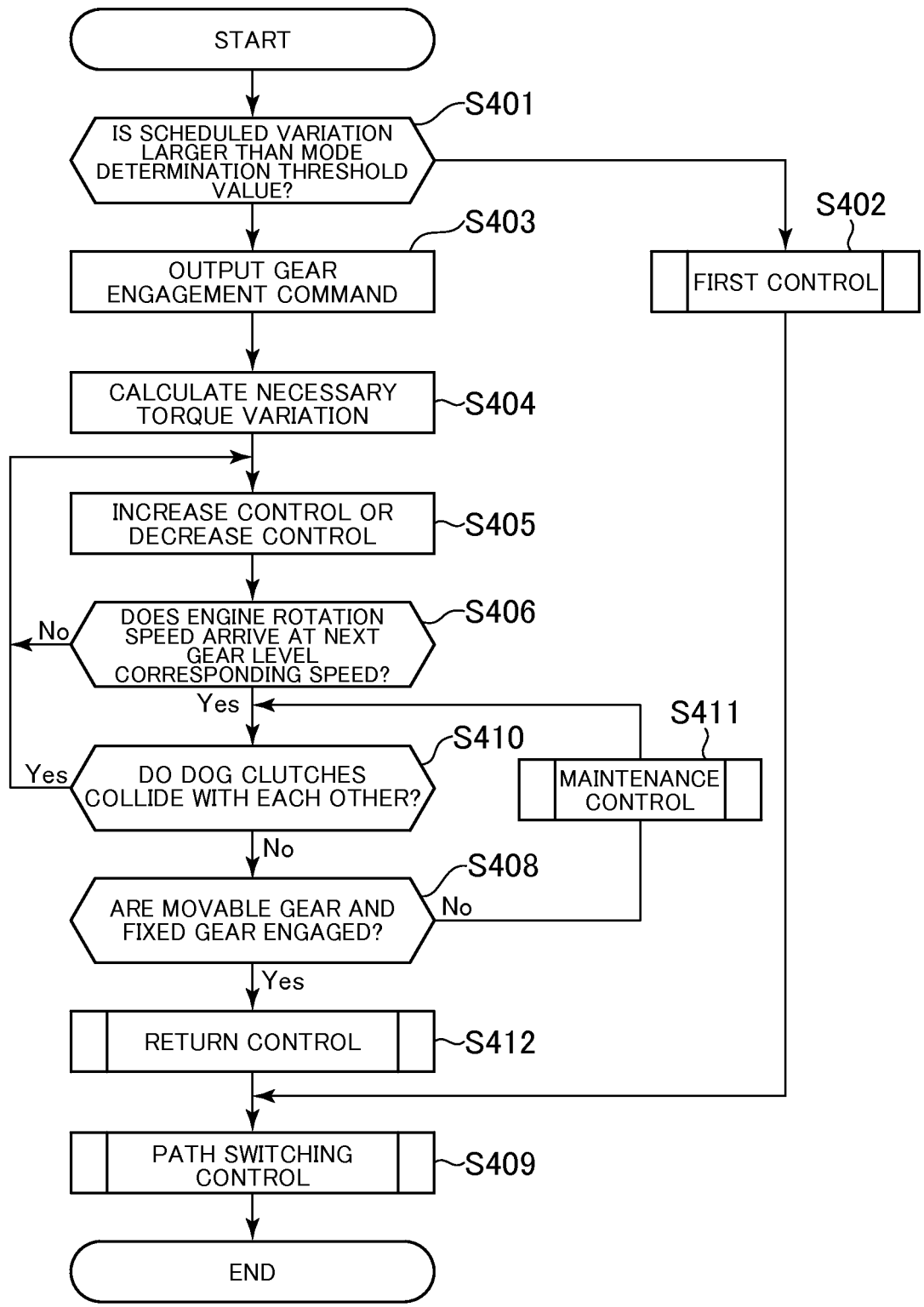
FIG. 19 is a flowchart illustrating a process in the example illustrated in FIG. 18.

FIG. 19 is a flowchart illustrating a process to be executed by the control device 10 in this example. In the figure, the same process as the process illustrated in FIG. 14 is indicated by identical symbols, and a description thereof will be omitted.

After, in the determination of S406, it is determined that the engine rotation speed Se has arrived at the next gear level corresponding speed Stg, the collision determination unit 10k determines whether or not the dog clutches collide with each other between the movable gear Gn1 and the fixed gear Gn2 (S410). In this example, if the dog clutches do not collide with each other, it is determined by the gear determination unit 10c whether or not the movable gear Gn1 has been engaged with the fixed gear Gn2 (S408). If the movable gear Gn1 has not yet been engaged with the fixed gear Gn2, the rotation speed control unit 10g executes the above-mentioned maintenance control (refer to S306 in FIG. 13), and maintains the present engine rotation speed Se (S412). On the other hand, if it is determined that the dog clutches collide with each other in the determination of S410, the rotation speed control unit 10g continues or restarts the increase control or the decrease control in S405, and changes the engine rotation speed Se. That is, the increase control is executed in S405 in the power-on shift-down control, and the decrease control is executed in S405 in the power-off shift-up control. The increase control or the decrease control in S405 is continued until the collision of the dog clutches is eliminated. When the increase control or the decrease control is continued or restarted, the rotation speed difference can be generated between the movable gear Gn1 and the fixed gear Gn2. As a result, the collision of the dog clutches can be eliminated in a shorter time than that when the rotation speed difference is not generated, and the movable gear Gn1 and the fixed gear Gn2 can be engaged with each other.

After it is determined that the movable gear Gn1 is engaged with the fixed gear Gn2 in S408, the rotation speed control unit 10g executes the return control to return the engine rotation speed Se to the next gear level corresponding speed Stg (S412).

FIG. 20 is a flowchart illustrating an example of a process to be executed in the return control of the engine rotation speed.

The return control changes the engine rotation speed Se that exceeds the next gear level corresponding speed Stg as a result of the increase control or the decrease control toward the next gear level corresponding speed Stg. In the example of FIG. 20, the rotation speed control unit 10g first determines whether or not the engine rotation speed Se has already matched the next gear level corresponding speed Stg (S501). In this situation, if the engine rotation speed Se does not match the next gear level corresponding speed Stg, the rotation speed control unit 10g determines whether or not the engine rotation speed Se is higher than the next gear level corresponding speed Stg (S502). If the engine rotation speed Se is higher than the next gear level corresponding speed Stg, the rotation speed control unit 10g executes a second decrease control to reduce the engine rotation speed Se toward the next gear level corresponding speed Stg (S503).

The second decrease control is conducted, for example, as follows. The rotation speed control unit 10g reduces the target engine torque Te by a given value as compared with the reference target torque. The given value is, for example, a fixed value. Also, the given value may be calculated on the basis of the necessary torque variation, the contents (the next gear level and the previous gear level) of the shift command, or a speed adjustment time used when calculating the necessary torque variation. Also, the rotation speed control unit 10g maintains the target torque capacity Tcp of the previous clutch Cp at the capacity corresponding to the reference target torque. Further, the rotation speed control unit 10g maintains the target torque capacity of the next clutch Cn at a minimum value 0.

If the engine rotation speed Se is not higher than the next gear level corresponding speed Stg in the determination of S502, the rotation speed control unit 10g executes a second increase control to increase the engine rotation speed Se toward the next gear level corresponding speed Stg (S504). The second increase control is conducted, for example, as follows. The rotation speed control unit 10g increases the target engine torque Te by a given value as compared with the reference target torque. The given value may be also a fixed value like the given value in the second decrease control, or may be calculated on the basis of the necessary torque variation. Also, in the second increase control, the rotation speed control unit 10g maintains the target torque capacity Tcp of the previous clutch Cp at the capacity corresponding to the reference target torque, and maintains the target torque capacity of the next clutch Cn at a minimum value.

After the second decrease control or the second increase control has been executed, it is again determined whether or not the engine rotation speed Se matches the next gear level corresponding speed Stg (S501). The second decrease control or the second increase control is executed until the engine rotation speed Se matches (returns to) the next gear level corresponding speed Stg. When the engine rotation speed Se matches the next gear level corresponding speed Stg, the rotation speed control unit 10g terminates the second decrease control or the second increase control, and sets the target engine torque Te to the reference target torque (S505). The above process is an example of the return control.

According to the examples of FIGS. 18A and 18B and FIG. 19, the rotation speed control unit 10g continues or restarts to change the engine rotation speed Se according to the determination result of the collision determination unit 10k. For that reason, even if the dog clutches collide with each other, the collision can be eliminated to earlier engage the movable gear Gn1 with the fixed gear Gn2 in a short time.

Also, when the engine rotation speed Se exceeds the next gear level corresponding speed Stg, the rotation speed control unit 10g executes the control to return the engine rotation speed Se to the next gear level corresponding speed Stg. For that reason, even if the dog clutches collide with each other, the engine rotation speed Se can match the next gear level corresponding speed Stg, and shift shock can be reduced.

Second Preferred Embodiment

In a second preferred embodiment, the rotation speed control unit 10g changes the engine rotation speed Se to the rotation speed (hereinafter referred to as "excess rotation speed") that exceeds the next gear level corresponding speed Stg. Then, the gear control unit 10h moves the movable gear Gn1 so that the movable gear Gn1 of the next transmission mechanism Tn is abutted against the fixed gear Gn2 after the engine rotation speed Se exceeds the next gear level corresponding speed Stg. In other words, the rotation speed control unit 10g prevents the engine rotation speed Se from returning to the next gear level corresponding speed Stg from the excess rotation speed until the engagement of the movable gear Gn1 and the fixed gear Gn2 has been completed. Also, in this configuration, the movable gear Gn1 and the fixed gear Gn2 can be smoothly engaged with each other. Also, since the change in the engine rotation speed Se can be started early, a time lag between the shift command from the rider and a change in the driving of the engine 20 attributable to the shift command can be reduced, and the operational feeling of the vehicle during shifting can be improved. The control device 10 according to the second preferred embodiment also has the respective functions illustrated in FIG. 7.

Figures 21A, 21B:
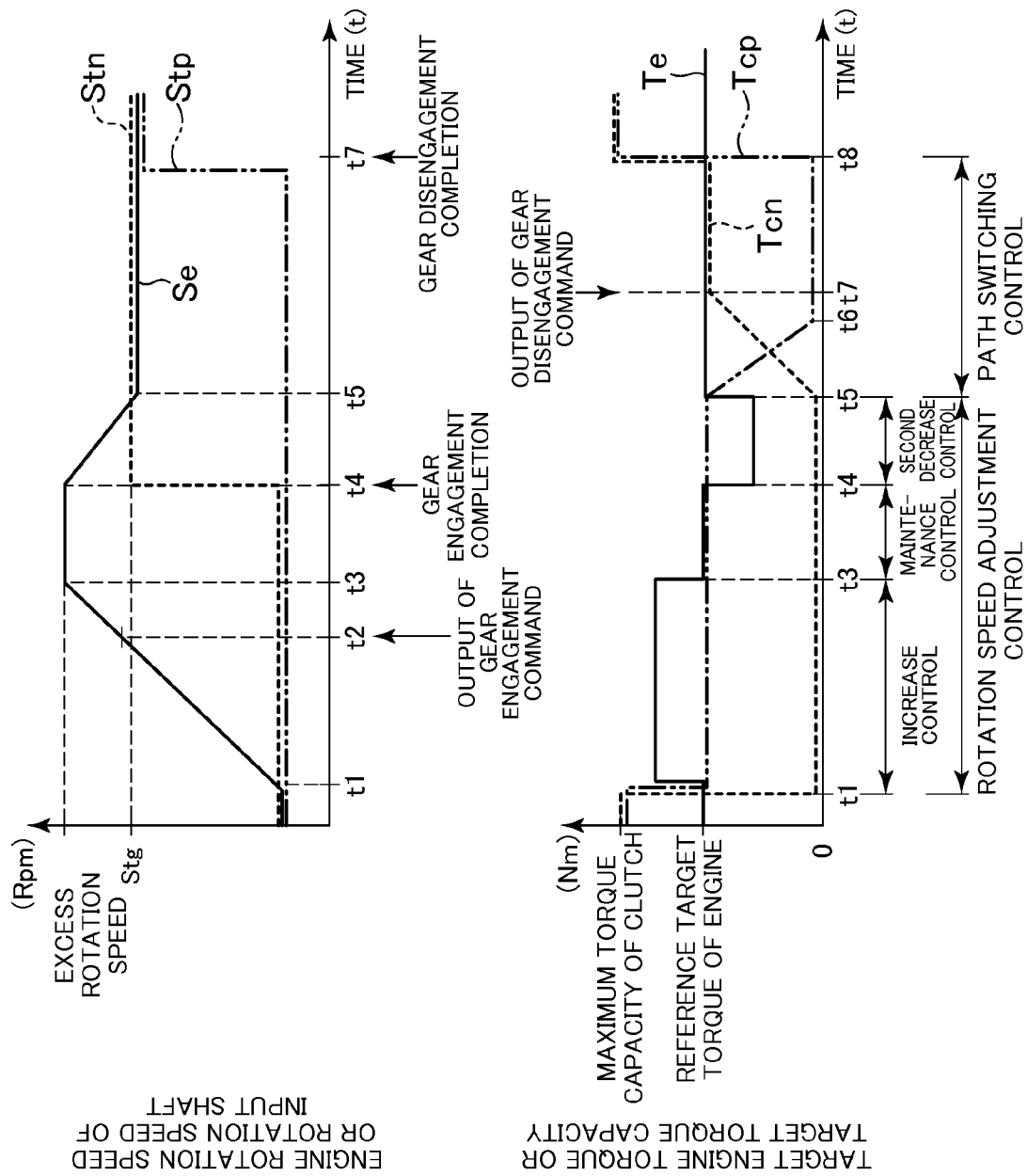
FIGS. 21A and 21B are timing charts illustrating an outline of a power-on shift-down control executed by a control device according to a second preferred embodiment of the present invention.
Figures 22A, 22B:
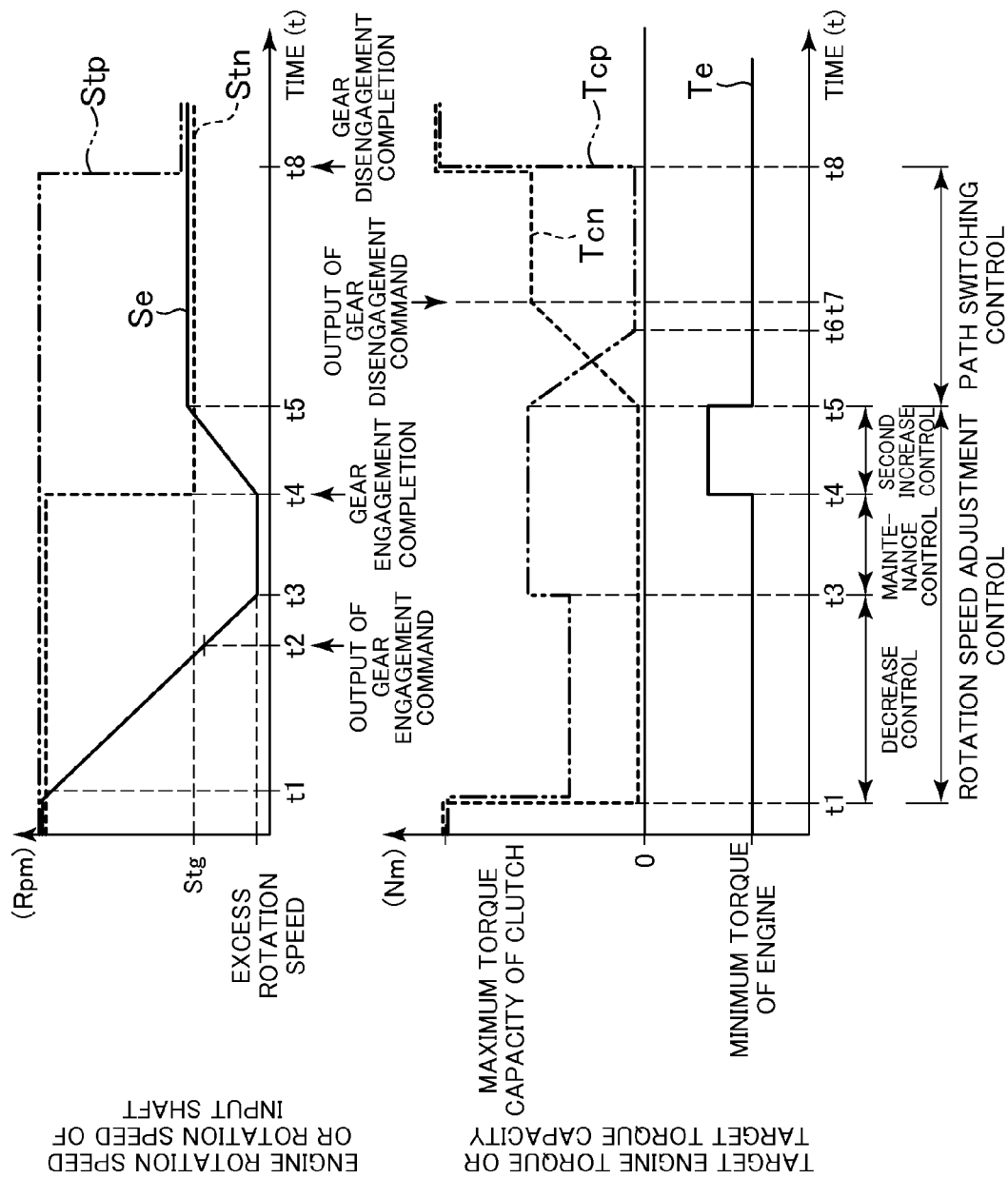
FIGS. 22A and 22B are timing charts illustrating an example of a power-off shift-up control executed by the control device according to the second preferred embodiment of the present invention.

FIGS. 21A and 21B are timing charts illustrating an outline of a power-on shift-down control according to this configuration. FIGS. 22A and 22B are timing charts illustrating an outline of a power-off shift-up control according to this configuration. In FIGS. 21A, 21B, 22A, and 22B, the contents indicated by the respective types of lines are preferably identical with those in FIGS. 5A and 5B.

As illustrated in FIGS. 21A and 21B and FIG. 22B, at t1 when the shift command is issued, the rotation speed control unit 10g starts the rotation speed adjustment control. Specifically, in the power-on shift-down control illustrated in FIGS. 21A and 21B, the rotation speed control unit 10g starts the increase control (target engine torque Te=reference target torque+necessary torque variation, target torque capacity Tcp of previous clutch Cp=capacity corresponding to reference target torque, target torque capacity Tcn of next clutch Cn=minimum value). Also, in the power-off shift-up control illustrated in FIGS. 22A and 22B, the rotation speed control unit 10g starts the decrease control. In the example of these figures, because the reference target torque is the minimum torque, the target engine torque Te is set to the minimum torque even in the decrease control. Also, the target torque capacity Tcp of the previous clutch Cp is set to the capacity corresponding to the difference between the minimum torque and the necessary torque variation. Further, the target torque capacity Tcn of the next clutch Cn is set to the minimum value 0 as with the increase control.

In this configuration, the rotation speed control unit 10g continues the increase control or the decrease control even after the engine rotation speed Se has arrived at the next gear level corresponding speed Stg, and as illustrated in FIGS. 21A and 22A, the engine rotation speed Se increases or decreases over the next gear level corresponding speed Stg. Then, at t3, the engine rotation speed Se arrives at the excess rotation speed set over the next gear level corresponding speed Stg. The excess rotation speed is a value higher than the next gear level corresponding speed in the power-on shift-down control, and a value lower than the next gear level corresponding speed in the power-off shift-up control. When the engine rotation speed Se arrives at the excess rotation speed, the rotation speed control unit 10g terminates the increase control or the decrease control, and starts the above-mentioned maintenance control.

The gear control unit 10h starts to move the movable gear Gn1 so that the movable gear Gn1 is abutted against the fixed gear Gn2 in the next transmission mechanism Tn under the circumstances where the engine rotation speed Se is higher than the next gear level corresponding speed Stg. In the examples of these figures, the gear control unit 10h outputs the gear engagement command slightly after timing when the engine rotation speed Se arrives at the next gear level corresponding speed Stg (t2). As a result, the movable gear Gn1 is abutted against the fixed gear Gn2, and engaged with the fixed gear Gn2 in a status in which the engine rotation speed Se is a rotation speed higher than the next gear level corresponding speed Stg (t4).

A timing (that is, movement start timing of the movable gear Gn1) when the gear control unit 10h outputs the gear engagement command may be appropriately set according to the operation speed of the shift actuator 39. For example, when the operation speed of the shift actuator 39 is low, the gear control unit 10h may start to move the movable gear Gn1 earlier than the timing when the engine rotation speed Se arrives at the next gear level corresponding speed Stg.

When the movable gear Gn1 is engaged with the fixed gear Gn2 at t4, the rotation speed control unit 10g starts the return control to return the engine rotation speed Se to the next gear level corresponding speed Stg, as illustrated in FIGS. 21B and 22B. In the example of FIGS. 21A and 21B, since the engine rotation speed Se is higher than the next gear level corresponding speed Stg at t4, the rotation speed control unit 10g executes the second decrease control described with reference to FIG. 20 as the return control. In the second decrease control, the target engine torque Te is set to a torque lower than the reference target torque. The target torque capacity Tcp of the previous clutch Cp is set to a capacity corresponding to the reference target torque, and the target torque capacity of the next clutch Cn is set to the minimum value 0.

In the example of FIGS. 22A and 22B, since the engine rotation speed Se is lower than the next gear level corresponding speed Stg at t4, the rotation speed control unit 10g executes the second increase control described with reference to FIG. 20 as the return control. In the second increase control, the target engine torque Te is set to a torque higher than the reference target torque. The target torque capacity Tcp of the previous clutch Cp is set to a capacity corresponding to the reference target torque, and the target torque capacity of the next clutch Cn is set to the minimum value 0.

As illustrated in FIGS. 21A and 22A, the engine rotation speed Se increases or decreases toward the next gear level corresponding speed Stg by the second decrease control or the second increase control, and arrives at the next gear level corresponding speed Stg at t5. When the engine rotation speed Se arrives at the next gear level corresponding speed Stg, the rotation speed control unit 10g returns the target engine torque Te to the reference target torque. As a result, the decrease or increase of the engine rotation speed Se stops. When the engine rotation speed Se arrives at the next gear level corresponding speed Stg, the control device 10 executes the path switching control (t5 to t8), and terminates the present transmission control.

FIG. 23 is a flowchart illustrating an example of a process to be executed in the power-on shift-down control and the power-off shift-up control according to this configuration.

First, the torque variation calculation unit 10e calculates the necessary torque variation (S601), and the rotation speed control unit 10g executes the increase control or the decrease control on the basis of the necessary torque variation (S602). The decrease control is executed in the power-off shift-up control, and the increase control is executed in the power-on shift-down control.

Thereafter, the rotation speed control unit 10g determines whether or not the engine rotation speed Se has arrived at a rotation speed at which the movable gear Gn1 in the next transmission mechanism Tn should start to move toward the engagement position (that is, the rotation speed at which to output the gear engagement command, hereinafter referred to as "gear movement start speed") (S603). The gear movement start speed is determined on the basis of a value A S1 determined from the operation speed of the shift actuator 39, and the next gear level corresponding speed Stg (for example, next gear level corresponding speed Stg+ΔS1). If the operation speed of the shift actuator 39 is low, the gear movement start speed is set to a value lower than the next gear level corresponding speed Stg as described above. On the other hand, if the operation speed of the shift actuator 39 is high, the gear movement start speed is set to a value higher than the next gear level corresponding speed Stg.

The rotation speed control unit 10g continues the increase control or the decrease control of S602 until the engine rotation speed Se arrives at the gear movement start speed. When the engine rotation speed Se arrives at the gear movement start speed, the gear control unit 10h determines whether or not the gear engagement command has already been output (S604). When the gear engagement command has not yet been output, the gear control unit 10h outputs the gear engagement command (S605). Thereafter, the gear determination unit 10c determines whether or not the movable gear Gn1 has been engaged with the fixed gear Gn2 (S606).

If the movable gear Gn1 has not yet been engaged with the fixed gear Gn2, the rotation speed control unit 10g determines whether or not the engine rotation speed Se has arrived at the excess rotation speed (S607). In the power-on shift-down control, the excess rotation speed is a speed higher than the next gear level corresponding speed Stg by a given value ΔS2, and higher than the above-mentioned gear movement start speed. In the power-off shift-up control, the excess rotation speed is a speed lower than the next gear level corresponding speed Stg by a given value ΔS3, and lower than the above-mentioned gear movement start speed.

If the engine rotation speed Se has not yet arrived at the excess rotation speed in the determination of S607, the increase control or the decrease control of S602 is continued. On the other hand, if the engine rotation speed Se has arrived at the excess rotation speed in the determination of S607, the rotation speed control unit 10g executes the maintenance control (S608). Then, it is again determined whether or not the movable gear Gn1 has been engaged with the fixed gear Gn2 (S606).

If it is determined that the movable gear Gn1 has been engaged with the fixed gear Gn2 in the determination of S606, the rotation speed control unit 10g executes the second decrease control or the second increase control to return the engine rotation speed Se to the next gear level corresponding speed Stg (S609). The second decrease control is executed in the power-on shift-down control, and the second increase control is executed in the power-off shift-up control. Thereafter, the rotation speed control unit 10g determines whether or not the engine rotation speed Se has returned to the next gear level corresponding speed Stg (S610). The rotation speed control unit 10g continues the control of S609 until the engine rotation speed Se returns to the next gear level corresponding speed Stg.

When the engine rotation speed Se returns to the next gear level corresponding speed Stg, the rotation speed control unit 10g terminates the control of S609, and returns the target engine torque Te to the reference target torque (S611). Then, the control device 10 executes the path switching control (S612), and terminates the present transmission control.

In this configuration, the rotation speed control unit 10g maintains the engine rotation speed Se at the excess rotation speed until the movable gear Gn1 and the fixed gear Gn2 are engaged with each other. This makes it easy to abut the movable gear Gn1 against the fixed gear Gn2 in a status in which the engine rotation speed Se is higher than the next gear level corresponding speed Stg.

Also, in this configuration, the gear control unit 10h outputs the gear engagement command so that the movable gear Gn1 and the fixed gear Gn2 are abutted against each other in a status in which the engine rotation speed Se exceeds the next gear level corresponding speed Stg (that is, the proximity of the movable gear Gn1 and the fixed gear Gn2 starts). For that reason, the movable gear Gn1 and the fixed gear Gn2 can be smoothly engaged with each other without collision of the dog clutches.

In particular, in this example, the gear control unit 10h outputs the gear engagement command when the engine rotation speed Se exceeds a gear start speed determined on the basis of the next gear level corresponding speed Stg. This makes it easy to abut the movable gear Gn1 against the fixed gear Gn2 in a status in which the engine rotation speed Se is higher than the next gear level corresponding speed Stg.

Modified Example of the Second Preferred Embodiment

In this example, it is determined whether or not the dog clutches collide with each other between the movable gear Gn1 and the fixed gear Gn2, after the gear engagement command has been output. The rotation speed control unit 10g continues or restarts the change in the engine rotation speed Se according to the determination result. In particular, in this example, the rotation speed control unit 10g switches a direction of the change of the engine rotation speed Se when the dog clutches collide with each other. That is, the rotation speed control unit 10g changes the engine rotation speed Se in a direction opposite to a direction of the change of the engine rotation speed Se caused by the control executed up to then. Specifically, when the dog clutches collide with each other during execution of the increase control in which the engine rotation speed Se is increased toward the excess rotation speed, or during execution of the maintenance control after the increase control, the rotation speed control unit 10g executes the control to decrease the engine rotation speed Se. Also, when the dog clutches collide with each other during execution of the decrease control in which the engine rotation speed is decreased toward the excess rotation speed, or during execution of the maintenance control after the decrease control, the rotation speed control unit 10g executes the control to increase the engine rotation speed Se.

With the above configuration, the engine rotation speed can be prevented from excessively increasing or decreasing. Also, the rotation speed difference can be provided between the movable gear Gn1 and the fixed gear Gn2, and the collision of the dog clutches can be eliminated in a short time. In this example, the control device 10 includes the collision determination unit 10k illustrated in FIG. 17.

FIGS. 24A and 24B are timing charts illustrating an outline of the power-on shift-down control in this example. In FIGS. 24A and 24B, the contents indicated by the respective types of lines are preferably identical with those in FIGS. 5A and 5B.

As illustrated in FIG. 24B, the rotation speed control unit 10g starts the increase control at t1 when the shift command is generated. As a result, as illustrated in FIG. 24A, the engine rotation speed Se starts to increase. In this example, as in the configuration illustrated in FIGS. 21A and 21B, even after the engine rotation speed Se has arrived at the next gear level corresponding speed Stg, the increase control is continued. Then, the engine rotation speed Se arrives at the excess rotation speed at t3, and thereafter is maintained at the excess rotation speed under the maintenance control. Also, the gear control unit 10h outputs the gear engagement command when the engine rotation speed Se arrives at a gear movement start speed set to be slightly higher than the next gear level corresponding speed Stg as in the configuration of FIGS. 21A and 21B (t2).

When the collision of the dog clutches is detected at t4 when the maintenance control is being executed, the rotation speed control unit 10g again changes the engine rotation speed Se. Specifically, the rotation speed control unit 10g changes the engine rotation speed Se in a direction opposite to the change in the engine rotation speed conducted by the rotation speed adjustment control (increase control in this example) that has been executed previously. In this example, the rotation speed control unit 10g executes the control (for example, the above-mentioned second decrease control) to decrease the engine rotation speed Se. In the example of these figures, in order to decrease the engine rotation speed Se, the rotation speed control unit 10g reduces the target engine torque Te to be lower than the reference target torque, maintains the target torque capacity of the previous clutch Cp at the reference target torque, and maintains the target torque capacity of the next clutch Cn at the minimum value.

When the collision of the dog clutches is eliminated, and the engagement of the movable gear Gn1 and the fixed gear Gn2 has been completed at t5, the rotation speed control unit 10g executes the control (specifically, the above-mentioned return control (refer to FIG. 20)) to return the engine rotation speed Se to the next gear level corresponding speed Stg. In the example of these figures, since the engine rotation speed Se at the time t5 is lower than the next gear level corresponding speed Stg, the engine rotation speed Se again increases due to the return control, and returns to the next gear level corresponding speed Stg at t6. Thereafter, as with the above configurations, the path switching control is executed (t6 to t9).

Figure 25:
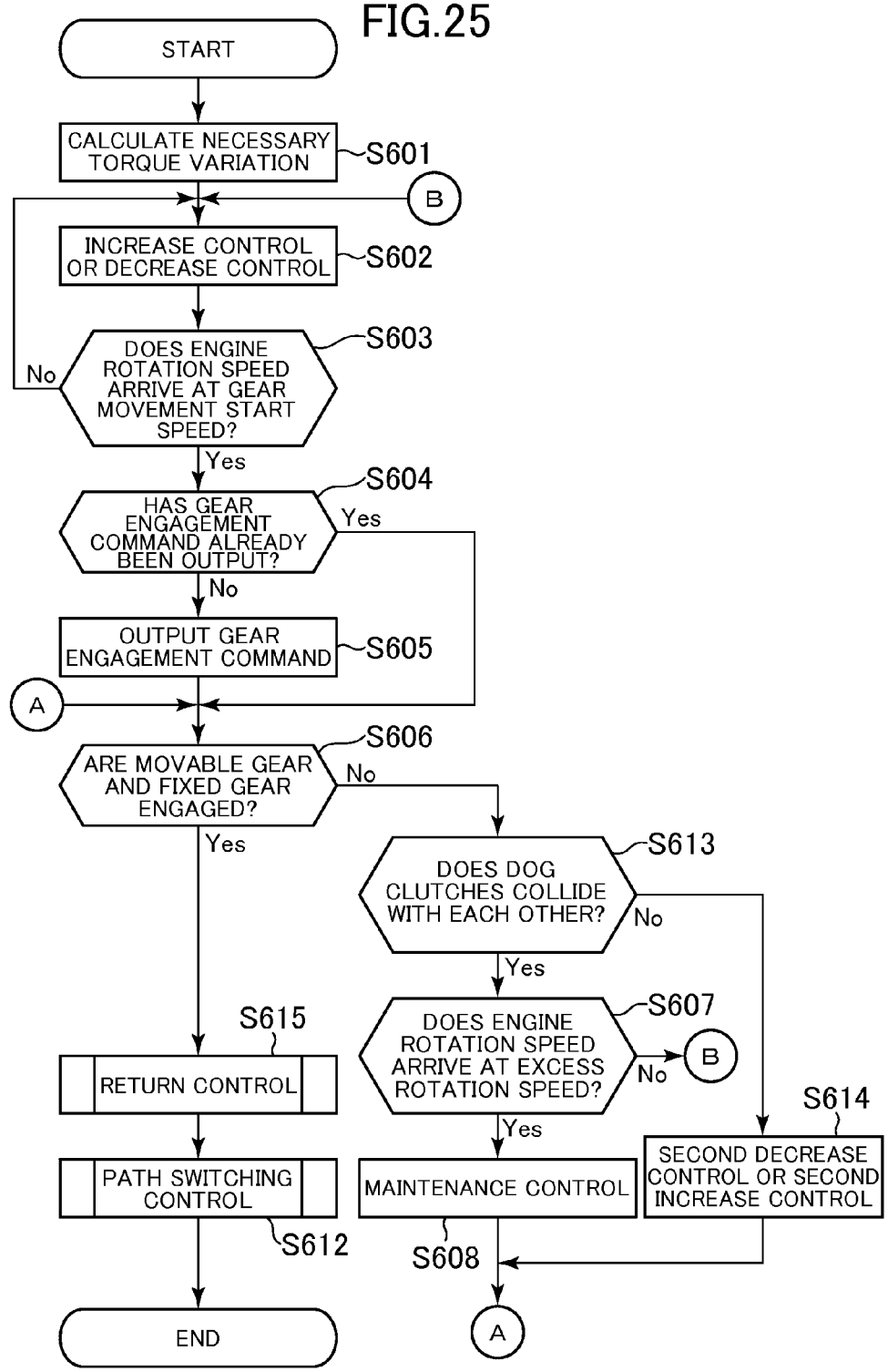
FIG. 25 is a flowchart illustrating an example of a process to be executed in the power-on shift-down control or the power-off shift-up control in the example illustrated in FIG. 24.

FIG. 25 is a flowchart illustrating an example of a process to be executed in the power-on shift-down control or the power-off shift-up control in this example. In this example, the same process as the process illustrated in FIG. 23 is denoted by identical symbols, and a description thereof will be omitted.

If the movable gear Gn1 and the fixed gear Gn2 have not yet been engaged with each other in the determination of S606, the gear determination unit 10c determines whether or not the dog clutches collide with each other between those gears (S613). If the dog clutches do not collide with each other, the rotation speed control unit 10g determines whether or not the engine rotation speed Se has arrived at the excess rotation speed (S607). When the engine rotation speed Se has arrived at the excess rotation speed, the rotation speed control unit 10g executes the maintenance control (S608), and again determines whether or not the movable gear Gn1 and the fixed gear Gn2 have been engaged with each other (S606). On the other hand, if the dog clutches collide with each other, the rotation speed control unit 10g executes the control to change the engine rotation speed Se in a direction opposite to the above control. Specifically, when the increase control is executed in S602, the rotation speed control unit 10g executes the second decrease control to decrease the engine rotation speed Se in S614. Also, when the decrease control is executed in S602, the rotation speed control unit 10g executes the second increase control to increase the engine rotation speed Se in S614. Thereafter, it is again determined whether or not the movable gear Gn1 has been engaged with the fixed gear Gn2 (S606).

When the collision of the dog clutches is repetitively detected in S613 although the second decrease control has been executed in S614, there is a possibility that the engine rotation speed is too low. Under these circumstances, the rotation speed control unit 10g may determine whether or not the engine rotation speed Se has been too much lower than the next gear level corresponding speed Stg during execution of the second decrease control. For example, the rotation speed control unit 10g may determine whether or not a difference (stg-Se) between the next gear level corresponding speed Stg and the engine rotation speed Se is smaller than a threshold value. In this case, if the difference is larger than the threshold value, the rotation speed control unit 10g may execute the maintenance control in, for example, S608 without execution of the second decrease control in S614.

If it is determined that the movable gear Gn1 and the fixed gear Gn2 have been engaged with each other in the determination of S606, the rotation speed control unit 10g executes the return control described with reference to FIG. 20 (S615), and returns the engine rotation speed Se to the next gear level corresponding speed Stg. Then, the control device 10 executes the path switching control after the engine rotation speed Se has matched the next gear level corresponding speed Stg (S612).

In the examples of FIGS. 24A and 24B and FIG. 25, the rotation speed control unit 10g continues or restarts to change the engine rotation speed according to the determination result of the collision determination unit 10k. For that reason, even if the dog clutches collide with each other, the collision can be eliminated in a short time, and the movable gear Gn1 and the fixed gear Gn2 can be engaged with each other.

Also, in this example, the rotation speed control unit 10g changes the direction of the change in the engine rotation speed Se according to the determination result of the collision determination unit 10k. For that reason, the engine rotation speed Se can be prevented from excessively moving away from the next gear level corresponding speed Stg.

Third Preferred Embodiment

In the first and second preferred embodiments, the control device 10 is preferably programmed to control the engine rotation speed Se so that the movable gear Gn1 does not collide with the fixed gear Gn2 in a status in which the engine rotation speed Se matches the next gear level corresponding speed Stg. However, in the third preferred embodiment, when the dog clutches collide with each other between the movable gear Gn1 and the fixed gear Gn2 without execution of the above control, the control device 10 changes the engine rotation speed Se in a direction away from the next gear level corresponding speed Stg to eliminate the collision of the dog clutches. For example, when the dog clutches collide with each other in a process in which the rotation speed control unit 10g changes the engine rotation speed Se toward the next gear level corresponding speed Stg, the rotation speed control unit 10g changes the engine rotation speed Se in a direction opposite to that described above. For example, when the dog clutches collide with each other during execution of the increase control, the rotation speed control unit 10g executes the decrease control, and decreases the engine rotation speed Se. On the contrary, when the dog clutches collide with each other during execution of the decrease control, the rotation speed control unit 10g executes the increase control, and increases the engine rotation speed Se. The functions provided in the control device 10 according to this configuration are preferably identical with those illustrated in FIG. 17.

Figure 26:
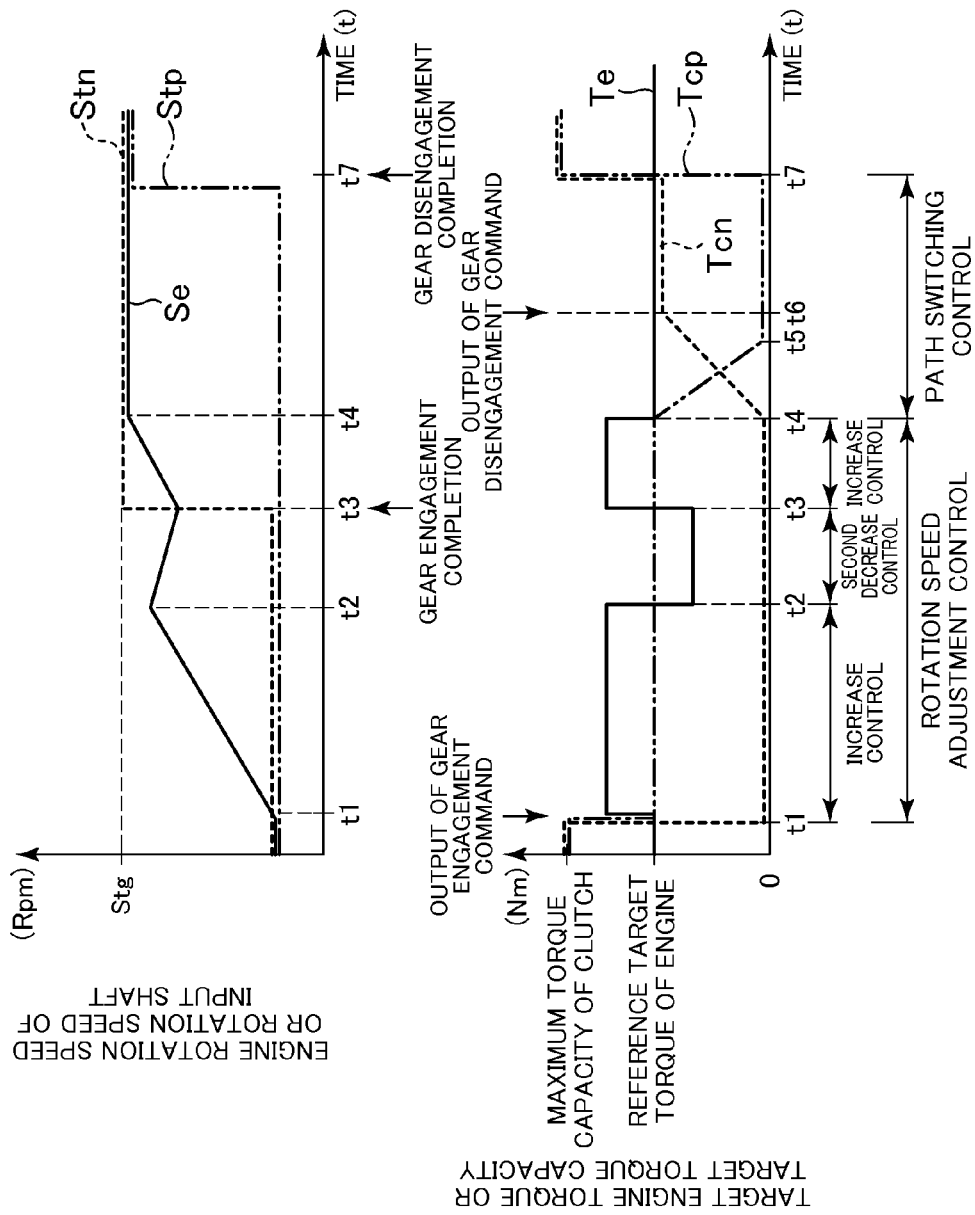
FIGS. 26A and 26B are timing charts illustrating an outline of a power-on shift-down control executed by a control device according to a third preferred embodiment of the present invention.
Figure 27:
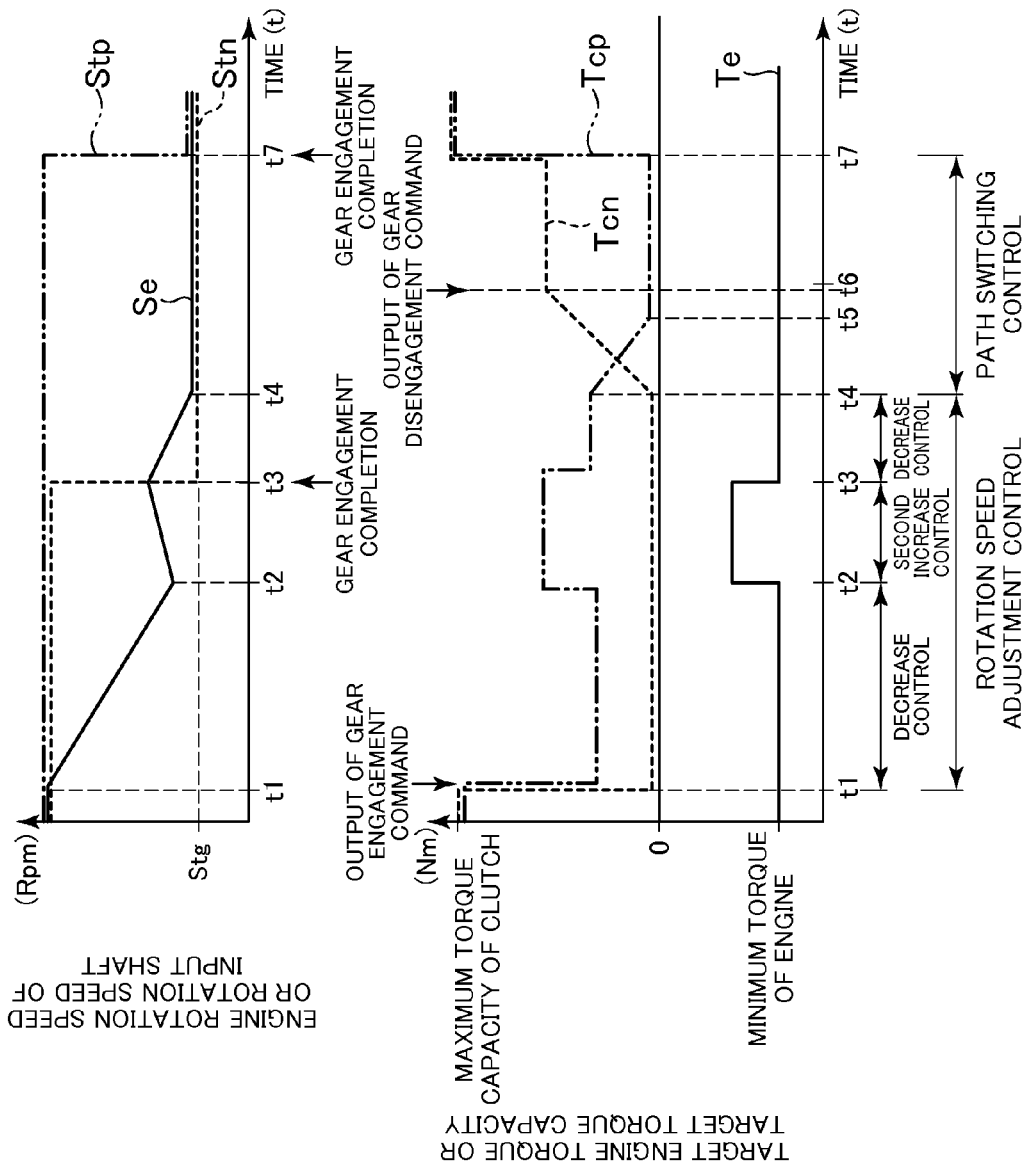
FIGS. 27A and 27B are timing charts illustrating an example of a power-off shift-up control executed by the control device according to the third preferred embodiment of the present invention.

FIGS. 26A and 26B are timing charts illustrating an outline of the power-on shift-down control according to this configuration, and FIGS. 27A and 27B are timing charts illustrating an outline of the power-off shift-up control according to this configuration.

As illustrated in FIGS. 26A and 26B and FIG. 27B, the gear control unit 10h outputs the gear engagement command at t1 when the shift command is generated. Also, the rotation speed control unit 10g starts the increase control or the decrease control at t1. As a result, as illustrated in FIGS. 26A and 27A, the engine rotation speed Se starts to increase or decrease.

In the examples of those figures, the dog clutches collide with each other between the movable gear Gn1 and the fixed gear Gn2 at t2. In this situation, the rotation speed control unit 10g starts the control to change the engine rotation speed Se in a direction opposite to that of the control which starts at t1. Specifically, in the power-on shift-down control illustrated in FIGS. 26A and 26B, the rotation speed control unit 10g executes the decrease control (for example, the above-mentioned second decrease control), and decreases the engine rotation speed Se. Also, in the power-off shift-up control illustrated in FIGS. 27A and 27B, the rotation speed control unit 10g executes the increase control (for example, the above-mentioned second increase control), and increases the engine rotation speed Se. Under those controls, the rotation speed difference is generated between the movable gear Gn1 and the fixed gear Gn2 (or the rotation speed difference is enlarged). As a result, the movable gear Gn1 and the fixed gear Gn2 are engaged with each other at t3.

When the movable gear Gn1 and the fixed gear Gn2 are engaged with each other at t3, the rotation speed control unit 10g restarts the control that has been first executed (that is, the increase control in the example of FIGS. 26A and 26B, and the decrease control in the example of FIGS. 27A and 27B), and again makes the engine rotation speed Se close to the next gear level corresponding speed Stg. As a result, the engine rotation speed Se arrives at the next gear level corresponding speed Stg (t4). Thereafter, the above-described path switching control is executed to terminate the transmission control (t7).

Figure 28:
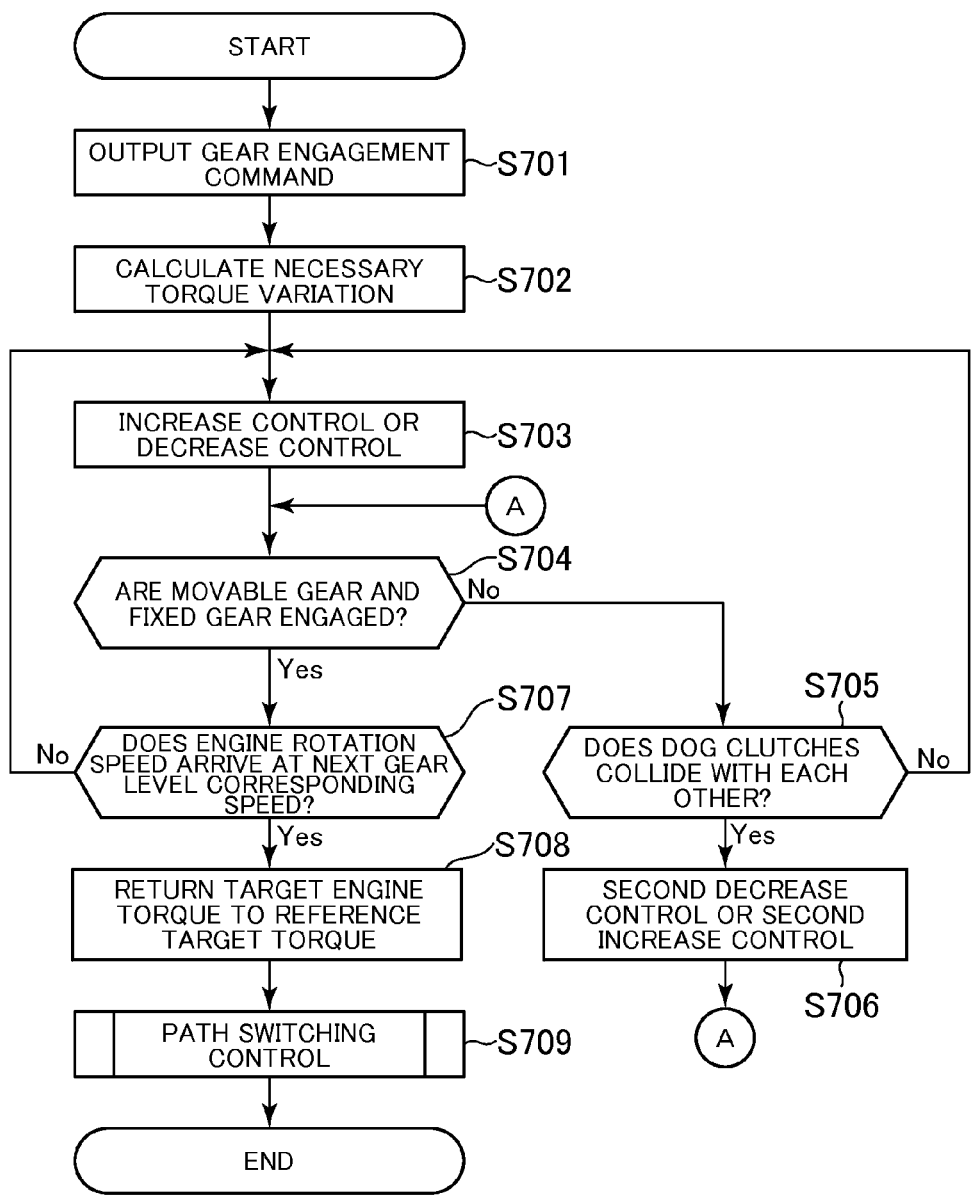
FIG. 28 is a flowchart illustrating an example of a process to be executed by the control device according to the third preferred embodiment of the present invention.

FIG. 28 is a flowchart illustrating an example of a process to be executed in the power-off shift-up control and the power-on shift-down control according to this configuration.

First, the gear control unit 10h outputs the gear engagement command (S701). Also, the torque variation calculation unit 10e calculates the necessary torque variation (S702), and the rotation speed control unit 10g executes the increase control and the decrease control on the basis of the necessary torque variation (S703). That is, the decrease control is executed in the power-off shift-up control, and the increase control is executed in the power-on shift-down control.

Thereafter, the gear determination unit 10c determines whether or not the movable gear Gn1 has been engaged with the fixed gear Gn2 (S704). In this example, if the movable gear Gn1 has not yet been engaged with the fixed gear Gn2, the collision determination unit 10k determines whether or not the dog clutches collide with each other (S705). In this example, if the dog clutches do not collide with each other, the rotation speed control unit 10g continues the control of S703. On the other hand, if the dog clutches collide with each other in S705, the rotation speed control unit 10g executes the control to change the engine rotation speed Se in a direction opposite to that of the control in S703. Specifically, the rotation speed control unit 10g executes the second decrease control to decrease the engine rotation speed Se when executing the increase control in S703 (S706), and executes the second increase control to increase the engine rotation speed Se when executing the decrease control in S703 (S706). Thereafter, it is again determined in S704 whether or not the movable gear Gn1 has been engaged with the fixed gear Gn2. If the movable gear Gn1 has been engaged with the fixed gear Gn2, the rotation speed control unit 10g determines whether or not the engine rotation speed Se has arrived at the next gear level corresponding speed Stg (S707). If the engine rotation speed Se has not yet arrived at the next gear level corresponding speed Stg, the rotation speed control unit 10g executes the increase control or the decrease control in S703. On the other hand, if the engine rotation speed Se has arrived at the next gear level corresponding speed Stg in the determination of S707, the rotation speed control unit 10g terminates the increase control or the decrease control, and returns the target engine torque to the reference target torque (S708). The control device 10 executes the path switching control (S709), and terminates the present transmission control.

According to this configuration, when the dog clutches collide with each other, the rotation speed control unit 10g changes the engine rotation speed Se in a direction away from the next gear level corresponding speed Stg. With this configuration, if the dog clutches collide with each other, the rotation speed difference between the movable gear Gn1 and the fixed gear Gn2 is enlarged. As a result, the collision is eliminated in a short time, and the movable gear Gn1 and the fixed gear Gn2 can be engaged with each other.

Modified Example of the Third Preferred Embodiment

In this example, if the dog clutches collide with each other, the rotation speed control unit 10g continues the increase control or the decrease control started according to the shift command until the collision of the dog clutches is eliminated. The increase control or the decrease control is continued, the engine rotation speed Se moves away from the next gear level corresponding speed Stg, and the rotation speed difference is generated between the movable gear Gn1 and the fixed gear Gn2. As a result, those gears Gn1 and Gn2 are easily engaged with each other.

Figures 29A, 29B:
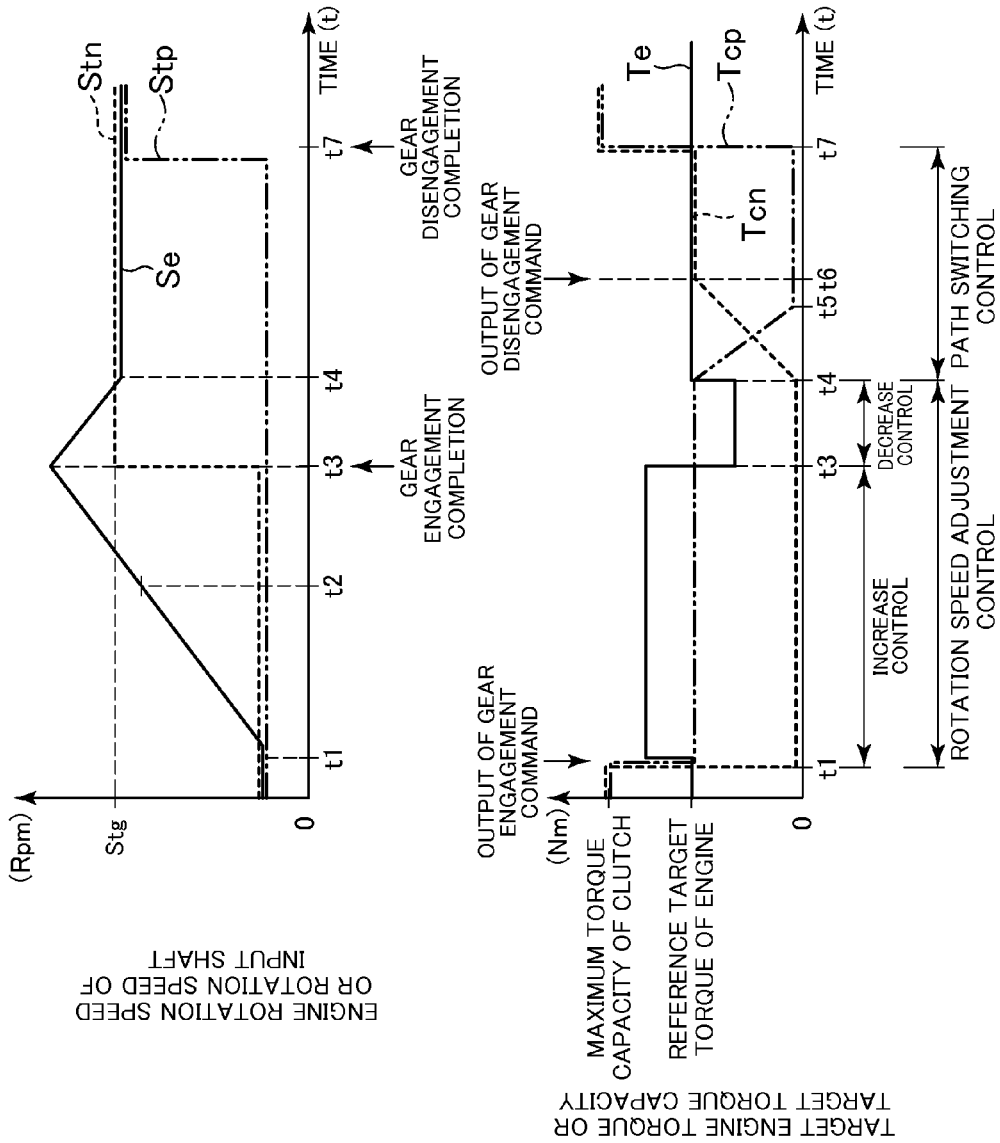
FIGS. 29A and 29B are timing charts illustrating a power-on shift-down control according to a modified example of the third preferred embodiment of the present invention.
Figures 30A, 30B:
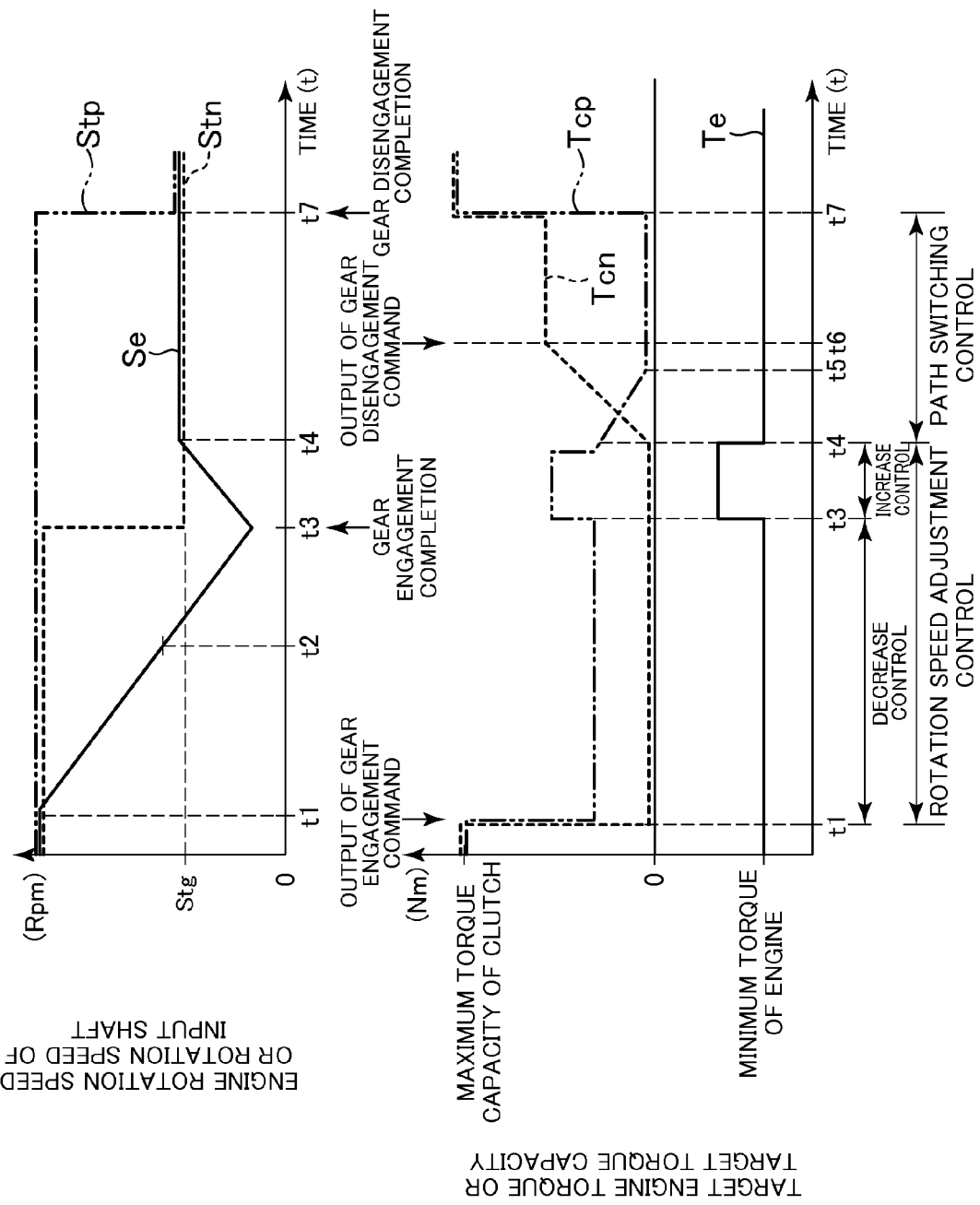
FIGS. 30A and 30B are timing charts illustrating a power-off shift-up control according to a modified example of the third preferred embodiment of the present invention.

FIGS. 29A and 29B are timing charts illustrating an example of the power-on shift-down control according to this configuration, and FIGS. 30A and 30B are timing charts illustrating an example of the power-off shift-up control according to this configuration.

As illustrated in FIGS. 29B and 30B, at t1 when the shift command is generated, the gear control unit 10h outputs the gear engagement command, and the rotation speed control unit 10g starts the rotation speed adjustment control. That is, the rotation speed control unit 10g starts the increase control in the power-on shift-down control of FIGS. 29A and 29B, and the rotation speed control unit 10g starts the decrease control in the power-off shift-up control of FIGS. 30A and 30B. With this configuration, the engine rotation speed Se starts to increase in the example of FIGS. 29A and 29B, and the engine rotation speed Se starts to decrease in the example of FIGS. 30A and 30B.

In the examples of these figures, the dog clutches collide with each other between the movable gear Gn1 and the fixed gear Gn2 at t2. The rotation speed control unit 10g continues the increase control or the decrease control until the collision of the dog clutches is eliminated, after the engine rotation speed Se has arrived at the next gear level corresponding speed Stg.

When the gears Gn1 and Gn2 are engaged with each other at t3, the rotation speed control unit 10g terminates the increase control or the decrease control up to then, and starts the control to return the engine rotation speed Se to the next gear level corresponding speed. Specifically, the rotation speed control unit 10g executes the second decrease control in the power-on shift-down control that starts the increase control according to the shift command (refer to FIG. 29B). Also, the rotation speed control unit 10g executes the second increase control in the power-off shift-up control that starts the decrease control according to the shift command (refer to FIG. 30B). As a result of those controls, the engine rotation speed Se matches the next gear level corresponding speed Stg at t5. Thereafter, the above-mentioned path switching control is executed (t4 to t7), and the present transmission control is terminated.

Figure 31:
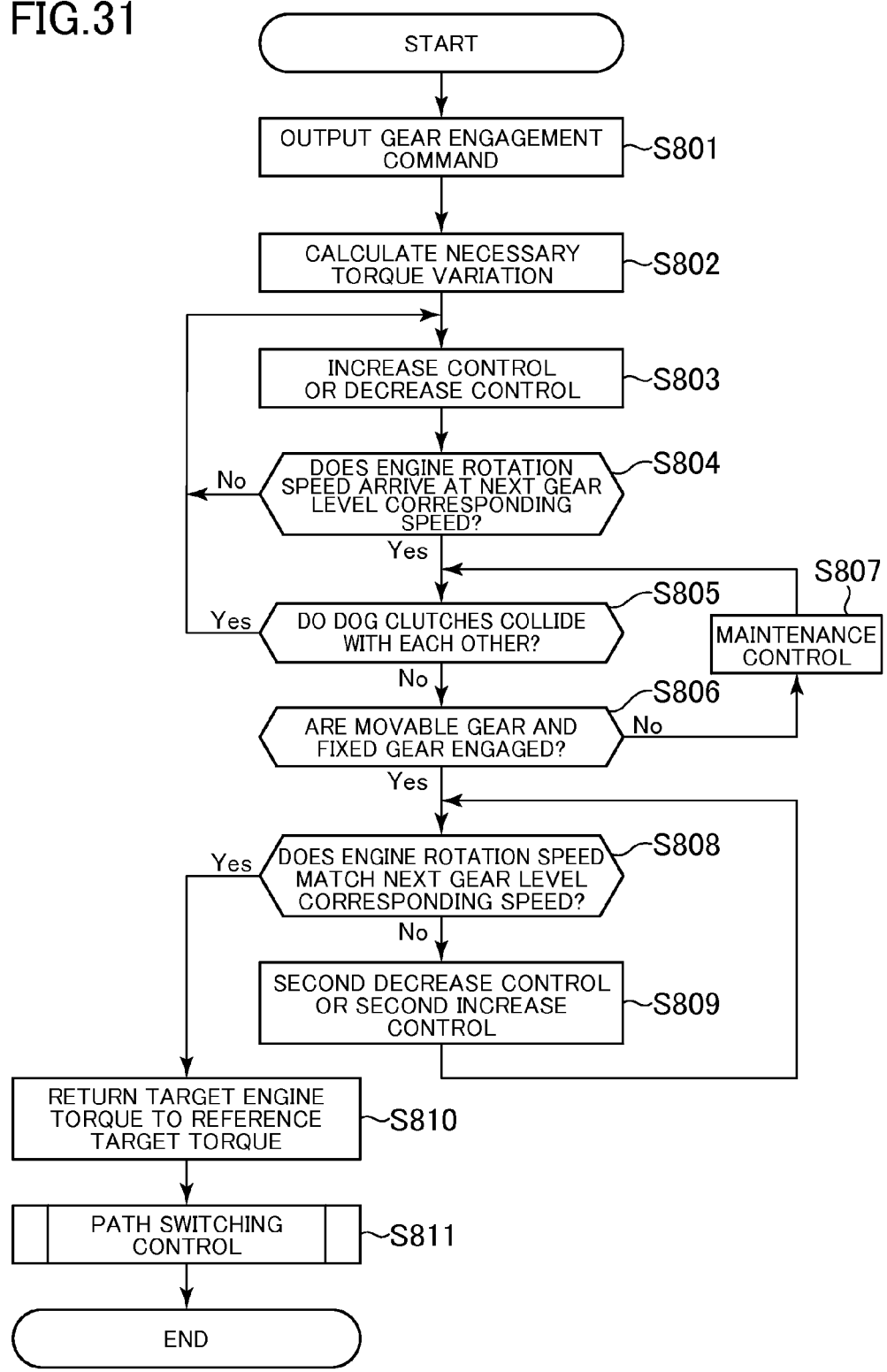
FIG. 31 is a flowchart illustrating an example of a process to be executed in the power-on shift-down control or the power-off shift-up control illustrated in FIGS. 29A and 29B and FIGS. 30A and 30B.

FIG. 31 is a flowchart illustrating an example of a process in the control device 10 according to this configuration.

First, the gear control unit 10h outputs the gear engagement command (S801). Also, the torque variation calculation unit 10e calculates the necessary torque variation (S802), and the rotation speed control unit 10g executes the rotation speed adjustment control (the increase control or the decrease control) on the basis of the necessary torque variation (S803). That is, the rotation speed control unit 10g executes the increase control in the power-on shift-down control, and executes the decrease control in the power-off shift-up control.

Then, the rotation speed control unit 10g determines whether or not the engine rotation speed Se has arrived at the next gear level corresponding speed Stg (S804). In this example, if the engine rotation speed Se has not yet arrived at the next gear level corresponding speed Stg, the rotation speed control unit 10g continues the increase control or the decrease control of S803. On the other hand, if the engine rotation speed Se has already arrived at the next gear level corresponding speed Stg, the collision determination unit 10k determines whether or not the dog clutches have collided with each other (S805). In this example, if the dog clutches do not collide with each other, it is determined by the gear determination unit 10c whether or not the movable gear Gn1 has been engaged with the fixed gear Gn2 (S806). If the movable gear Gn1 has not yet been engaged with the fixed gear Gn2, the rotation speed control unit 10g executes the above-mentioned maintenance control, and maintains the present engine rotation speed Se (S807).

If it is determined that the dog clutches collide with each other in the determination of S805, the rotation speed control unit 10g continues the increase control or the decrease control in S803, and continues to change the engine rotation speed Se. If the dog clutches collide with each other while the maintenance control of S807 is being conducted, the rotation speed control unit 10g restarts the increase control or the decrease control, as a result of which the engine rotation speed Se further increases or decreases from the next gear level corresponding speed Stg. The increase control or the decrease control of S803 is continued until the collision of the dog clutches is eliminated. When it is determined that the movable gear Gn1 has been engaged with the fixed gear Gn2 in S806, the rotation speed control unit 10g determines whether or not the engine rotation speed Se matches the next gear level corresponding speed Stg (S808). If the engine rotation speed Se does not match the next gear level corresponding speed Stg, the rotation speed control unit 10g executes the second decrease control or the second increase control to return the engine rotation speed Se to the next gear level corresponding speed Stg (S809), and again determines whether or not the engine rotation speed Se matches the next gear level corresponding speed Stg (S808). When the engine rotation speed Se matches the next gear level corresponding speed Stg, the rotation speed control unit 10g returns the target engine torque to the reference target torque (S810). Also, the control device 10 executes the path switching control (S811), and terminates the present transmission control.

The present invention is not limited to the preferred embodiments described above, but can be variously changed. For example, the setting of the specified target engine torque Te or target torque capacities Tcp, Tcn to increase or decrease the engine rotation speed may be appropriately changed taking an acceleration response required for the vehicles into account.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A control device for a vehicle, the vehicle including, in a power transmission path to transmit a power of an engine, first and second clutches arranged to receive the power from the engine, and first and second transmission mechanisms arranged downstream of the first and second clutches and including a common output shaft, each of the first and second transmission mechanisms including a first gear which rotates together with a driven member of a respective one of the first and second clutches, and a second gear which rotates together with the output shaft, is movable relative to the first gear, and is engageable with the first gear by dog clutches, the control device being programmed to switch the path to transmit the power from one of the first and second clutches and the first and second transmission mechanisms to the other of the first and second clutches and the first and second transmission mechanisms according to a shift command, the control device comprising:
  a gear control unit that brings the first gear and the second gear close to each other in the first transmission mechanism which starts the power transmission according to the shift command;
  a rotation speed control unit that is programmed to set, as a target rotation speed, an engine rotation speed corresponding to a vehicle velocity and a speed reduction ratio realized by of the first gear and the second gear being brought close to each other and then into engagement with each other by the gear control unit, and to control the engine rotation speed toward the target rotation speed, and to prevent the engine rotation speed from arriving at the target rotation speed until the first gear and the second gear are engaged with each other; and
  a clutch control unit that brings the first clutch which starts the power transmission according to the shift command close to an engaged state, and the second clutch close to a disengaged state when the engine rotation speed arrives at the target rotation speed.

2. The control device for a vehicle according to claim 1, wherein the rotation speed control unit starts to control the engine rotation speed toward the target rotation speed after the first gear and the second gear are engaged with each other.

3. The control device for a vehicle according to claim 1, wherein the rotation speed control unit maintains the engine rotation speed at a rotation speed between an engine rotation speed before receiving the shift command and the target rotation speed until the first gear and the second gear are engaged with each other.

4. The control device for a vehicle according to claim 3, wherein the rotation speed at which the rotation speed control unit maintains the engine rotation speed is calculated based on a target rotation speed.

5. The control device for a vehicle according to claim 3, wherein the rotation speed control unit starts to control the engine rotation speed toward the target rotation speed before the first gear and the second gear are engaged with each other by the gear control unit.

6. The control device for a vehicle according to claim 1, further comprising:
  a gear determination unit that determines whether or not the first gear and the second gear are engaged with each other; wherein
  the rotation speed control unit includes a first control mode to prevent the engine rotation speed from arriving at the target rotation speed until it is determined that the first gear and the second gear are engaged with each other by the gear determination unit, and a second control mode to change the engine rotation speed toward the target rotation speed independently from the determination result of the gear control unit; and the rotation speed control unit selects one of the first control mode and the second control mode based on an amount of the change in the engine rotation speed until the engine rotation speed arrives at the target rotation speed.

7. The control device for a vehicle according to claim 1, further comprising:

a collision determination unit that determines whether or not the dog clutches collide with each other without engagement of the first gear and the second gear; wherein the rotation speed control unit continues or restarts changing the engine rotation speed according to the determination result of the collision determination unit.

8. The control device for a vehicle according to claim 7, wherein the rotation speed control unit returns the engine rotation speed to the target rotation speed when the engine rotation speed exceeds the target rotation speed due to a change in the engine rotation speed caused by the determination result of the collision determination unit.

9. A motorcycle comprising the control device according to claim 1.

10. A control device for a vehicle, the vehicle including, in a power transmission path to transmit a power of an engine, first and second clutches arranged to receive the power from the engine, and first and second transmission mechanisms arranged downstream of the first and second clutches and including a common output shaft, each of the first and second transmission mechanisms includes a first gear which rotates together with a driven member of a respective one of the first and second clutches, and a second gear which rotates together with the output shaft, is movable relative to the first gear, and is engageable with the first gear by dog clutches, the control device being programmed to switch the path to transmit the power from one of the first and second clutches and the first and second transmission mechanisms to the other of the first and second clutches and the first and second transmission mechanisms according to a shift command, the control device comprising:

a gear control unit that brings the first gear and the second gear close to each other in the first transmission mechanism which starts the power transmission according to the shift command;

a rotation speed control unit that is programmed to set, as a target rotation speed, an engine rotation speed corresponding to a vehicle velocity and a speed reduction ratio realized by the first gear and the second gear being brought close to each other and then into engagement with each other by the gear control unit, and to control the engine rotation speed toward the target rotation speed, and to change the engine rotation speed to a rotation speed that exceeds the target rotation speed and then to prevent the engine rotation speed from returning to the target rotation speed until the first gear and the second gear are engaged with each other by the gear engagement unit; and a clutch control unit that brings the first clutch which starts the power transmission according to the shift command close to an engaged state, and the second clutch close to a disengaged state when the engine rotation speed returns to the target rotation speed.

11. The control device for a vehicle according to claim 10, wherein the rotation speed control unit maintains the engine rotation speed at the rotation speed that exceeds the target rotation speed until the first gear and the second gear are engaged with each other.

12. The control device for a vehicle according to claim 10, wherein the gear control unit starts to bring the first gear and the second gear close to each other so that the first gear and the second gear contact each other in a status in which the engine rotation speed exceeds the target rotation speed.

13. The control device for a vehicle according to claim 12, wherein the gear control unit starts to bring the first gear and the second gear close to each other when the engine rotation speed exceeds a rotation speed determined on a basis of the target rotation speed.

14. The control device for a vehicle according to claim 10, further comprising:

a collision determination unit that determines whether or not the dog clutches collide with each other without engagement of the first gear and the second gear; wherein the rotation speed control unit continues or restarts the change in the engine rotation speed according to the determination result of the collision determination unit.

15. The control device for a vehicle according to claim 14, wherein the rotation speed control unit switches a direction of the change in the engine rotation speed according to the determination result of the collision determination unit.

16. A motorcycle comprising the control device according to claim 10.

* * * * *